United States Patent [19]

Seto et al.

[11] Patent Number: 5,546,572

[45] Date of Patent: Aug. 13, 1996

[54] METHOD FOR RETRIEVING DATABASE OF IMAGE INFORMATION

[75] Inventors: Youichi Seto, Sagamihara; Masahiro Kikuchi, Yokohama; Takatoshi Kodaira, Ibaraki; Shu Tezuka, Hitachi; Fuminobu Komura, Yokohama; Kuniaki Matsumoto, Tokyo, all of Japan

[73] Assignee: Hitachi, Ltd., Tokyo, Japan

[21] Appl. No.: 934,336

[22] Filed: Aug. 25, 1992

[30] Foreign Application Priority Data

Aug. 28, 1991 [JP] Japan .................................. 3-216890

[51] Int. Cl.$^6$ .................................................. G06T 17/00
[52] U.S. Cl. ......................... 395/600; 395/180; 395/100
[58] Field of Search .................................. 395/600, 102, 395/106, 117, 114, 575, 161, 100; 382/56, 27

[56] References Cited

U.S. PATENT DOCUMENTS

| | | | |
|---|---|---|---|
| 4,737,916 | 4/1988 | Ogawa et al. | 364/443 |
| 4,748,678 | 5/1988 | Takeda et al. | 382/56 |
| 4,873,513 | 10/1989 | Soults et al. | 345/27 |
| 5,043,902 | 8/1991 | Yokoyama et al. | 364/449 |
| 5,073,819 | 12/1991 | Gates et al. | 384/140 |
| 5,113,178 | 5/1992 | Yasuda et al. | 345/115 |
| 5,121,326 | 6/1992 | Monoto et al. | 364/449 |
| 5,123,088 | 6/1992 | Kasahara et al. | 395/161 |
| 5,124,915 | 6/1992 | Krenzei | 364/420 |
| 5,165,103 | 11/1992 | Takada et al. | 382/56 |
| 5,179,649 | 1/1993 | Masuzaki et al. | 395/117 |
| 5,185,673 | 2/1993 | Sobol | 358/296 |
| 5,201,048 | 4/1993 | Coulter et al. | 395/600 |
| 5,267,351 | 11/1993 | Reber et al. | 395/600 |
| 5,323,317 | 6/1994 | Hampton et al. | 364/420 |
| 5,350,303 | 9/1994 | Fox et al. | 434/118 |

OTHER PUBLICATIONS

Technical Report of the Institute of Electronics, Information and Communication Engineers of Japan, vol. IE87–90, 1987, pp. 36–43.
"Image Data Processing and Analysis(1)", compiled by Foundation of Resource Observation and Analysis Center, Mar. 1991, pp. 137–141.
"Precise Correction Technique for Earth Observation Satellite", Institute of Electrical Engineers of Japan, Ihara et al., vol. 101, No. 4, pp. 317–324, no date.
"Guide to Computer Image Processing", Sohken Publishing Ltd., by H. Tamura, 1985, pp. 150–151.
Gonzalez et al., "Digital Image Processing", vol. 1, Addison–Wesley publish Co., 1992, pp. 296–303 and 580–586.
Colwell, "Manuel of Remote Sensing", vol. 1, American Society of Photogrammetry, 1983, pp. 873–891.
"Registering Lansat Image by Point Matching", Jezching, Ton, Anil K. Jain; Sep. 1989; pp. 642–651.
Stuart Abrams; "Interactive MRI and CT image analysis with a microcomputer system", IEEE, 1988, p. 1.
Smotroff et al.; "Metrological Classification of Satellite Imagery using Neural Network Data Fusion"; IEEE, 1990, pp. 23–28.

*Primary Examiner*—Thomas G. Black
*Assistant Examiner*—C. Pham
*Attorney, Agent, or Firm*—Fay, Sharpe, Beall, Fagan, Minnich & McKee

[57] ABSTRACT

A retrieving key representing position information is used to retrieve image information containing the retrieving key information at a high speed and high precision. First a retrieving key is inputted to display retrieval information. The retrieving key is used to retrieve an image having a large size relative to a geometric distortion error, and the longitude/latitude conversion coefficients of the retrieved image are corrected. By using the corrected longitude/latitude conversion coefficients, an image having a small size relative to the geometric distortion error is retrieved, and the retrieved image is subject to distortion correction and image magnification.

25 Claims, 44 Drawing Sheets

ERRONEOUS DISCARD 40

ERRONEOUS DETECTION 70

FIG. 5

| | | INNER INDICES | |
|---|---|---|---|
| | | ○ | × |
| OUTER INDICES | ○ | FIXED RETRIEVAL (DESIRED INFORMATION PRESENT) | INDEFINITE RETRIEVAL (ERRONEOUS DISCARD OR DETECTION ?) |
| | × | THEORETICALLY CONTRADICTED | FIXED RETRIEVAL (NO DESIRED INFORMATION) |

○ : INCLUDED   × : NOT INCLUDED

FIG. 10

| OBJECT NAME | LATITUDE | LONGITUDE | SIZE (km) | CONSTRUCTION DATE |
|---|---|---|---|---|
| NARITA AIRPORT | 45° 12' 06" | 140° 20' 10" | 2.2 X 2.4 | '75.11.1 |
| HANEDA AIRPORT | 43° 40' 18" | 134° 56' 22" | 2.0 X 1.8 | '50.12.30 |
| .. | .. | .. | .. | .. |
| | | | | |

FIG. 12

| SENSOR NAME | SENSED DATE | LATITUDES/LONGITUDES OF FOUR CORNERS | | | | PATH/ROW | SATEL-LITE NAME | AREA NAME | IMAGE ID NO. |
|---|---|---|---|---|---|---|---|---|---|
| | | 1 | 2 | 3 | 4 | | | | |
| TM | 85.3.2 | 40° 20' 36"<br>140° 30' 56" | 42° 23' 11"<br>145° 33' 22" | 40° 56' 30"<br>140° 36' 25" | 42° 22' 46"<br>145° 35' 32" | 30/50 | LAND SAT-5 | KANTO | 0031 |
| HRV | 90.1.1 | 34° 22' 18"<br>140° 36' 20" | 33° 25' 55"<br>145° 32' 55" | 38° 44' 56"<br>140° 22' 30" | 37° 45' 36"<br>145° 12' 20" | 100/50 | SPOT | HOKKAIDO | 0045 |
| .. | .. | .... | .... | .... | .... | .. | .. | .. | .. |
| | | | | | | | | | |

| IMAGE ID NO. | LATITUDE/LONGITUDE - LINE/PIXEL CONVERSION COEFFICIENTS | | | | GENERATION DATE |
|---|---|---|---|---|---|
| 0031 | 12.35 | 11.04 | 0.12 | 1.36 | '90.11.23 |
| ⋮ | ⋮ | ⋮ | ⋮ | ⋮ | ⋮ |
| | | | | | |

FIG. 16

| AREA NAME | LATITUDES / LONGITUDES OF 4 CORNERS ||||  REDUCTION RATIO | GENERATION DATE | MAP ID NO. |
|---|---|---|---|---|---|---|---|
| | 1 | 2 | 3 | 4 | | | |
| KANTO | 40° 20' 36" 140° 30' 56" | 42° 23' 11" 145° 33' 22" | 40° 56' 30" 140° 36' 25" | 42° 22' 46" 145° 35' 32" | 1/25000 | '70.3.4 | 0135 |
| HOKKAIDO | 34° 22' 18" 140° 36' 20" | 33° 25' 55" 145° 32' 55" | 38° 44' 56" 140° 22' 30" | 37° 45' 36" 145° 12' 20" | 1/25000 | '78.2.1 | 0166 |
| .... | .... | .... | .... | .... | .. | .. | .. |
| | | | | | | | |

FIG. 27

| CODE | OBJECT NAME | LATITUDE | LONGITUDE | GROUP CODE | PARENT/CHILD ATTRIBUTE | QUALITY FLAG |
|---|---|---|---|---|---|---|
| 01 | SHINJUKU STATION | ○°△′□″ | △°×′○″ | 01 | PARENT | 5 |
| 02 | ○×BANK | ×°○′△″ | □°△′□″ | 01 | CHILD | 3 |
| 03 | ○□DEPARTMENT STORE | △°×′○″ | □°□′△″ | 02 | | |
| | | | | | | |
| | | | | | | |
| | | | | | | |
| | | | | | | |
| | | | | | | |

FIG. 28

| CODE | PATH/ROW | ALTITUDES / LONGITUDES OF 4 CORNERS | | | | SENSED DATE | CLOUD AMOUNT | SENSOR ANGLE | IMAGE ID NO. | LATITUDE/ LONGITUDE ID NO. |
|---|---|---|---|---|---|---|---|---|---|---|
| | | 1 | 2 | 3 | 4 | | | | | |
| 1 1 | △/□ | 0°□'△" | □°△'0" | △°0'□" | □°0'△" | 1990. 1. 1 | 3 0 | 0 | 1 1 3 | 5 3 3 |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |

FIG. 31A

NO CANDIDATE IMAGE TO BE RETRIEVED

FIG. 31B

PLURALITY OF CANDIDATE IMAGES ARE PRESENT

| CANDI-DATE NO. | SENSOR TYPE | PATH/ROW | SENSED DATE | CLOUD AMOUNT | SENSOR ANGLE |
|---|---|---|---|---|---|
| 0 1 | T M | — | — | — | — |
| 0 2 | M S S | — | — | — | — |
| 0 3 | H R V | — | — | — | — |
| 0 4 | T M | — | — | — | — |

FIG. 33

| CODE | OBJECT NAME | LATITUDE | LONGITUDE | TEXT ID NO. | IMAGE ID NO. |
|---|---|---|---|---|---|
| 01 | SHINJUKU STATION | x° 0' △" | □° △' 0" | 1111 | 3345 |
| | | | | | |
| | | | | | |
| | | | | | |
| | | | | | |
| | | | | | |

FIG. 35

| CODE | LATITUDE/LONGITUDE CONVERSION COEFFICIENT ID NO. | CORRECTED LATITUDE/LONGITUDE CONVERSION ID NO. | GROUP |
|---|---|---|---|
| 01 | 335 | 3351 | 01 |
| | | | |
| | | | |
| | | | |
| | | | |

1315 (L、P) (Lo、La)

1316 (L1、P1) (Lo1、La1)

(L2、P2) (Lo2、La2) 1317

OBJECT TABLE

METHOD 1

| CODE | OBJECT NAME | LATI-TUDE | LON-GITUDE |
|------|-------------|-----------|------------|
| 01 | A | Lo | La |
| 02 | $O_1$ | Lo1 | La1 |
| 03 | $O_2$ | Lo2 | La2 |
| | | | |

METHOD 2

| CODE | OBJECT NAME | LINE | PIXEL |
|------|-------------|------|-------|
| 01 | A | L | P |
| 02 | $O_1$ | L1 | P1 |
| 03 | $O_2$ | L2 | P2 |
| | | | |

METHOD 3

| CODE | OBJECT NAME | LATI-TUDE | LON-GITUDE |
|------|-------------|-----------|------------|
| 01 | A | Lo | La |
| 02 | $O_1$ | $\Delta Lo1$ | $\Delta La1$ |
| 03 | $O_2$ | $\Delta Lo2$ | $\Delta La2$ |
| | | | |

METHOD 4

| CODE | OBJECT NAME | LINE | PIXEL |
|------|-------------|------|-------|
| 01 | A | L | P |
| 02 | $O_1$ | $\Delta L1$ | $\Delta P1$ |
| 03 | $O_2$ | $\Delta L2$ | $\Delta P2$ |
| | | | |

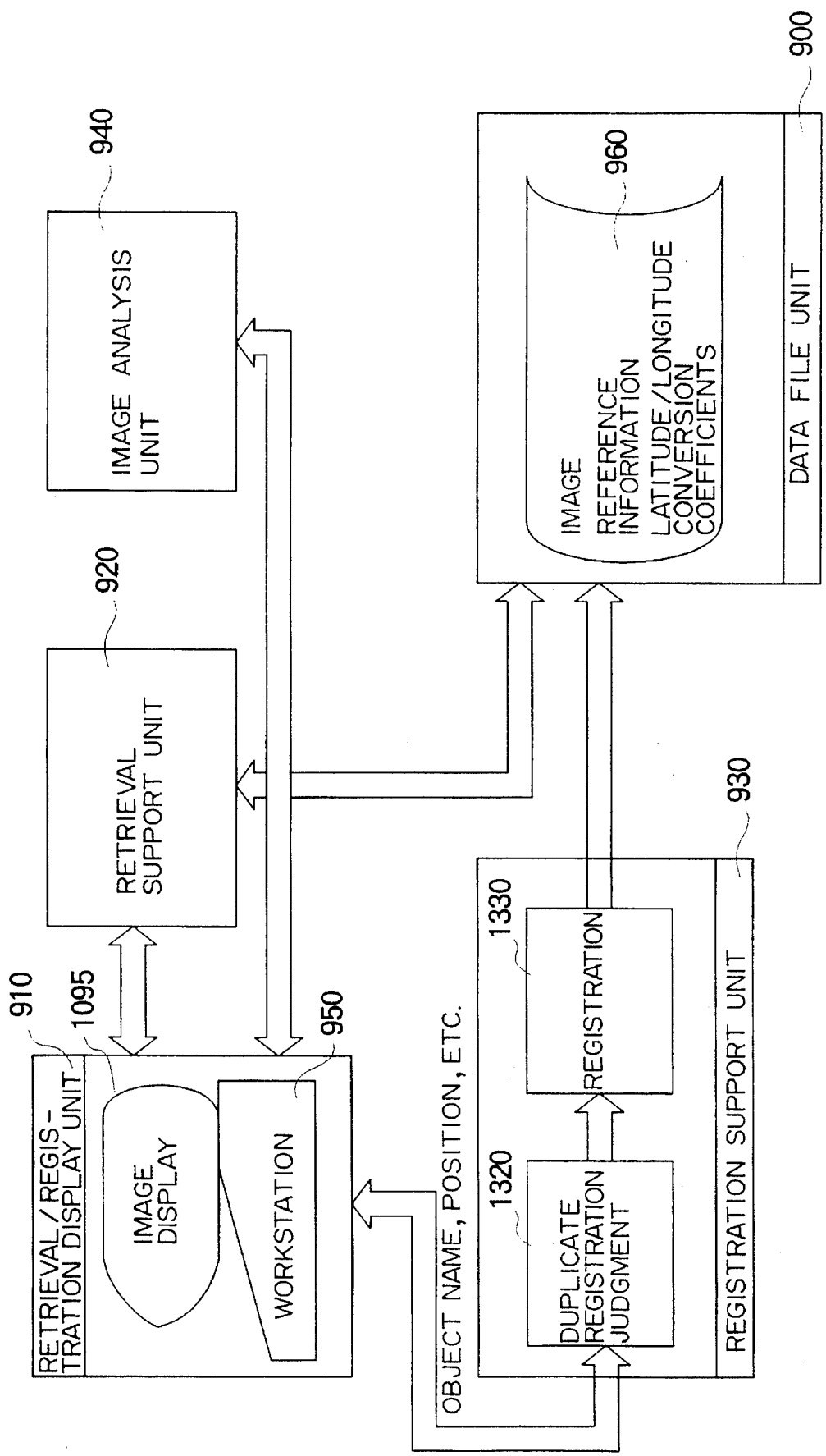

IMAGE DISPLAY UNIT

WORKSTATION

METHOD FOR RETRIEVING DATABASE OF IMAGE INFORMATION

BACKGROUND OF THE INVENTION

1. Field of the Invention

The present invention relates to a method of retrieving image information from a database, including retrieving an object image at high precision from an image filing apparatus storing a great amount of image data such as remotely sensed images (hereinafter simply called images), and capable of retrieving the information of an object within a displayed image with ease and at high precision.

2. Description of the Related Art

Conventional image retrieving methods include a retrieving method for a meteorological satellite (NOAA) image information database system, disclosed in the Technical Report of the Institute of Electronics, Information and Communication Engineers of Japan, Vol. IE87–90, 1987, pp. 36 to 43. According to this retrieving method, a keyword is first entered to an image filing apparatus to retrieve an image index (or directory) corresponding to the entered keyword and display it on a display device. The image index contains identification information composed of a file name, an apparatus name, date and the like represented by characters and numerals. In retrieving the image index, a plurality of indices stored in the image filing apparatus are read to select the index corresponding to an entered keyword. If the object information cannot be retrieved, another keyword or a combination of keywords is used to repeat the above-described procedure.

A retrieval language called a Structured Query Language (SQL) has been provided as a computer software tool for a relational database, which language can be used with the above-described retrieving method using indices.

SUMMARY OF THE INVENTION

Each image stored in a conventional image filing apparatus is assigned, as a retrieval index, particular information, such as image sensing parameters including the date of sensing, the type of sensors, and the like. It is therefore easy to retrieve an image by using image sensing parameters, but difficult to retrieve an image by designating a particular point or area of the image.

Further, an image sensed by a-satellite is corrected so as to make it coincide with the coordinates on a Mercator projection.

An image inclusive of a particular object can be retrieved directly from position information. Specifically, the latitudes and longitudes of four corners of a sensed (corrected) image registered in advance are used for retrieving the image, while checking whether a retrieving position is within an area defined by the latitudes and longitudes of the four corners.

As shown in FIG. 1, an image is retrieved by judging whether a retrieving key 10 (a, b) is within an index polygon (a quadrangle area indicated by a broken line) 20 which is defined by the latitudes and longitudes of four corners of the image formed in an index space, the four corners being represented by coordinates A (Lo1, La1), B (Lo2, La2), C (Lo3, La3), and D (Lo4, La4).

An improved method of the conventional retrieving method using image indices is to use a conditional judgment function of an SQL command of a relational database retrieval language, this command using the following expression (1):

| SELECT | IMAGE ID NO. INTO DA | (1) |
| --- | --- | --- |
| FROM | IMAGE TABLE | |
| WHERE | (a $\geq$ Lo1 AND (OR) a $\geq$ Lo3) | |
| AND | (a $\leq$ Lo2 AND (OR) a $\leq$ Lo4) | |
| AND | (b $\geq$ La3 AND (OR) b $\geq$ La4) | |
| AND | (b $\leq$ La1 AND (OR) b $\leq$ La2) | | where La defines one coordinate axis in the vertical direction (latitude direction), and Lo defines the other coordinate axis in the horizontal direction (longitude direction).

The expression (1) exemplarily shows the retrieval of an image inclusive of the retrieving key having latitude and longitude coordinates (a, b). As shown in FIG. 1, with this expression, an image ID number satisfying the area condition indicated by the WHERE clause is retrieved from an image table which supervises images, and stored in a data-area DA.

The index polygon formed in an index space and defined by the latitudes and longitudes of the four corners of a sensed image is a convex quadrangle of an arbitrary shape, posing a problem of erroneous discard or erroneous detection of part of the image.

A conventional method using the expression (1) provides high precision only when an index polygon is a right-angled quadrangle or rectangle. It is, however, associated with erroneous discard or erroneous retrieval if an index polygon is a convex quadrangle of an arbitrary shape. Although it is effective to use position information of the four corners of an image as retrieval indices, use of the retrieval language SQL command poses a problem of low precision in judging whether a retrieving key is within an arbitrary quadrangle.

FIG. 1 shows an example of an erroneous discard of a retrieval using the AND conditions of the expression (1). The difference in area between a polygon 30 selected by the SELECT command and the index polygon 20 is an erroneous discard area 40. FIG. 2 shows an example of an erroneous detection of a retrieval using the OR conditions of the expression (1). The difference in area between a polygon 31 selected by the SELECT command and the index polygon 20 is an erroneous detection area 70. As seen from FIGS. 1 and 2, the SELECT command is associated with a problem of erroneous discard and erroneous detection.

As shown in FIG. 1 (or FIG. 2), an image is retrieved by judging whether a retrieving key 10 (a, b) is within an index polygon (the quadrangle area indicated by the broken line) 20 which is defined by the latitudes and longitudes of four corners of the image formed in an index space, the four corners being represented by coordinates A (Lo1, La1), B (Lo2, La2), C (Lo3, La3), and D (Lo4, La4). A polygon 30 determined by the SQL command shown in FIG. 1 is included within an index polygon 20 and is a rectangle defined by the coordinate values (Lo1, Lo4, La1, and La4 in FIG. 1) of the four corners of the index polygon 20, this polygon 30 being called hereinafter an inner polygon. A polygon 31 determined by the SQL command shown in FIG. 2 includes an index polygon 20 and is a rectangle defined by the coordinate values (Lo2, Lo3, La2, and La3 in FIG. 2), this polygon 31 being called hereinafter an outer polygon.

An improved method of the conventional retrieving method using image indices is to use a retrieval condition designation function of SQL commands of a relational database retrieval language, using the following expressions (2) to (4):

```
DECLARE    CR1 CURSOR FOR SELECT          (2)(3)(4)
           IMAGE ID NO.
FROM       IMAGE TABLE
WHERE      (a ≧ Lo1 AND (OR) a ≧ Lo3)
AND        (a ≦ Lo2 AND (OR) a ≦ Lo4)
AND        (b ≧ La3 AND (OR) b ≧ La4)
AND        (b ≦ La1 AND (OR) b ≦ La2)
OPEN       CR1
FETCH      CR1 INTO DA
``` where La defines one coordinate axis in the vertical direction (latitude direction), and Lo defines the other coordinate axis in the horizontal direction (longitude direction).

The expression (2) exemplarily shows that images inclusive of the retrieving key having latitude and longitude coordinates (a, b) are designated as a retrieval set which is related to a cursor CR1. The expression (3) exemplarily shows to OPEN the cursor CR1. The expression (4) exemplarily shows that the position of the cursor CR1 is moved to the next record and the contents of the record are stored in the data area DA. With a series of SQL commands in the expressions (2) to (4), an image ID number satisfying the area condition indicated by the WHERE clause of the expression (2) is retrieved from an image table which supervises images, and stored in a data area DA. Use of the AND condition of the WHERE clause of the expression (2) allows to retrieve image data having the retrieving key (a, b) within an inner polygon area, and use of the OR condition allows to retrieve image data having the retrieving key (a, b) within an outer polygon area.

The index polygon formed in an index shape and defined by the latitudes and longitudes of the four corners of a sensed image is a convex quadrangle of an arbitrary shape, posing a problem of erroneous discard or erroneous detection of part of the image.

A conventional method using the expressions (2) to (4) provides high precision only when an index polygon is a right-angled quadrangle. It is however associated with erroneous discard or erroneous retrieval if an index polygon is a convex quadrangle of an arbitrary shape. Although it is effective to use position information of four corners of an image as retrieval indices, use of the retrieval language SQL command poses a problem of low precision in judging whether a retrieving key is within an arbitrary quadrangle.

FIG. 1 shows an example of an erroneous discard of a retrieval using the AND condition of the expression (2). The difference in area between a polygon (inner polygon) 30 determined by the SQL command and the index polygon 20 is an erroneous discard area 40. FIG. 2 shows an example of an erroneous detection of a retrieval using the OR condition of the expression (2). The difference in area between a polygon 31 determined by the SQL command and the index polygon 20 is an erroneous detection area 70. As seen from FIGS. 1 and 2, the SQL command becomes a problem of erroneous discard and erroneous detection.

An erroneous discard and erroneous detection of about 6% is estimated for an image sensed by a LANDSAT satellite Thematic Mapper (TM) sensor. An image sensed by a SPOT satellite high resolution visible (HRV) sensor includes a perspectively sensed image, and so the sensed area becomes a quadrangle more deformed than that of an image sensed by a TM sensor. It is therefore conceivable that the erroneous discard and erroneous detection become greater with the HRV sensor.

Such erroneous discard and erroneous detection cause a deteriorated detection precision, posing a significant problem in an image database.

A sensed and corrected image obtained by using position information as indices contains a geometric distortion caused by the motion characteristics of a satellite and sensor which are impossible to estimate, and by the unevenness of the earth surface which is impossible to definitely determine from a mathematical model available by a practical computer. For this reason, a sensed and corrected image is not located at correct latitudes and longitudes. Furthermore, if an image to be retrieved is small relative to the correction precision of a geometric distortion, there occurs a problem of an inability to retrieve such an image at high precision. Similarly, this problem occurs in retrieving the information of an object within a displayed image.

It is an object of the present invention to provide a method of retrieving information such as stored image information at high precision even if the information has geometric distortion superposed, and a method of retrieving an image stored in a database at high precision and with a simple operation, while using position information as a retrieving key.

In order to achieve the above object of the present invention, the following methods (1) to (4) are used.

(1) An issue of retrieving an image inclusive of a particular position or area is settled by adding indices of sensing parameters to each image and using position information as indices. Namely, sensing parameters and position information are used as a retrieving key. The position information includes, for example, the latitudes and longitudes of a map, and the lines and pixels of image coordinates. If the map coordinates are used for the position information, a latitude/longitude-pixel/line conversion expression (this expression and inverse conversion expression are collectively called a latitude/longitude conversion expression) is used for converting map coordinates into image coordinates.

(2) The following two schemes have been invented for settling an issue of judging whether a retrieving key is included in a quadrangle of an arbitrary shape formed in an index space.

(i) Polynomial retrieving scheme

As shown in FIG. 3, a quadrangle of an arbitrary shape is represented by linear polynomials 11, 12, 13, and 14, and whether a retrieving key 80 at a point o is included within a quadrangle ABCD 90 or not, is judged by the following expressions (5) to (8). If these expressions (5) to (8) are satisfied, then the retrieving key 80 is included within the quadrangle. The coordinates at each apex are stored beforehand for each image. In FIG. 3, LAT represents a latitude, and LONG represents a longitude. The coordinates at each point are represented by A: (Lo1, La1), B: (Lo2, La2), C: (Lo3, La3), D: (Lo4, La4), and 0: (a, b).

$$11: b \leq (La1-La3)(a-Lo1)/(Lo1-Lo3)+La1 \quad (5)$$

$$12: b \geq (La4-La3)(a-Lo3)/(Lo4-Lo3)+La3 \quad (6)$$

$$13: b \leq (La2-La1)(a-Lo2)/(Lo2-Lo1)+La2 \quad (7)$$

$$14: b \geq (La2-La4)(a-Lo4)/(Lo2-Lo4)+La4 \quad (8)$$

Not only the linear polynomials, but also high-order polynomials may be used depending upon the nature of the images.

(ii) Multi-stage retrieving scheme

As shown in FIG. 4, a candidate image information retrieving process 110 is executed with respect to a retrieving key 100. The retrieval conditions are checked. Thereafter, a detailed image information retrieving process 130 is executed only for candidate information having a possible erroneous detection or erroneous discard, i.e., only indefinite candidates 120. With such a two-stage retrieving method, fixed candidates 140 and indefinite candidates 120 are obtained to retrieve final information 150. The candidate image information retrieving process 110 is executed by the SQL command given by the expressions (2) to (4), whereas the detailed image information retrieving process 130 is executed by using the linear polynomials given by the expressions (5) to (8).

Retrieving by the SQL command is divided into four types as shown in FIG. 5. Inner indices 160 define an inner area for the case of the AND judgment conditions, and outer indices 170 define an outer area for the case of the OR judgment conditions.

If the retrieving key satisfies the inclusion conditions of both the inner and outer index spaces, it means that desired information is being stored in a database. This case is called a fixed retrieval 180. If it does not satisfy the inclusion conditions of both the inner and outer index spaces, it means that desired information is not being stored. This case is also called a fixed retrieval. If the retrieving key does not satisfy the inclusion condition of the inner index space, but satisfies the inclusion condition of the outer index space, there is a possibility of erroneous discard or erroneous detection. This case is called an indefinite retrieval 190. In the case of the indefinite retrieval, a more detailed retrieval is requested. The case where the inclusion condition of the inner index space is satisfied, but the inclusion condition of the outer index space is not satisfied, is not theoretically possible so this case can be neglected.

(3) The following method has been invented for settling an issue of an inability to retrieve an object image and its information because of a geometric distortion.

(iii) A small object is supervised as a group constituted by the small object and a nearby large object.

(iv) A user visually compares an image of an area containing an object belonging to a group with a reference image, to obtain a position error. By using this error, the coefficients of a latitude/longitude conversion expression to be used for the image area are corrected.

(4) The following method has been invented for settling an issue of judging whether a retrieving key is included in a quadrangle of an arbitrary shape formed in an index space. In the following, the term "fixed candidate" means information determined as a candidate to be used for the retrieval, and the term "unfixed candidate" means information determined not as a candidate to be used for the retrieval.

As shown in FIG. 4, a candidate image information retrieving process 110 is executed with respect to retrieving key 100 to check the retrieval conditions and retrieve fixed candidates 140. Thereafter, a detailed image information retrieving process 130 is executed only for candidate information having a possible erroneous detection or erroneous discard, i.e., only for indefinite candidates 120. With such a two-stage retrieving method, final information 150 is retrieved.

In the candidate image information retrieving process 110, an SQL outer polygon inclusion judgment retrieving process 1400 shown in FIG. 45 is executed by using the OR condition SQL commands given by the expressions (2) to (4), to thereby discard unfixed candidates 1500 and limit the number of objects to be retrieved. Next, an inner polygon inclusion judgment retrieving process 1600 is executed to retrieve fixed candidates 140 satisfying the judgment conditions, and indefinite candidates 120. In this manner, the detailed image information retrieving is necessary to be performed. A judgment statement at the inner polygon inclusion judgment retrieving process 1600 is given by the following expression (9):

| IF  | $(a \geq Lo1$ AND $a \geq Lo3)$ | (9) |
|-----|------------------------------|-----|
| AND | $(a \leq Lo2$ AND $a \leq Lo4)$ |     |
| AND | $(b \geq La3$ AND $b \geq La4)$ |     |
| AND | $(b \leq La1$ AND $b \leq La2)$ |     | where the coordinates of the retrieving key are represented by (a, b), and the four corner latitude/longitude coordinates of an image are represented by (Lo1, La1) at the upper left corner, (Lo2, La2) at the upper right corner, (Lo3, La3) at the lower left corner, and (Lo4, La4) at the lower right corner.

In the detailed image information retrieving process 130 shown in FIG. 4, a quadrangle of an arbitrary shape such as shown in FIG. 3 is represented by linear polynomials 11, 12, 13, and 14, and whether a retrieving key 80 at a point o is included within a quadrangle ABCD 90 or not is judged by the following expressions (10) to (13). If these expressions (10) to (13) are satisfied, then the retrieving key 80 is included within the quadrangle. The coordinates at each apex are stored beforehand for each image. In FIG. 3, LAT represents a latitude, and LONG represents a longitude. The coordinates at each point are represented by A: (Lo1, La1), B: (Lo2, La2), C: (Lo3, La3), D: (Lo4, La4), and o: (a, b).

$$11: a \geq (Lo1-Lo3)(b-La1)/(La1-La3)+Lo1 \qquad (10)$$

$$12: a \leq (Lo2-Lo4)(b-La4)/(La2-La4)+Lo1 \qquad (11)$$

$$13: b \leq (La2-La1)(a-Lo2)/(Lo2-Lo4)+La2 \qquad (12)$$

$$14: b \geq (La4-La3)(a-Lo3)/(Lo4-Lo3)+La3 \qquad (13)$$

Retrieving by the SQL command is divided into four types as shown in FIG. 5. Inner indices 160 define an inner area for the case of the AND judgment conditions, and outer indices 170 define an outer area for the case of the OR judgment conditions.

If the retrieving key satisfies the inclusion conditions of both the inner and outer index spaces, it means that desired information is being stored in a database. This case is called a fixed retrieval 180. If it does not satisfy the inclusion conditions of both the inner and outer index spaces, it means that desired information is not being stored. This case is also called a fixed retrieval. If the retrieving key does not satisfy the inclusion condition of the inner index space, but satisfies the inclusion condition of the outer index space, there is a possibility of erroneous discard or erroneous detection. This case is called an indefinite retrieval 190. In the case of the indefinite retrieval, a more detailed retrieval is requested. The case where the inclusion condition of the inner index space is satisfied but the inclusion condition of the outer index space is not satisfied, is not theoretically possible so this case can be neglected.

Next, how the above-described methods operate will be given below.

(a) Use of the position information as indices allows a direct retrieval of an object irrespective of time and the type of image. For example, the same object area of images sensed by different sensors, such as a TM image and HRV image, can be retrieved by using the same retrieving key, i.e., single position information. By providing beforehand a conversion expression for the conversion from latitude and longitude to line and pixel, or vice versa, the conversion can be executed as desired at the time of retrieval. It is possible to unanimously define the relationship between the latitudes and longitudes of a map coordinate system and the lines and pixels of an image coordinate system. Such a conversion expression is realized by polynomials.

(b) The above-described schemes (i) and (ii) operate in the following manner.

(i) Polynomial retrieving scheme

A quadrangle of an arbitrary shape is represented by linear expressions, and the inclusion relationship between the retrieving key and the index space is judged directly. It is therefore possible to retrieve a spatial position, theoretically eliminating erroneous detection and erroneous discard.

(ii) Multi-stage retrieving scheme

The detailed image information retrieving process is executed only for indefinite candidates having a possible erroneous detection or erroneous discard. The detailed image information retrieving process is not executed for all cases, but it is executed only when the candidate image information retrieving process is not sufficient for retrieving final information. If the positions of objects to be retrieved are random, the occurrence frequency of judgment inability is proportional to the image area. Therefore, it is sufficient if the geometric judgment is executed about 10% of the number of retrieval times, reducing the calculation time.

(c) The above-described schemes (iii) and (iv) operate in the following manner.

(iii) Large objects relative to a geometric distortion correction precision and small objects near large objects are supervised as constituting groups, allowing the retrieval of small objects. Specifically, a large object is first retrieved by using position information. Even if a geometric distortion is superposed on an image of the large object, an image of the large object can be reliably retrieved. Next, the retrieved object image is compared with a reference image to obtain a position error. By using the position error, a local geometric distortion near the large object is corrected so that the geometric distortion of an image area constituting the group can be corrected. The coefficients of a latitude/longitude conversion expression are corrected while considering the position error. By using the corrected coefficients, a small object is finally retrieved. In this manner, large and small objects are supervised as constituting groups. A small object can be retrieved through the two-stage retrieving process.

(iv) The position error between a reference image and an object is measured visually on an image display unit. The reference image can be retrieved from a reference image file by inputting a retrieving key such as the object name. By using the position error, the coefficients of the latitude/longitude conversion expression are corrected. In this manner, a geometric distortion of an area constituting a group can be corrected, allowing a small object to be retrieved.

(d) The above-described method (4) operates in the following manner.

The detailed image information retrieving process is executed only for indefinite candidates having a possible erroneous detection or erroneous discard. The detailed image information retrieving process is not executed for all cases, but it is executed only when the candidate image information retrieving process is not sufficient for retrieving final information. If the positions of objects to be retrieved are random, the occurrence frequency of judgment inability is proportional to the image area. Therefore, it is sufficient if the geometric judgment is executed about 10% of the number of retrieval times, reducing the calculation time.

BRIEF DESCRIPTION OF THE DRAWINGS

FIG. 5 is a table illustrating retrieving conditions.

FIG. 10 shows the structure of an object table.

FIG. 12 shows the structure of an image table.

FIG. 16 shows the structure of a map table.

FIG. 27 shows the structure of an object table.

FIG. 28 shows the structure of an image table.

FIGS. 31A and 31B show examples of images displayed at the workstation.

FIG. 33 shows the structure of a reference table.

FIG. 35 shows the structure of a latitude/longitude conversion coefficient table.

FIG. 38 shows the configuration of an image information database system.

DESCRIPTION OF THE PREFERRED EMBODIMENTS

1st Embodiment

An embodiment of the present invention will be described with reference to FIGS. 6 to 17, the embodiment being applied to an image information database system to be used for the investigation (analysis) in updating a map using a satellite-sensed image or the like.

Figure 6:
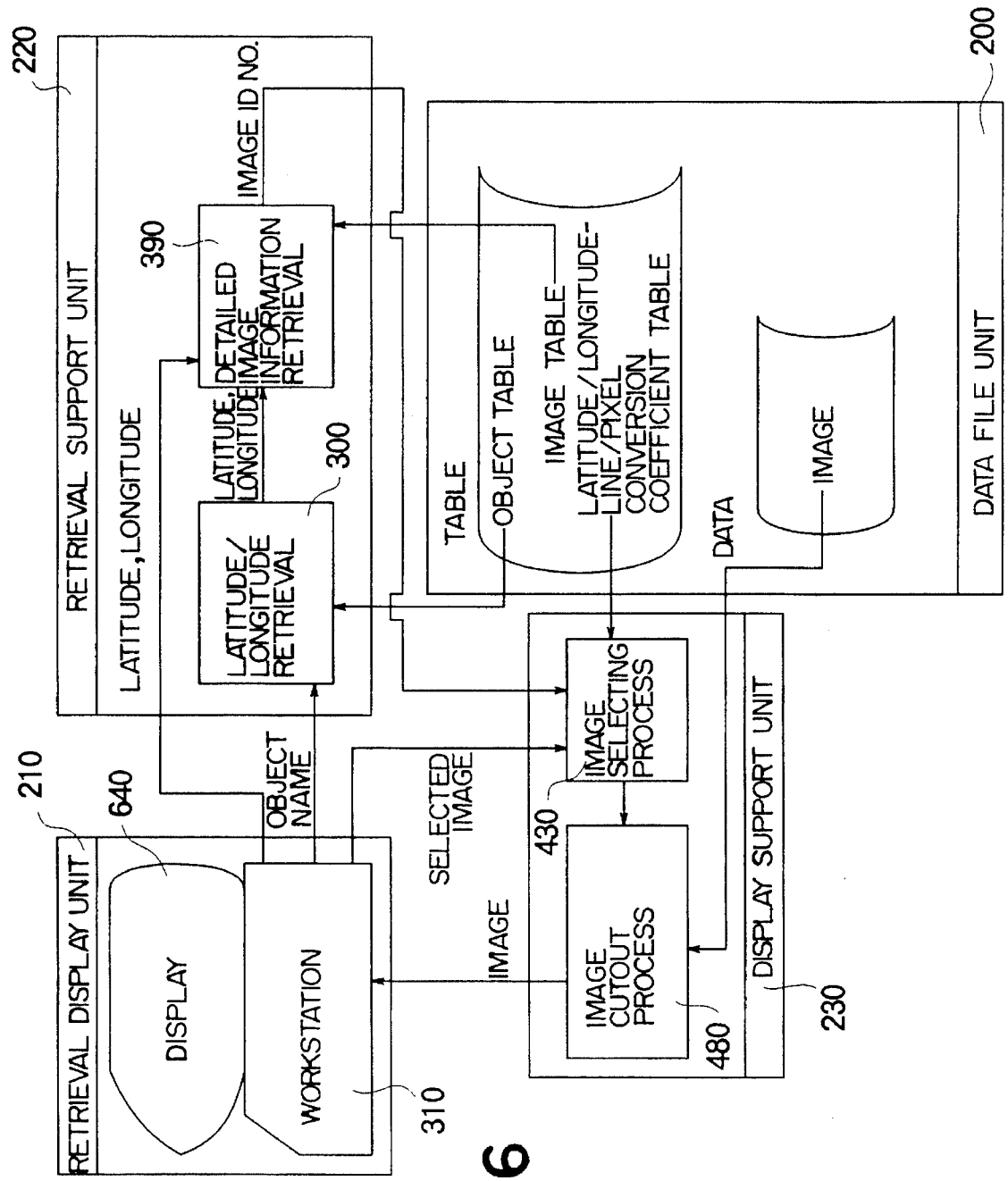
FIG. 6 shows the configuration of an image information database system.
Figure 7:
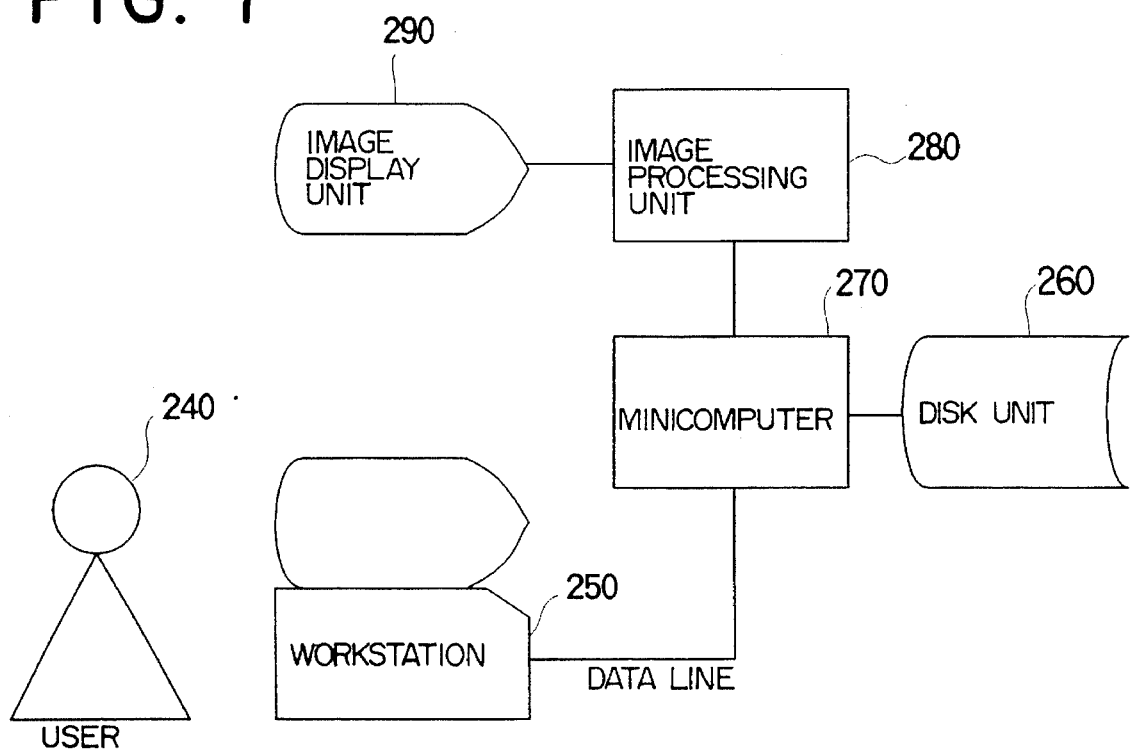
FIG. 7 shows the hardware structure of the information database system.

FIG. 6 shows the configuration of an image information database system. This system is constructed of a data file unit 200, a retrieval display unit 210, a retrieval support unit 220, and a display support unit 230. The data file unit 200 stores image data and various tables associated with object images, latitude/longitude-line/pixel conversion coefficients and the like. The retrieval display unit 210 has a display 640 on which an inputted retrieval request and data retrieved from the data file unit 200 are displayed. The retrieval support unit 220 supports a data retrieval operation efficiently. The display support unit 230 supports a display operation such as an image cutout and display operation. Arrows in FIG. 6 represent the flow of data. FIG. 7 shows a hardware configuration of this system. A user 240 retrieves various information stored in a disk unit 260 by using a workstation (WS) 250. A minicomputer 270 operates to display and analyze the retrieved image information with the help of a dedicated image processing unit 280 and image display unit (IDU) 290.

The data structure of this system uses a relational database, and the retrieval language is an SQL language.

The details of retrieving processes will be given in the following.

(1) Latitude/longitude retrieving process 300

Figure 8:
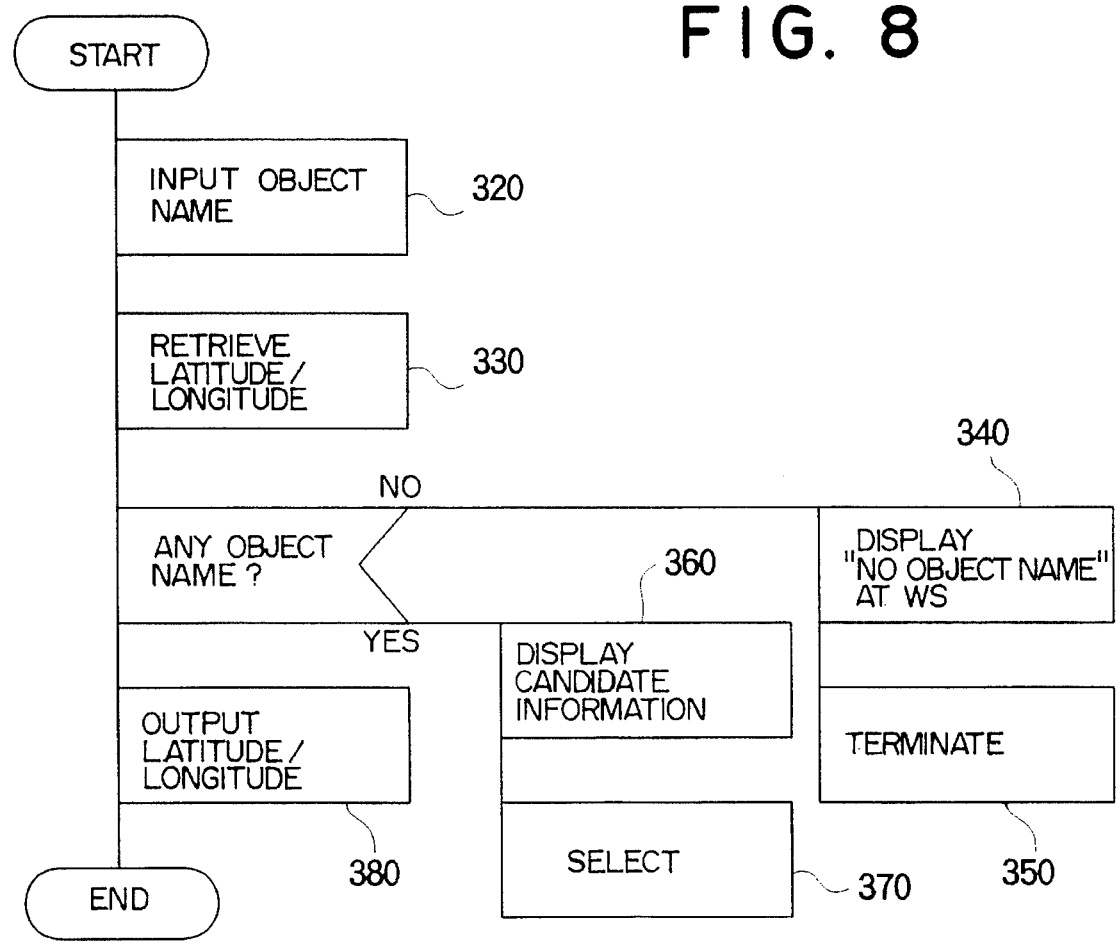
FIG. 8 is a flow chart showing the procedure of a latitude/longitude retrieving process.

FIG. 8 is a flow chart showing this process.

Figure 9:
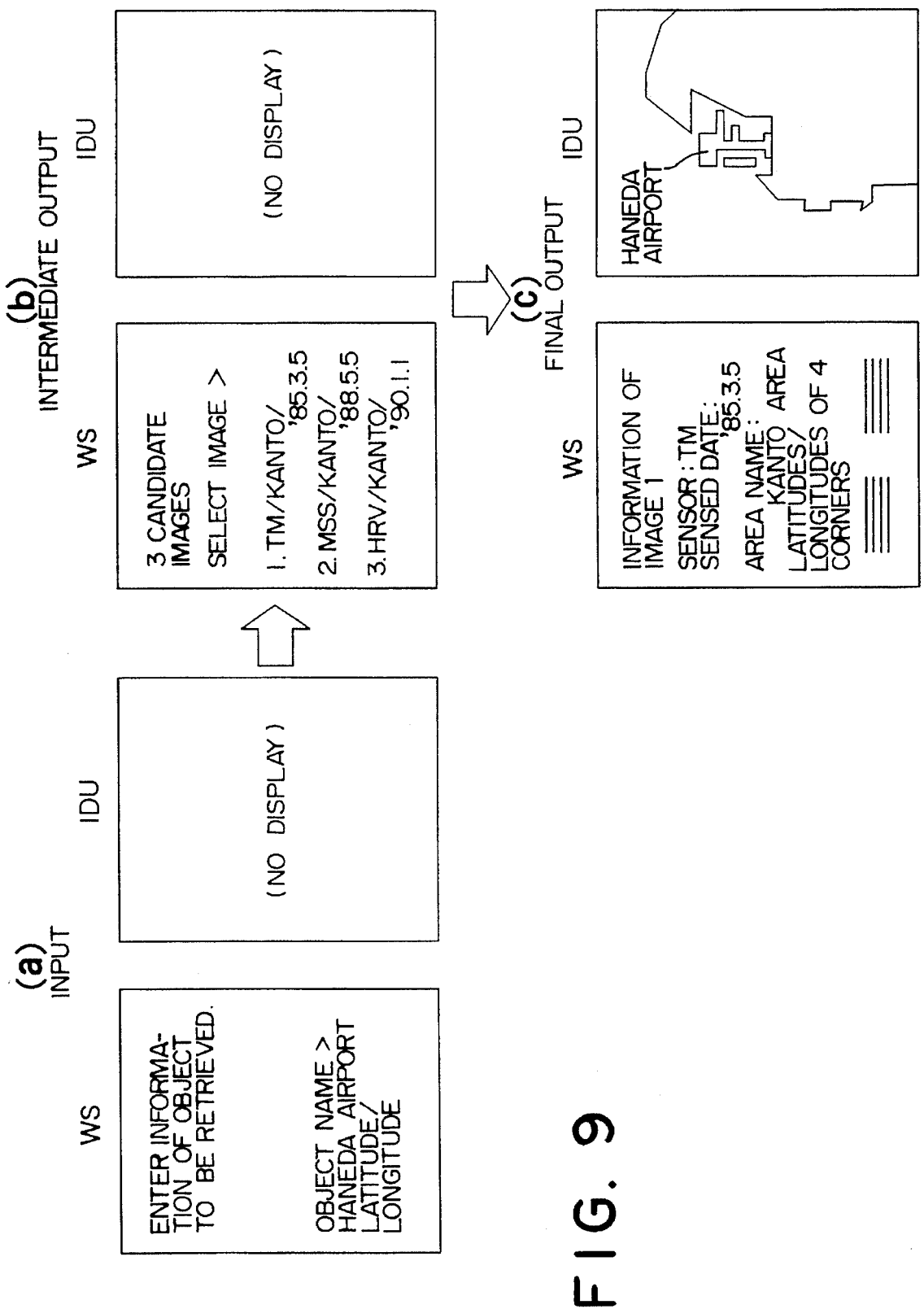
FIG. 9 shows examples of displayed images generated by the image information database system.

With this process, an object name is inputted from a workstation 310 shown in FIG. 6 (at step 320 in FIG. 8) to automatically retrieve, in the manner shown in FIG. 9, the latitude and longitude of an object by using an object table shown in FIG. 10 (at step 330). The columns of the object table include an object name column, an object latitude column, an object longitude column and the like. The latitudes and longitudes shown are provided from maps supplied by the Geographical Survey Institute. The number of rows or records of the object table is the same as that of objects recorded. The numerical values in the table are not exact, but approximate to the extent necessary for the purpose of describing the embodiment.

For example, in retrieving the latitude and longitude of Haneda Airport, the following expression of an SQL command is used:

| | | |
|---|---|---|
| SELECT | ALL (latitudes, longitudes) | (14) |
| FROM | OBJECT TABLE | |
| WHERE | OBJECT = "HANEDA AIRPORT" | |

If the object name is not present, a message "NO OBJECT NAME" is displayed (at step 340) at the workstation and the procedure is terminated (at step 350).

If there is any image corresponding to the entered object name, retrieved object information (object name, latitude, longitude, area size, and the like) is displayed at the workstation (at step 360). A user selects an object image (at step 370), and the latitude and longitude of the object of the selected image are outputted (at step 380) to thereafter terminate the procedure.

The retrieved latitude/longitude coordinates are assumed to be (a, b).

(2) Detailed image information retrieving process 390

Figure 11:
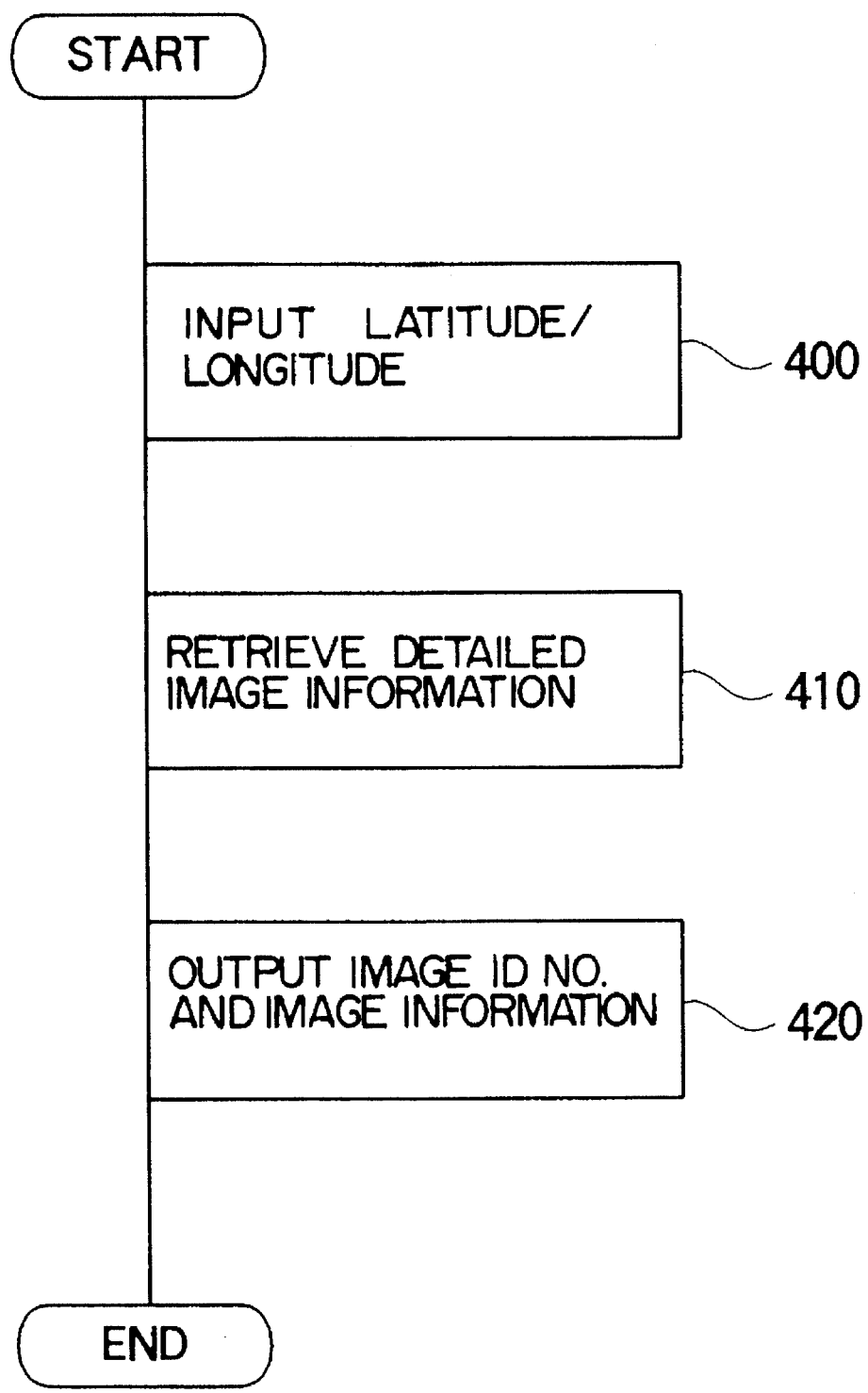
FIG. 11 is a flow chart showing the procedure of a detailed image information retrieving process.

FIG. 11 is a flow chart showing this process. With this process, an image identification number is retrieved from an image table shown in FIG. 12, by using the latitude and longitude outputted at the latitude/longitude retrieving process 300. If the latitude and longitude are known beforehand, the latitude/longitude retrieving process 300 shown in FIG. 7 is not executed, but control begins with this process 390. The image table stores a sensor name, sensed data, the latitudes and longitudes of the four corners of a sensed image, a path/row (corresponding to an identification address of a satellite sensing site), a satellite name, an area name, and an image identification number.

First, the latitude and longitude are inputted (at step 400 in FIG. 11) to retrieve the detailed image information (at step 410). At this step 410, an inclusion relationship is checked to determine whether the latitude and longitude of the object are included within an area defined by the latitudes and longitudes of the four corners of each sensed image, to thereby retrieve the image identification number and image information.

The SQL command given by the following expression (15) allows retrieval of the image identification number and other related information of the image inclusive of the latitude and longitude coordinates (a, b) of Haneda Airport:

| | | |
|---|---|---|
| SELECT | ALL FOUR CORNER LATITUDES/LONGITUDES IMAGE ID NO. SENSOR NAME SATELLITE NAME SENSED DATE | (15) |

| | |
|---|---|
| FROM | IMAGE TABLE |
| WHERE | (b ≦ (La1 − La3)(a − Lo1) / (Lo1 − Lo3) + La1) |
| AND | (b ≧ (La4 − La3)(a − Lo3) / (Lo4 − Lo3) + La3) |
| AND | (b ≦ (La2 − La1)(a − Lo2) / (Lo2 − Lo1) + La2) |
| AND | (b ≧ (La2 − La4)(a − Lo4) / (Lo2 − Lo4) + La4) | where (Lo1, La1), (Lo2, La2), (Lo3, La3), and (Lo4, La4) represent the four corner latitudes and longitudes stored in the table, respectively at the upper left corner, upper right corner, lower left corner, and lower right corner.

The image identification number and image information for the latitude and longitude supplied from the object table are retrieved by using the expression (15), and outputted (at step 420) to thereafter terminate the procedure.

In the above manner, one or more combinations of information such as the image identification number are retrieved.

(3) Image selecting process 430

Next, an object image is selected from retrieved candidate images.

Figure 13:
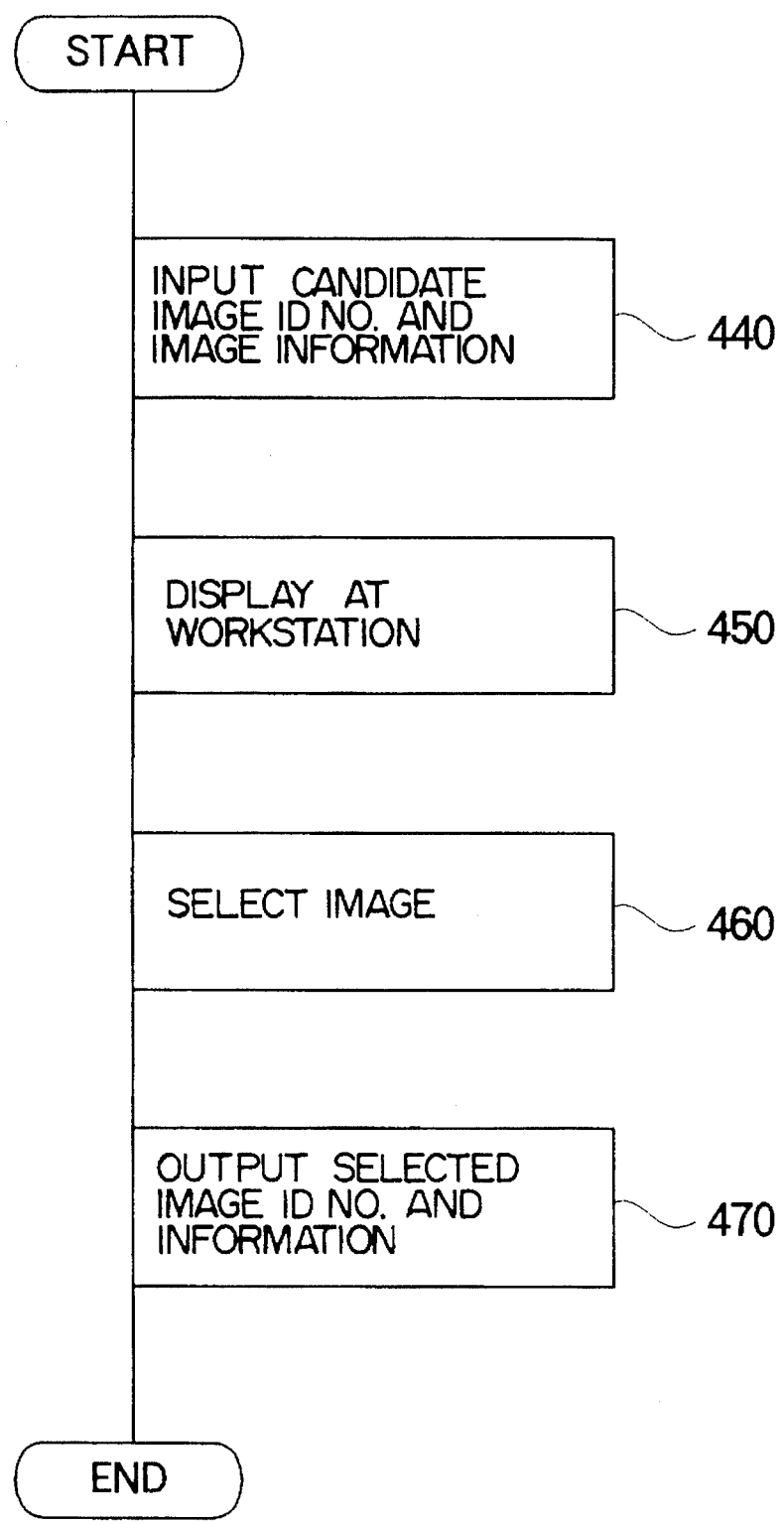
FIG. 13 is a flow chart showing the procedure of an image selecting process.

FIG. 13 is a flow chart showing this process. First, image information of the candidate images retrieved at the detailed image information retrieving process 390 is inputted (at step 440 in FIG. 13), and displayed at the workstation as shown in FIG. 9 labeled as an intermediate output (b) (at step 450). A user selects an object image while observing the displayed information (at step 460). The image identification number and related information are then outputted to the workstation 250 (at step 470).

(4) Image cutout process 480

An area of 512 * 512 pixels of the selected image is cut out, with the object image being placed at the center of the area, and is processed for display on the screen of the image display unit 290 shown in FIG. 7.

Figures 14, 15:
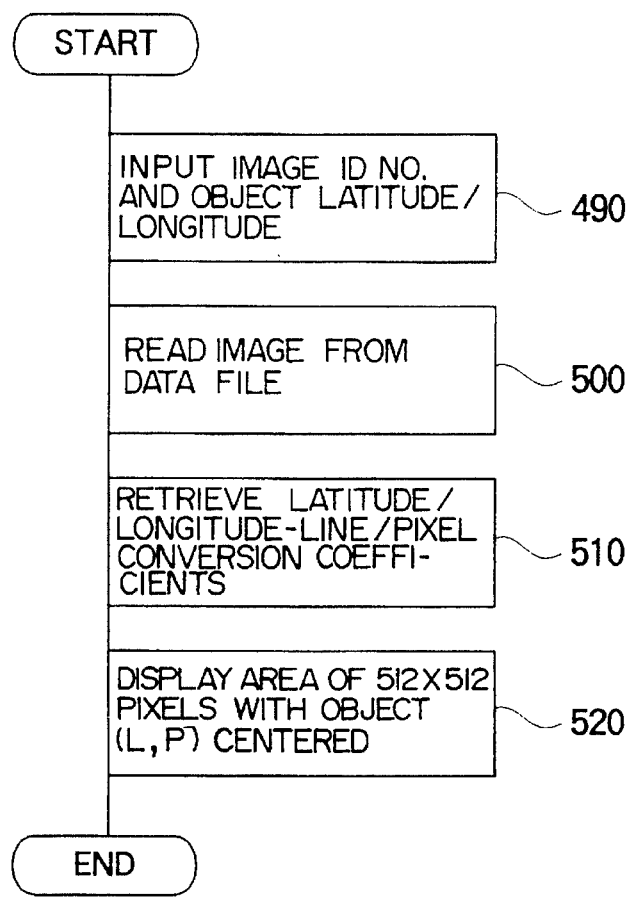
FIG. 14 is a flow chart showing the procedure of an image cutout process.
FIG. 15 shows the structure of a latitude/longitude-line/pixel conversion coefficient table.

FIG. 14 is a flow chart showing an image cutout process. First, the image identification number selected at the image selecting process 430 and the latitude/longitude retrieving process 300 are entered (at step 490 in FIG. 14). By using the image identification number as a search key, an image including the target object is read from the image data stored in the data file unit 200 shown in FIG. 6 (at step 500). Next, the conversion coefficients for the image are retrieved from a latitude/longitude-line/pixel conversion table shown in FIG. 15, by using the image identification number as a search key (at step 510).

The latitude/longitude-line/pixel conversion equation is defined in terms of a function f:

$$(L, P) = f(Lo, La) \quad (16)$$

where La represents a latitude, Lo represents a longitude, L represents a line, and P represents a pixel.

The expression (16) is a conversion expression for the conversion from latitude and longitude to line and pixel. Function f represents a polynomial. The coefficients of the polynomial are calculated beforehand at the process of correcting a geometric distortion of images.

Next, the inputted latitude and longitude of the object are converted into a line and pixel by using the conversion coefficients, and a cutout image of 512 * 512 pixels placing Haneda Airport at the center of the image as shown in FIG. 9 is displayed on the image display unit 290 (at step 520).

In the first embodiment, maps have been generated from images sensed by a satellite. Maps formed by other means may also be retrieved using the present invention method. In such a case, map information is stored in a map table such as that shown in FIG. 16. At the image select step 370 shown in FIG. 8, in addition to candidate image information, candidate images themselves may be displayed on the display unit in an overlay manner so that a user can visually and effectively select an object image.

2nd Embodiment

Similar to the first embodiment, the second embodiment is applied to an image information database system to be used for the investigation (analysis) in updating a map using a satellite-sensed image or the like. The second embodiment is intended to speed up the retrieval operation of the first embodiment.

The second embodiment will be described with reference to FIGS. 17 to 19.

Figure 17:
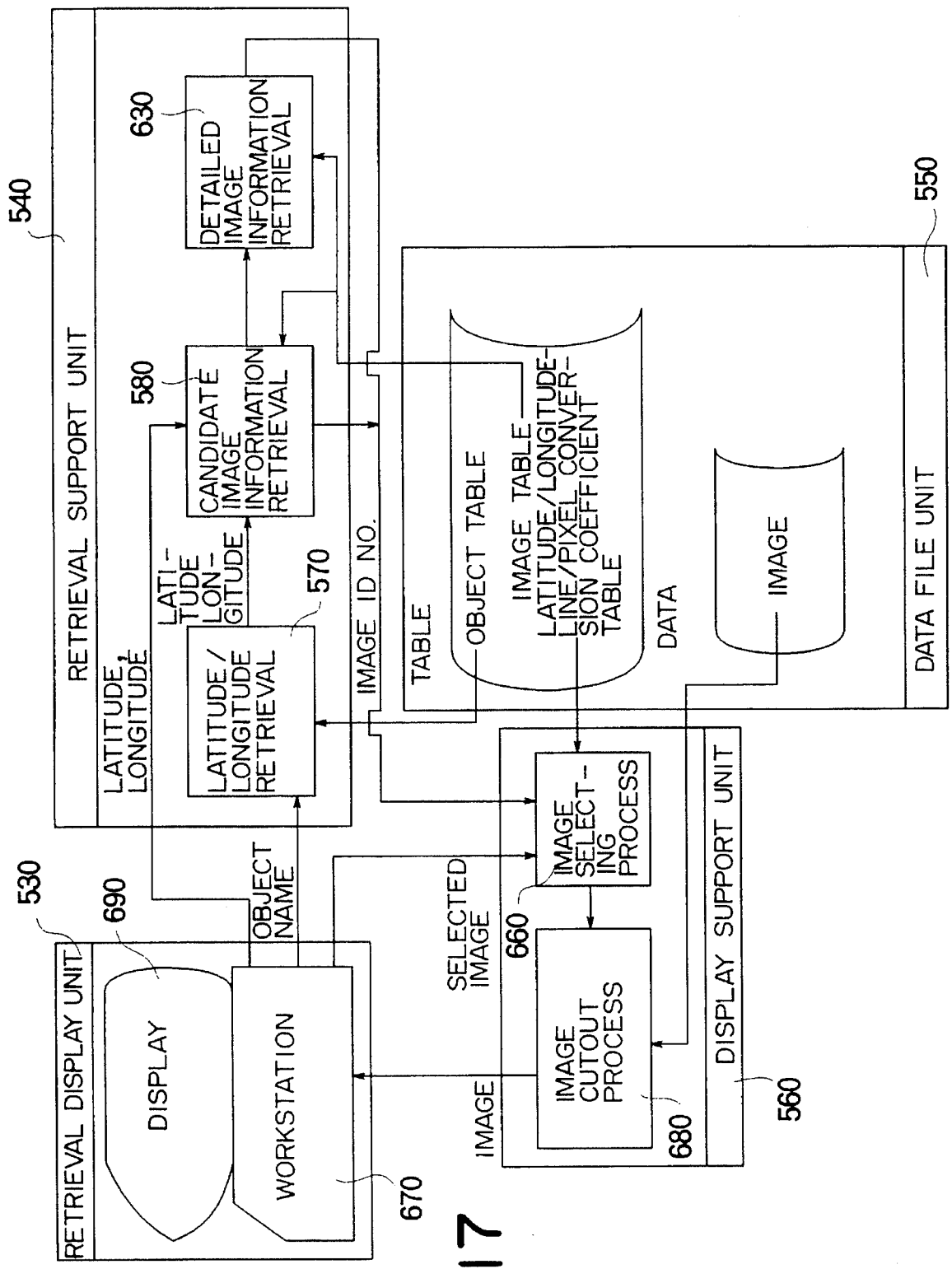
FIG. 17 shows the configuration of an image information database system using a multi-stage retrieving method.

FIG. 17 shows the configuration of an image information database system. Like the first embodiment, this system is constructed of a retrieval display unit 530, a retrieval support unit 540, a data file unit 550, and a display support unit 560. The different point of this embodiment from the first embodiment is the provision of a candidate image information retrieving process 580 in the retrieval support unit 540.

The retrieving method of this embodiment includes two stages. Namely, as shown in FIG. 17, this method includes as the first stage a candidate image information retrieval process 580, and as the second stage a detailed image information retrieving process 630 intended only for candidate image information with possible erroneous detection or discard.

The hardware configuration of this embodiment is the same as that of FIG. 7, and display examples are shown in FIG. 9. Similar to the first embodiment, the data structure of this system uses a relational database RDB, and the retrieval language is an SQL language.

The details of retrieving processes will be given in the following.

(1) Latitude/longitude retrieving process 570

The name of an object to be retrieved is inputted from a workstation 670 to retrieve the latitude and longitude of the object. This process is executed in the same manner as the latitude/longitude retrieving process of the first embodiment. If the latitude and longitude of an object are known beforehand, the latitude/longitude retrieving process 570 is not executed, but the control begins with the next candidate image information retrieving process 580.

(2) Candidate image information retrieving process 580

Next, candidate image information is retrieved.

Figure 18:
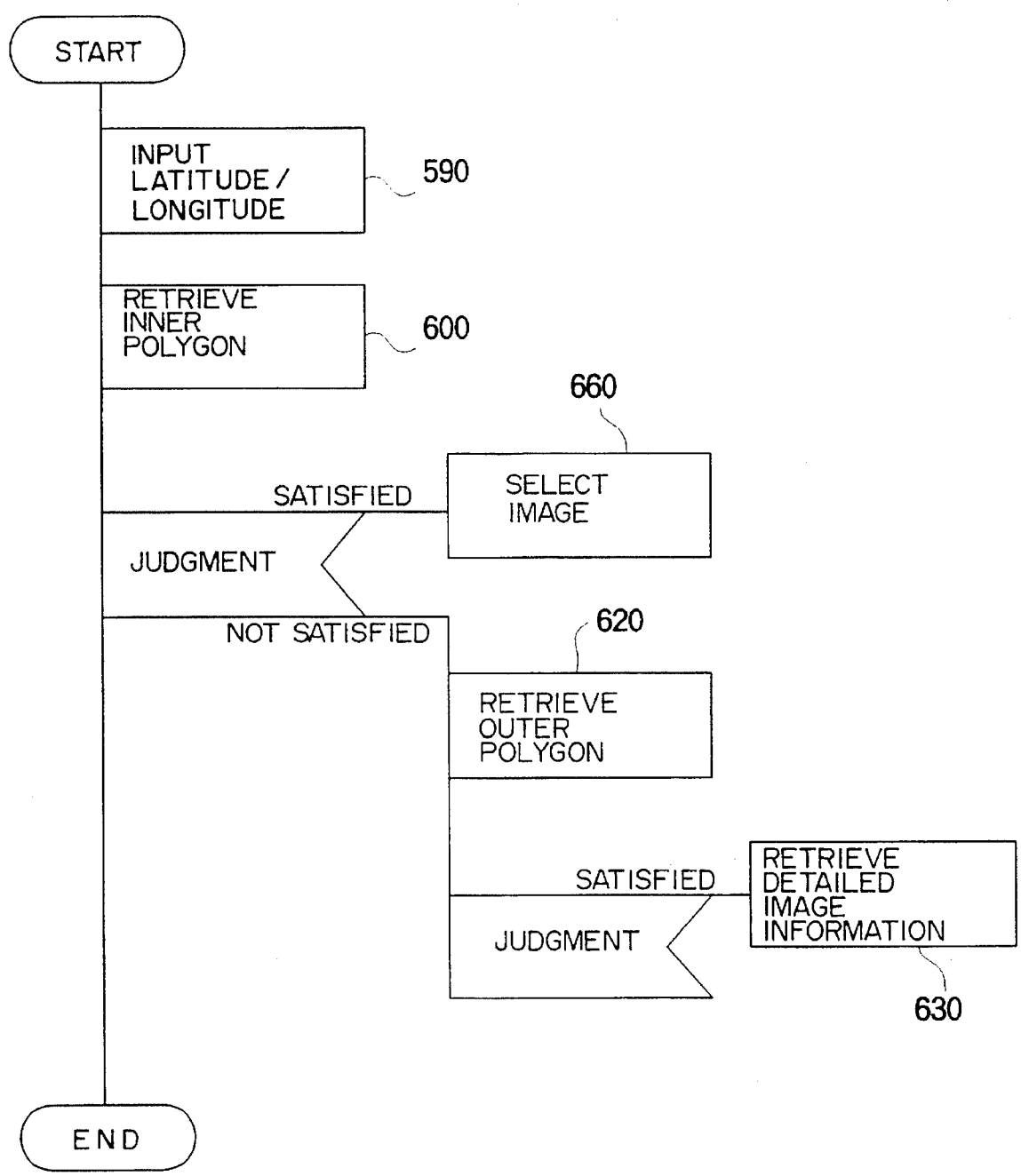
FIG. 18 is a flow chart showing the procedure of a candidate image information retrieving process.
Figure 19:
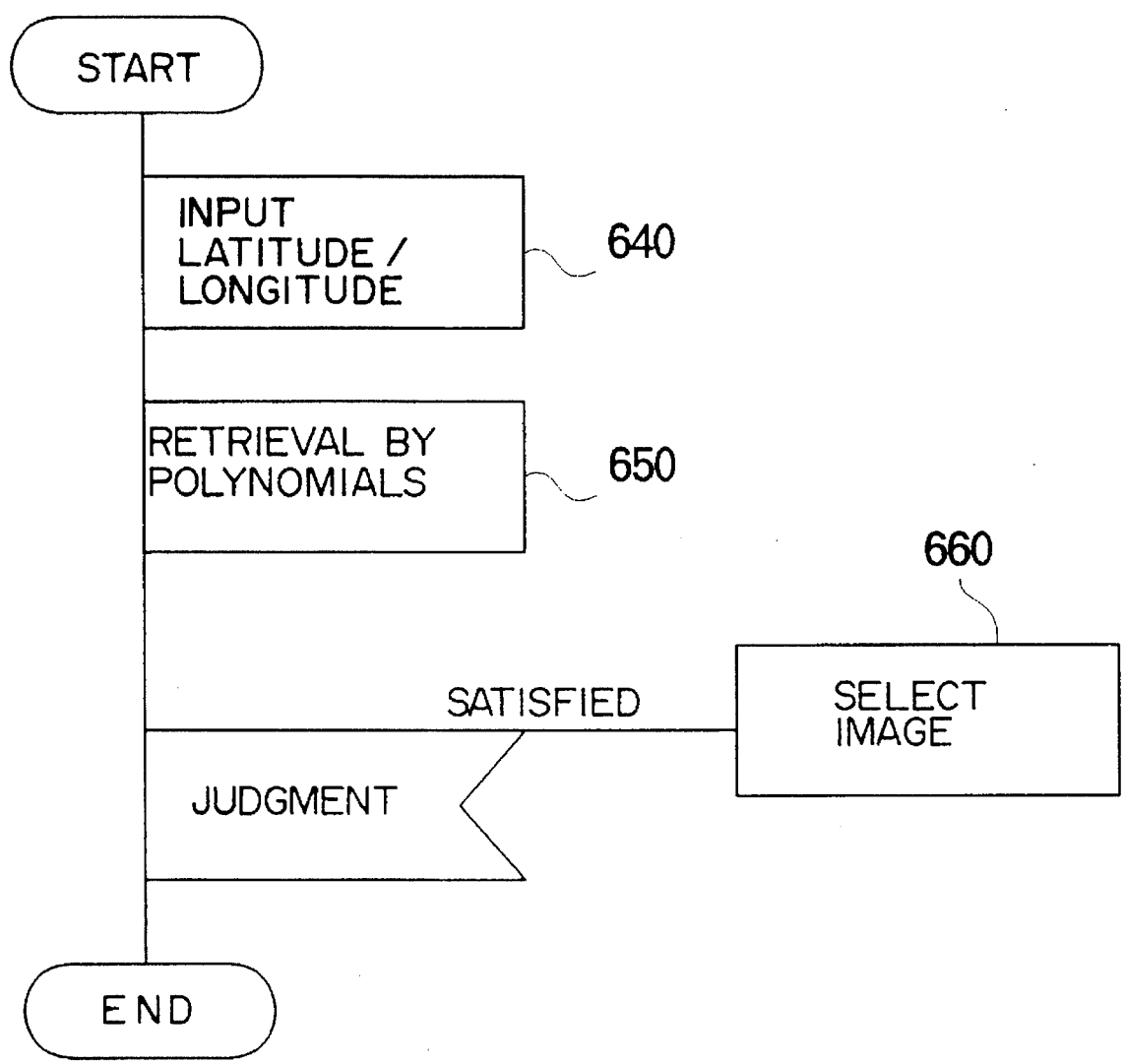
FIG. 19 is a flow chart showing the procedure of a detailed image information retrieving process.

FIG. 18 is a flow chart showing this process. By using as a search key the latitude and longitude retrieved at the latitude/longitude retrieving process 570, this procedure discriminates between fixed and indefinite candidate information while referring to the image table shown in FIG. 12. An inner polygon and outer polygon to be described below have the same definition given with reference to FIGS. 1A, 1B, 2A, and 2B.

As shown in FIG. 18, first a retrieving key or the latitude and longitude of an object are entered (step 590). Next, an inner polygon retrieving step 600 is executed to check whether the latitude/longitude coordinates (a, b) of the retrieving key are within each inner polygon defined by indices.

This inner polygon retrieving step 600 is executed by using the following SQL command, where (Lo1, La1), (Lo2, La2), (Lo3, La3), and (Lo4, La4) represent the four corner latitudes and longitudes of a polygonal image, respectively at the upper left corner, upper right corner, lower left corner, and lower right corner:

```
SELECT      ALL FOUR CORNER                        (17)
            LATITUDES/LONGITUDES
            IMAGE ID NO.
            SENSOR NAME
            SATELLITE NAME
            SENSED DATE
FROM        IMAGE TABLE
WHERE       (a ≧ Lo1 AND a ≧ Lo3)
AND         (a ≦ Lo2 AND a ≦ Lo4)
AND         (b ≧ La3 AND b ≧ La4)
AND         (b ≦ La1 AND b ≦ La2)
```

If the expression (17) is satisfied, an image selecting step 660 is executed, whereas if not, an outer polygon retrieving step 620 is executed by using the following command:

```
SELECT      ALL FOUR CORNER                        (18)
            LATITUDES/LONGITUDES
            IMAGE ID NO.
            SENSOR NAME
            SATELLITE NAME
            SENSED DATE
FROM        IMAGE TABLE
WHERE       (a ≧ Lo1 OR a ≧ Lo3)
AND         (a ≦ Lo2 OR a ≦ Lo4)
AND         (b ≧ La3 OR b ≧ La4)
AND         (b ≦ La1 OR b ≦ La2)
```

If the expression (18) is satisfied, the detailed image information retrieving process 630 is executed, whereas if not, a message "NO RELEVANT INFORMATION" is displayed at the workstation 670.

(3) Detailed image information retrieving process 630

At the detailed image information retrieving process 630, the detailed information of the image retrieved at the candidate image information retrieving process 590, which does not satisfy the conditions of an inner polygon but satisfies the conditions of an outer polygon, is then retrieved.

This retrieving process uses linear polynomials given by the expressions (5) to (8). FIG. 19 is a flow chart showing the detailed image information retrieving process. First, the retrieving key (a, b) and the information retrieved at the candidate image information retrieving process 580 are inputted (at step 640). Next, a retrieving step 650 is executed using the polynomials.

This retrieving step 650 is executed by using the following SQL command, where (Lo1', La1'), (Lo2', La2'), (Lo3', La3'), and (Lo4', La4') represent the four corner latitudes and longitudes of an image retrieved at the candidate image information retrieving process 580, respectively at the upper left corner, upper right corner, lower left corner, and lower right corner:

```
SELECT      ALL FOUR CORNER                        (19)
            LATITUDES/LONGITUDES
            IMAGE ID NO.
            SENSOR NAME
            SATELLITE NAME
            SENSED DATE
FROM        IMAGE TABLE
WHERE       {b ≦ (La1' − La3')(a − Lo1') / (Lo1' − Lo3')
            + La1'
AND         b ≧ (La4' − La3')(a − Lo3') / (Lo4' − Lo3')
            + La3'
AND         b ≦ (La2' − La1')(a − Lo2') / (Lo2' − Lo1')
            + La2'
AND         b ≧ (La2' − La4')(a − Lo4') / (Lo2' − Lo4')
            + La4'
```

Since there are a plurality of retrieved images in most cases, the above command is repeated as many times as the number of retrieved images.

If the expression (19) is satisfied, the retrieved information is subject to an image selecting process 660, whereas if not, a message "NO RELEVANT INFORMATION" is displayed at the workstation 670.

(4) Image selecting process 660

Next, an object image is selected from retrieved candidate images.

This process is similar to the image selecting process 430 of the first embodiment, and the flow chart of this process is shown in FIG. 13. Information of candidate images are displayed at the workstation 670 to allow a user to select an object image from the displayed candidate images.

(5) Image cutout process 680

An area of 512 * 512 pixels of the selected image is cut out, with the object image being placed at the center of the area, and is processed to display it on the screen of the image display unit.

This process is similar to the image cutout process 480 of the first embodiment, and the flow chart of this process is shown in FIG. 14. An area of 512 * 512 pixels of the selected image having the object image at the center thereof is cut out and displayed on the display unit 690.

In the above manner, it becomes possible to check at a high speed whether the information of an inputted retrieving key is being registered in the data file 550 and the key is within an area of a displayed image. At the detailed image retrieving process 630, in addition to performing the above-described procedure, the candidate image information may be thinned and displayed directly on the image display unit to allow a user to visually select an object image.

3rd Embodiment

The third embodiment of the present invention will be described with reference to FIGS. 20 to 24.

Figure 20:
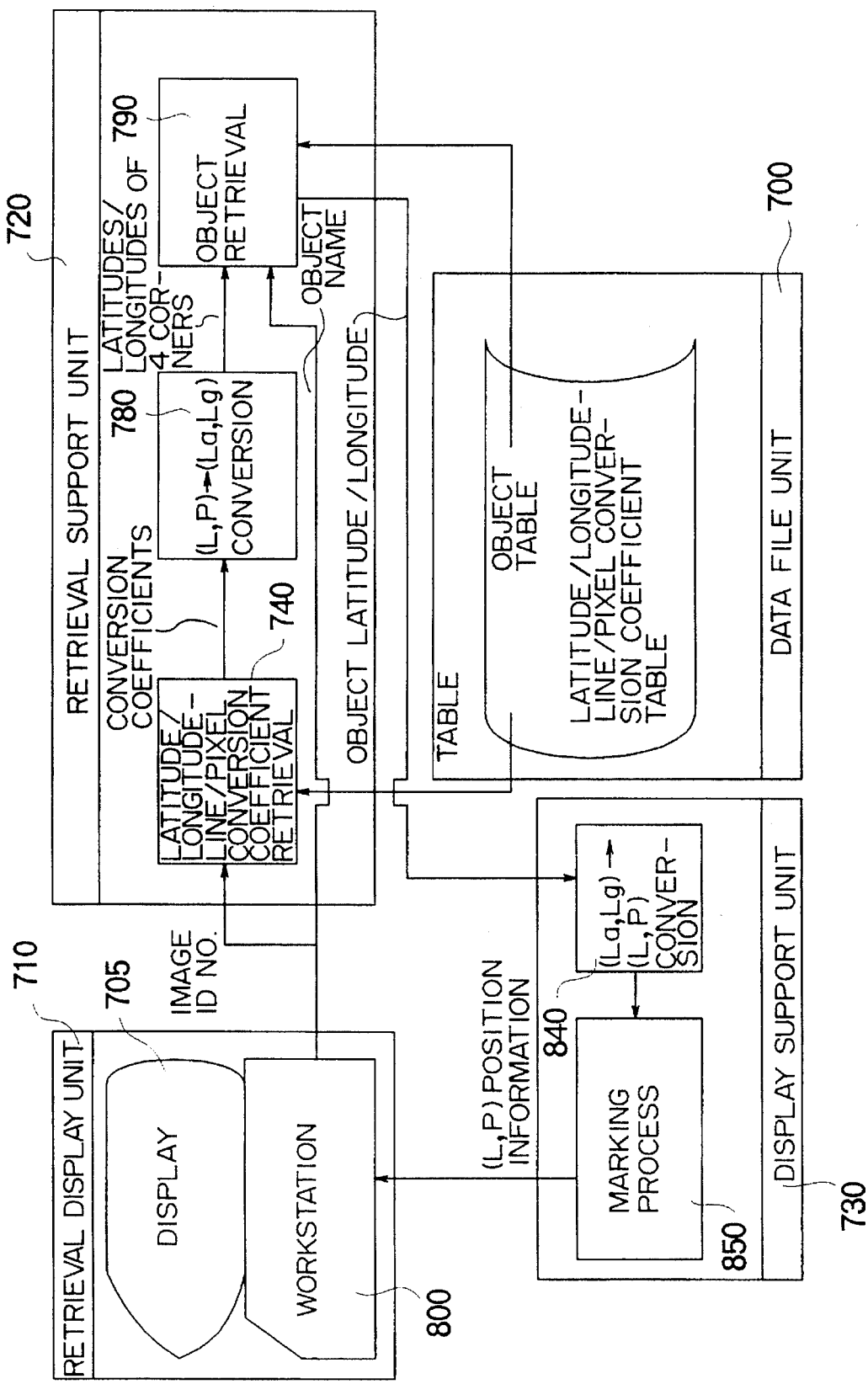
FIG. 20 shows the configuration of an image information database system having an object marking function.
Figure 21:
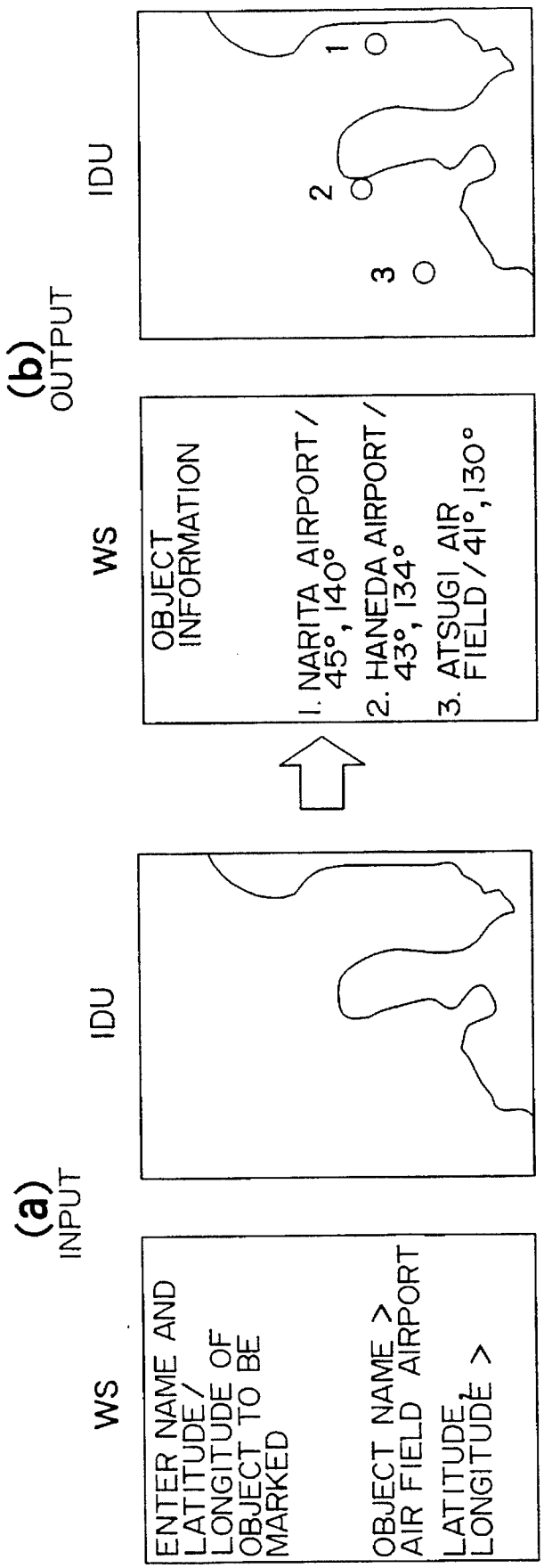
FIG. 21 shows examples of displayed images at a workstation.

FIG. 20 shows the configuration of an image information database system of the third embodiment. This system has a function of allowing a user to mark a position of an object on an image displayed on the screen of a display unit 705. The hardware structure is the same as that shown in FIG. 7. Display examples are shown in FIG. 21.

The system shown in FIG. 20 is constructed of a data file unit 700, a retrieval display unit 710, a retrieval support unit 720, and a display support unit 730. The data file unit 700 stores image data and various tables associated with object images, latitude/longitude-line/pixel conversion coefficients and the like. The retrieval display unit 710 has a display on which an inputted retrieval request and data retrieved from the data file unit 700 are displayed. The retrieval support unit 720 supports a data retrieval operation efficiently. The display support unit 730 supports a display operation such as marking a position of an object on a displayed image. Arrows in FIG. 20 represent the flow of data.

In this embodiment, a position of an object is marked on a thematic mapper image of the Kanto area displayed on an image display unit 705, by way of example. In the following detailed description of the retrieving method, processes similar to those of the first and second embodiments are not described.

(1) Latitude/longitude-line/pixel conversion coefficient retrieving process 740

In this process, the latitude/longitude-line/pixel conversion coefficients for an image to be displayed are retrieved from the latitude/longitude-line/pixel conversion coefficient table shown in FIG. 15, by using as a search key the image identification number.

Figure 22:
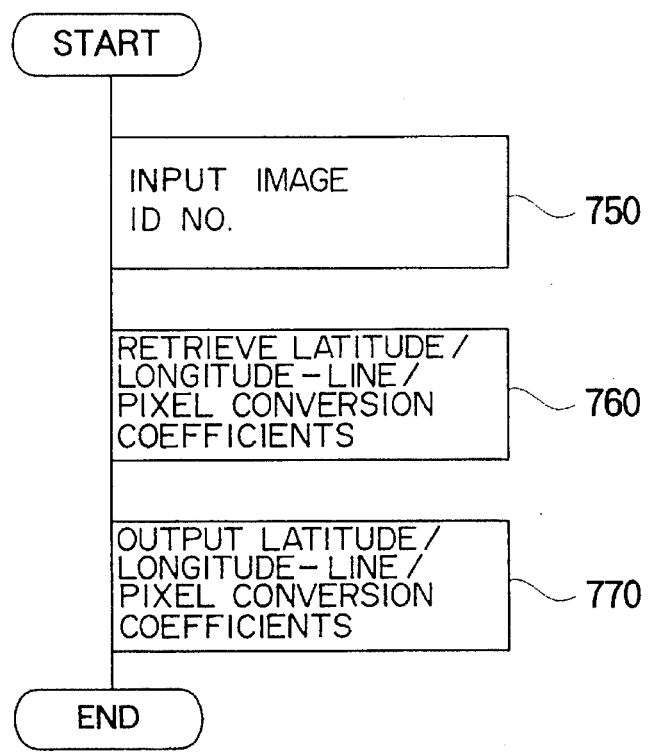
FIG. 22 is a flow chart showing the procedure of a latitude/longitude-line/pixel conversion coefficient retrieving process.

FIG. 22 is a flow chart showing the procedure of the latitude/longitude-line/pixel conversion coefficient retrieving process. First, the image identification number of an image to be displayed is entered (at step 750) to retrieve latitude/longitude-line/pixel coefficients (at step 760). The retrieved latitude/longitude-line/pixel coefficients are outputted (at step 770) to thereafter terminate the procedure.

In retrieving the latitude/longitude-line/pixel conversion coefficients for an image having an image identification number "0031" from the latitude/longitude-line/pixel conversion coefficient table shown in FIG. 15, the following SQL command is executed:

| SELECT | ALL LATITUDE/LONGITUDE-LINE/ PIXEL CONVERSION COEFFICIENTS FROM LATITUDE/LONGITUDE-LINE/ PIXEL CONVERSION COEFFICIENTS TABLE | (20) |
|---|---|---|
| WHERE | IMAGE IDENTIFICATION NUMBER = "0031" | |

With this expression (20), the latitude/longitude-line/pixel conversion coefficients for an image having the image identification number "0013" can be retrieved from the latitude/longitude-line/pixel conversion table. This coefficient retrieval process may be executed when the object image is displayed.

(2) Line/pixel-latitude/longitude conversion process 780

With this process, the four corner line/pixel values of an image, e.g., (1, 1), (1, 512), (512, 1), (512, 512), are converted into the latitude/longitude coordinates by using the conversion function f retrieved at the latitude/longitude-line/pixel conversion coefficients retrieving process 740, in the manner following the expression (16). In this process, the conversion is given by the following expression (21), where (Lo1, La1), (Lo2, La2), (Lo3, La3), and (Lo4, La4) represent the converted four corner latitude/longitude coordinates, respectively at the upper left corner, upper right corner, lower left corner, and lower right corner:

$$(Lo1, La1) = (1/f) (1, 1)$$
$$(Lo2, La2) = (1/f) (1, 512)$$
$$(Lo3, La3) = (1/f) (512, 1)$$
$$(Lo4, La4) = (1/f) (512, 512) \quad (21)$$

(3) Object retrieving process 790

Next, the latitude and longitude and other information of an object are retrieved from the object table, the object entered by a user from a workstation 800 being within an area of the retrieved object image defined by the four corner latitude/longitude values.

Figure 23:
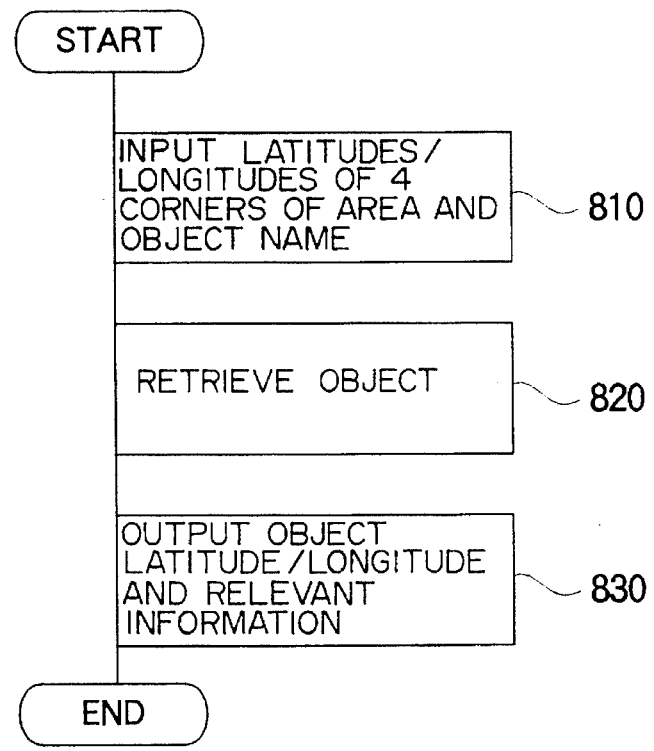
FIG. 23 is a flow chart illustrating an object retrieving process.

FIG. 23 is a flow chart showing the object retrieving process. First, the four corner latitude/longitude values and an object name are entered (at step 810). Retrieved at the next object retrieving step 820 are the latitude/longitude values and other information of the object, on the condition that they have a corresponding object name registered in the object table and the object is within an area of the displayed image defined by the retrieved four corner latitude/longitude values. The retrieved latitude/longitude values and other information are then outputted (at step 830) to thereafter terminate the procedure.

The following expression (22) is a statement of an SQL command for marking the positions of an "airport" and "air field" on a displayed image, wherein (Lo1, La1), (Lo2, La2), (Lo3, La3), and (Lo4, La4) represent the four corner latitude/longitude coordinates, respectively at the upper left corner, upper right corner, lower left corner, and lower right corner of the displayed image, and (a, b) represents the latitude/longitude coordinates of the object to be retrieved:

| SELECT | ALL OBJECT NAMES (LATITUDES, LONGITUDES) SIZE, CONSTRUCTED DATE | (22) |
|---|---|---|
| FROM | OBJECT TABLE | |
| WHERE | OBJECT NAMES LIKE ("% AIRPORT" OR "% AIR FIELD") | |
| AND | $\{ b \leq (La1 - La3)(a - Lo1) / (Lo1 - Lo3) + La1$ | |
| AND | $b \geq (La4 - La3)(a - Lo3) / (Lo4 - Lo3) + La3$ | |
| AND | $b \leq (La2 - La1)(a - Lo2) / (Lo2 - Lo1) + La2$ | |
| AND | $b \geq (La2 - La4)(a - Lo4) / (Lo2 - Lo4) + La4 \}$ | |

By using this expression (22) and the object table, it becomes possible to retrieve the latitude/longitude coordinates and other information of an object within an area of the displayed image defined by the four corner latitude/longitude coordinates. In the above procedure, only a polynomial such as that given by the expression (15) is used for the judgment of an inclusion relationship of the latitude/longitude coordinates. Instead, a two stage retrieval may be incorporated which uses both the SQL command and polynomial as in the case of the candidate image information retrieval and detailed image information retrieval of the second embodiment.

(4) Latitude/longitude-line/pixel conversion process 840

In this process, the latitude/longitude coordinates retrieved at the object retrieving process 790 are converted into line/pixel values in the manner described with the expression (16), by using the latitude/longitude-line/pixel conversion coefficients retrieved at the latitude/longitude-line/pixel conversion coefficients retrieving process 740.

(5) Marking process 850

Next, the position of the retrieved object is marked on the displayed image.

Figure 24:
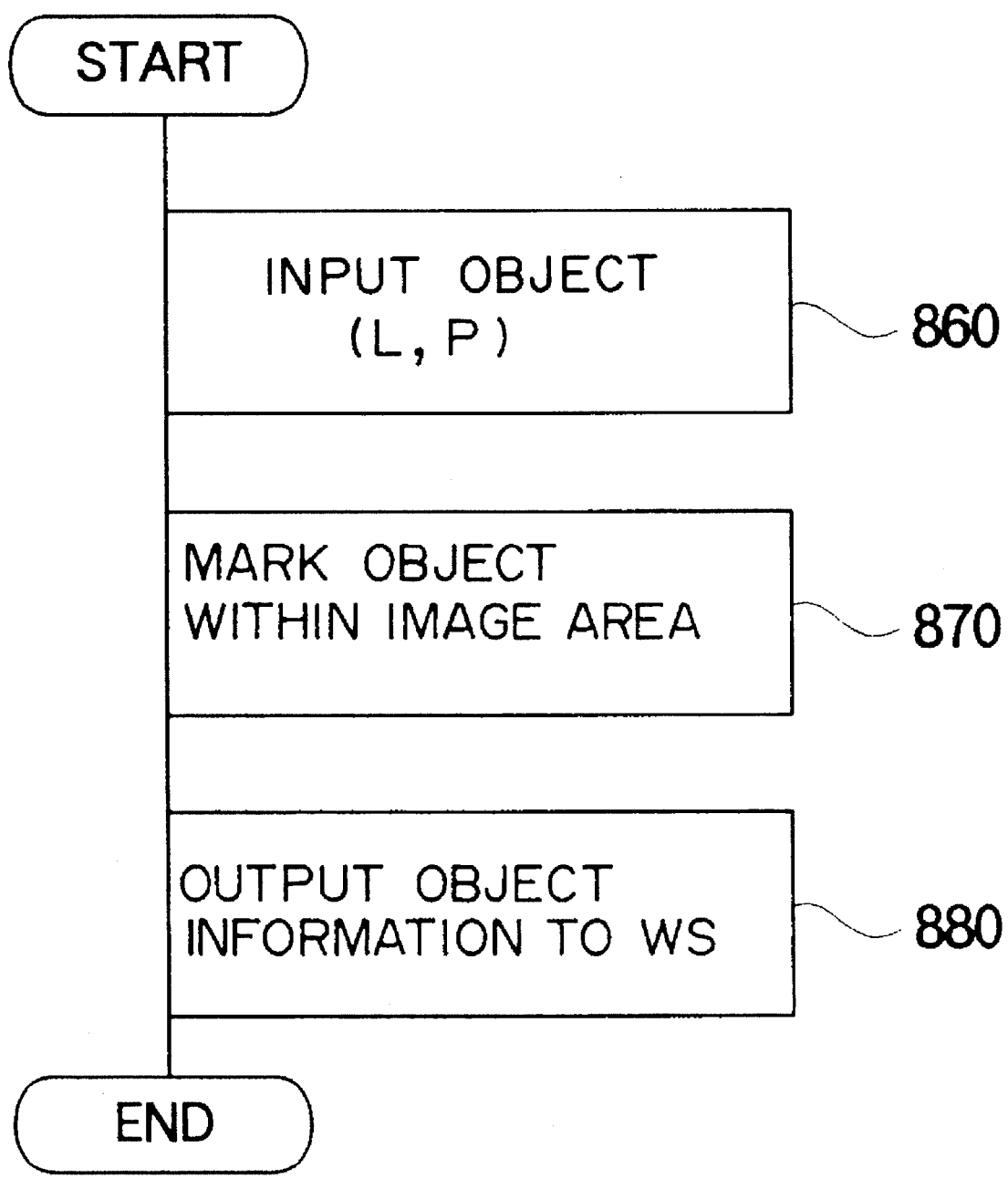
FIG. 24 is a flow chart illustrating a marking process.

FIG. 24 is a flow chart showing the marking process. First, the lines/pixels of the objects converted at the latitude/longitude-line/pixel conversion coefficient retrieving process 740 are entered (at step 860). Then, the positions of the objects are marked on the screen of the display unit as shown in FIG. 21 labeled as an output (b) (at step 870), and the information of the marked objects is displayed at the workstation (at step 880).

In the above manner, it is possible to obtain the positions and information of Haneda Airport and Narita Airport within the displayed image as shown in FIG. 21, labeled as the output (b).

4th Embodiment

An image information database system according to the fourth embodiment of the present invention will be described with reference to FIGS. 25 to 39. This system is intended to be used by local self-governing bodies for the investigation (analysis) in updating a map using a satellite-sensed image or the like.

Figure 25:
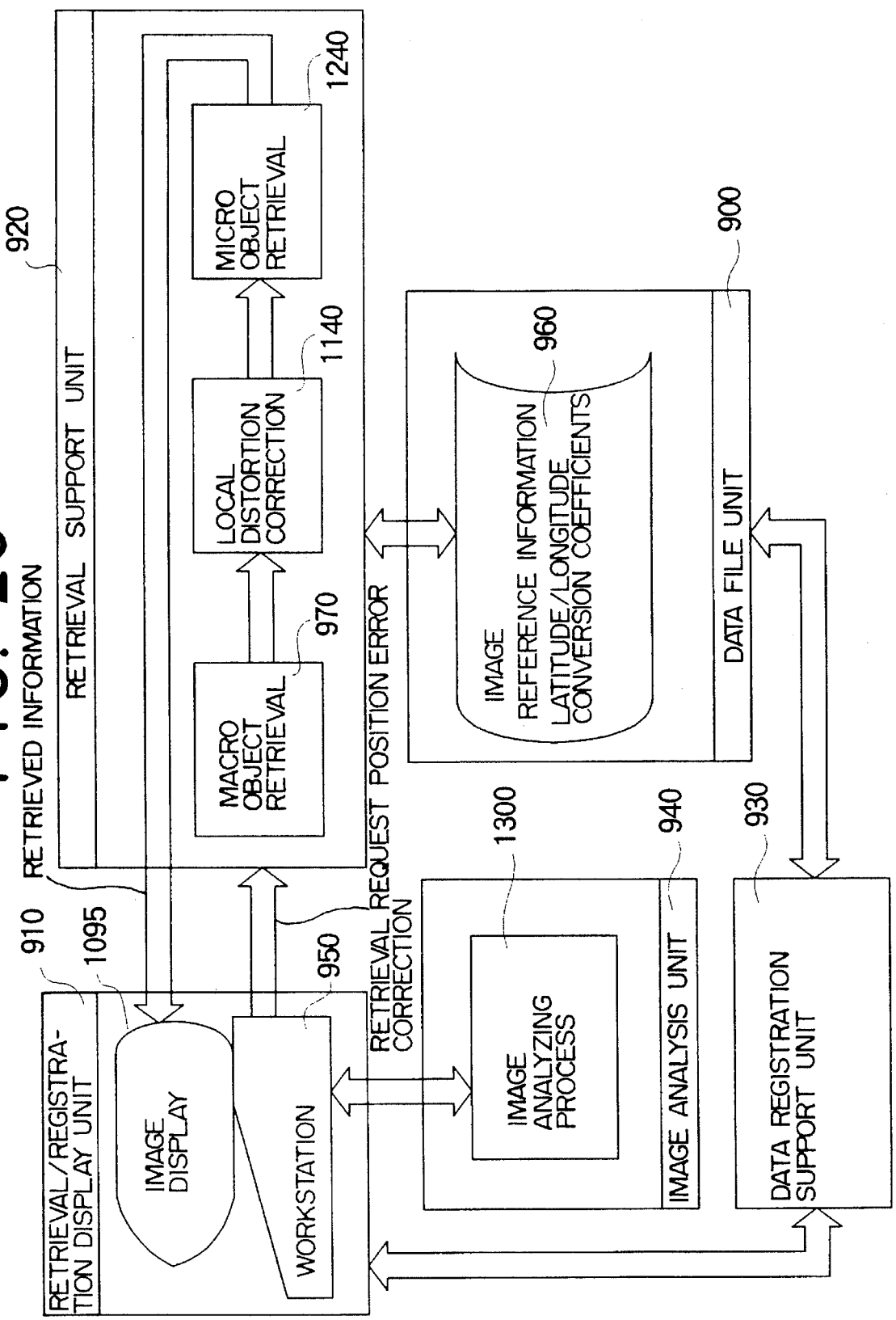
FIG. 25 shows the configuration of an image information database system.

FIG. 25 shows the configuration of the image information database system. This system is constructed of a data file unit 900, a retrieval/registration display unit 910, a retrieval support unit 920, a data registration support unit 930, and an image analysis unit 940. The data file unit 900 stores image data, reference information and latitude/longitude conversion coefficients. The retrieval/registration display unit 910 has a display on which an inputted retrieval request and data retrieved from the data file unit 900 are displayed. The retrieval support unit 920 supports a data retrieval operation efficiently. The data registration support unit 930 operates to prevent data from being registered in duplicate. The image analysis unit 940 analyzes a retrieved image. Arrows in FIG. 25 represent the flow of data.

The data structure of the embodiment system is a relational database RDB, and the retrieval language is an SQL language. Commands used in this embodiment conform with the specification given in a manual of the SQL language. The present invention is not limited only to the SQL language.

The retrieving method of the embodiment system processes an object (hereinafter called a macro object) having a large size relative to a geometric distortion of a satellite image and an object (hereinafter called a micro object) having a small size relative to the geometric distortion, as one group. This system adopts two-stage retrieval to retrieve a final object. Namely, after a macro object is retrieved, a micro object is retrieved. In the following example, the OX Bank near Shinjuku Station is retrieved from an HRV image sensed by a SPOT satellite, and the Bank Building is displayed in a magnified scale.

A retrieval request "Shinjuku Station, OX Bank" is entered from a workstation 950 of the retrieval display unit 910 (the data entry apparatus is not limited to the workstation, but may be other apparatuses so long as they can input and output numerals and characters). In this case, Shinjuku Station and the OX Bank belong to the same group. A method of generating a group will be later described at the registration process.

An HRV image stored in the data file 960 has a geometric distortion of about 200 square meters even after it is corrected. It is assumed that Shinjuku Station is 300 square meters, and the OX Bank is 30 square meters.

(1) Macro object retrieving process 970

Figure 26:
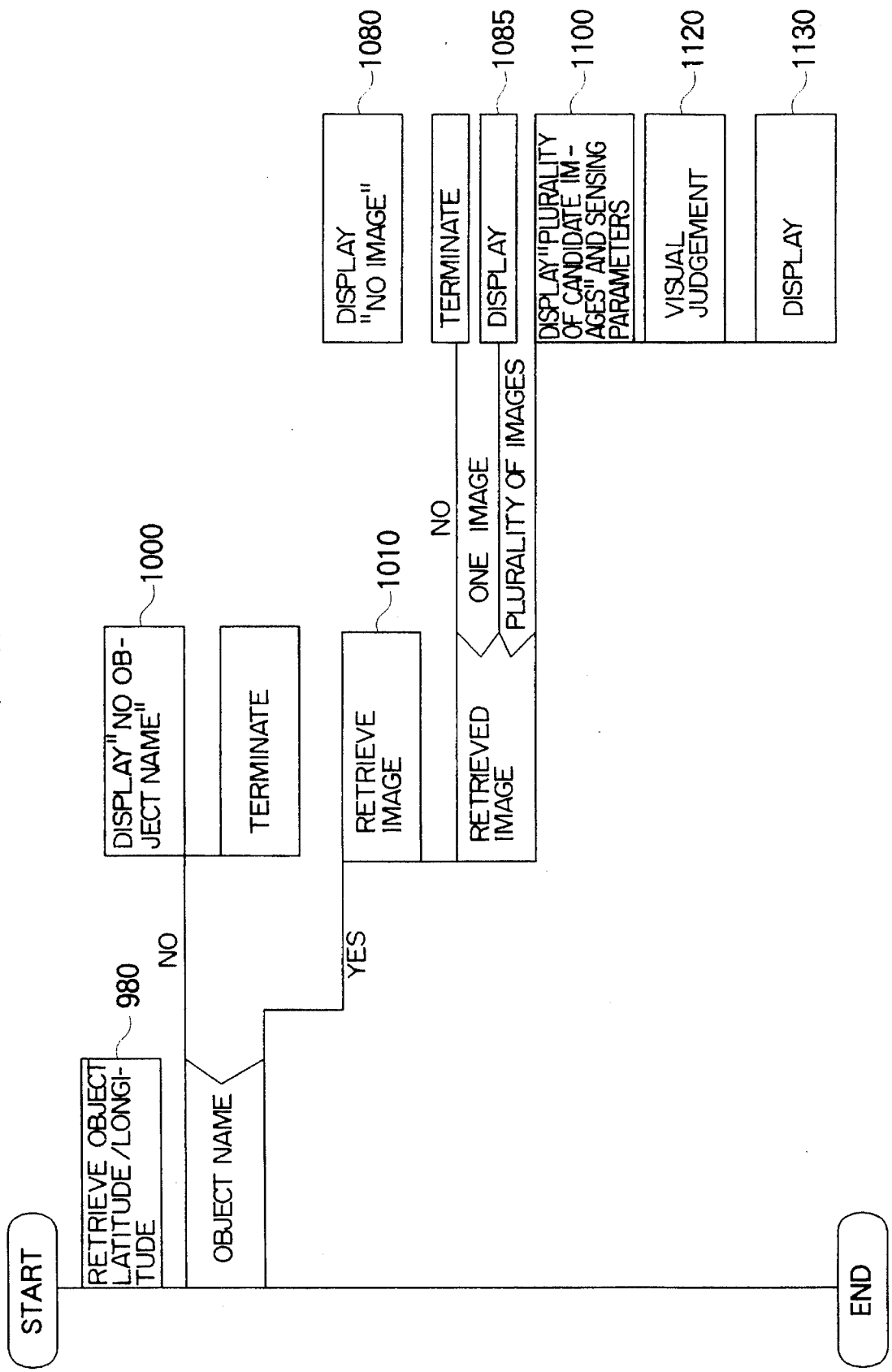
FIG. 26 is a flow chart showing the procedure of a macro object retrieving process.

FIG. 26 is a flow chart showing the macro object retrieving process. Shinjuku Station or a macro object is retrieved following the steps shown in this flow chart. First, the latitude and longitude of an object corresponding to an inputted object name is retrieved (at step 980). Specifically, the latitude and longitude (La, Lo) of Shinjuku Station are obtained from an object table shown in FIG. 27. La stands for the latitude, and Lo stands for the longitude. The records (rows) of the object table include an object name, the latitude and longitude of an object, and the like. The number of rows is as many as that of objects.

For example, the following command is used to retrieve the latitude and longitude of Shinjuku Station:

| SELECT | ALL (LATITUDES, LONGITUDES) INTO DA | (23) |
|---|---|---|
| FROM | OBJECT TABLE | |
| WHERE | OBJECT = 'SHINJUKU STATION' | |

With this command, the latitude and longitude of Shinjuku Station are retrieved from the object table by using the object name as a search key.

If the object name is not present, a message "NO OBJECT NAME" is displayed at the workstation 950 (at step 1000) to thereafter terminate the procedure. If the object name is present, the next image retrieving step 1010 is executed.

Figure 29:
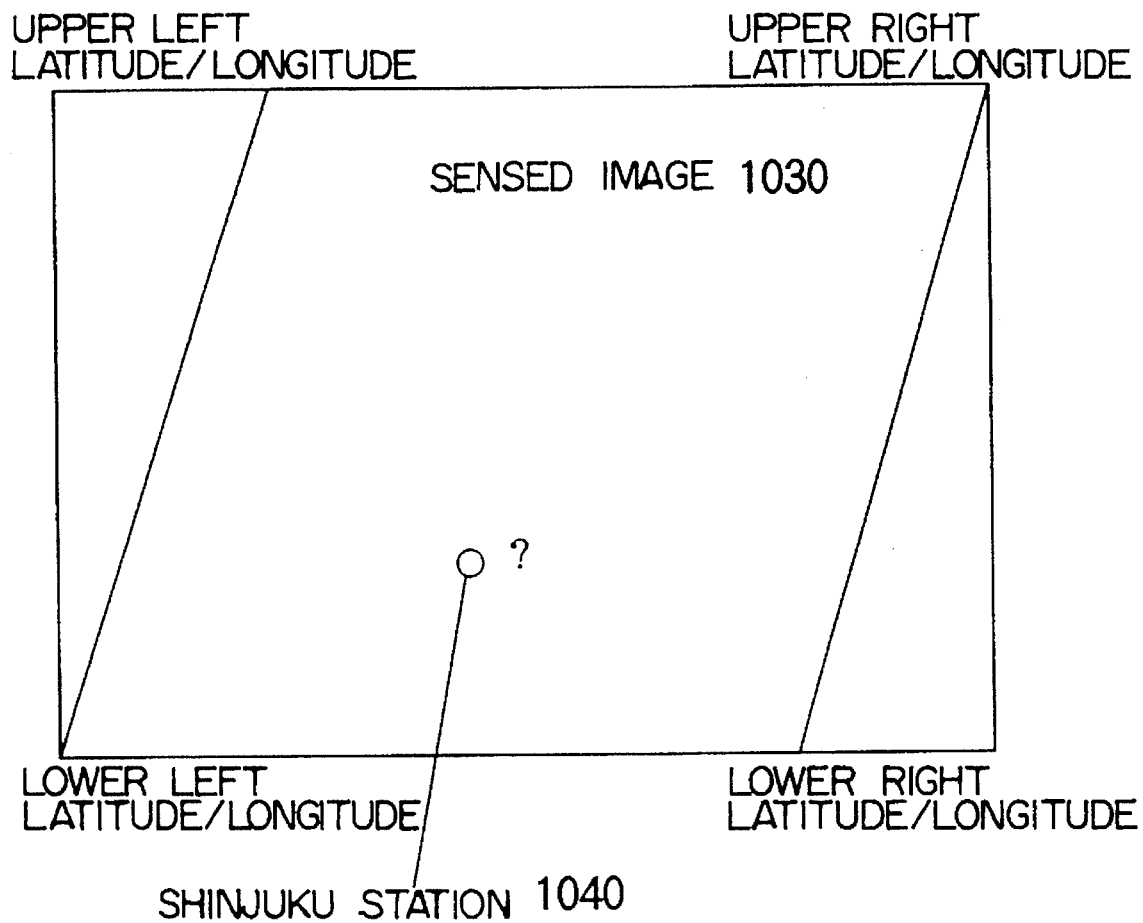
FIG. 29 is a diagram explaining the inclusion relationship between a sensed image and an object to be retrieved.

At this image retrieving step 1010, a sensed image 1030 shown in FIG. 29 is retrieved while referring to an image table shown in FIG. 28, and while and checking the inclusion relation as to whether Shinjuku Station is included within the image 1030. The image table stores an image identification number of an image stored in the data file unit, and various sensing parameters such as a sensor type, a path/row (corresponding to an identification address of a satellite sensing site), the four corner latitudes and longitudes of a sensed image, a sensed date, a cloud amount, and a sensor sensing angle.

Figure 30:
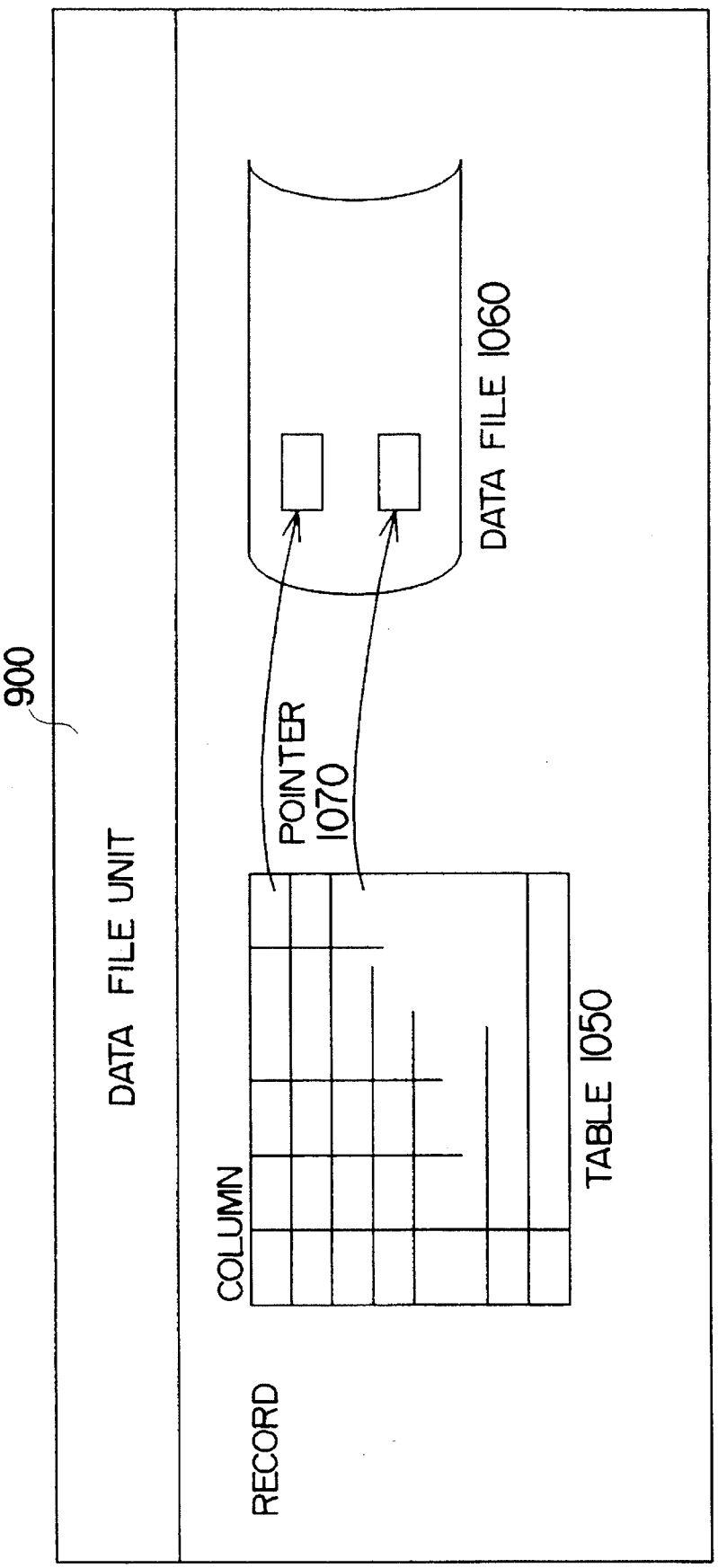
FIG. 30 is a diagram showing the relationship between the table and a data file.
Figure 32:
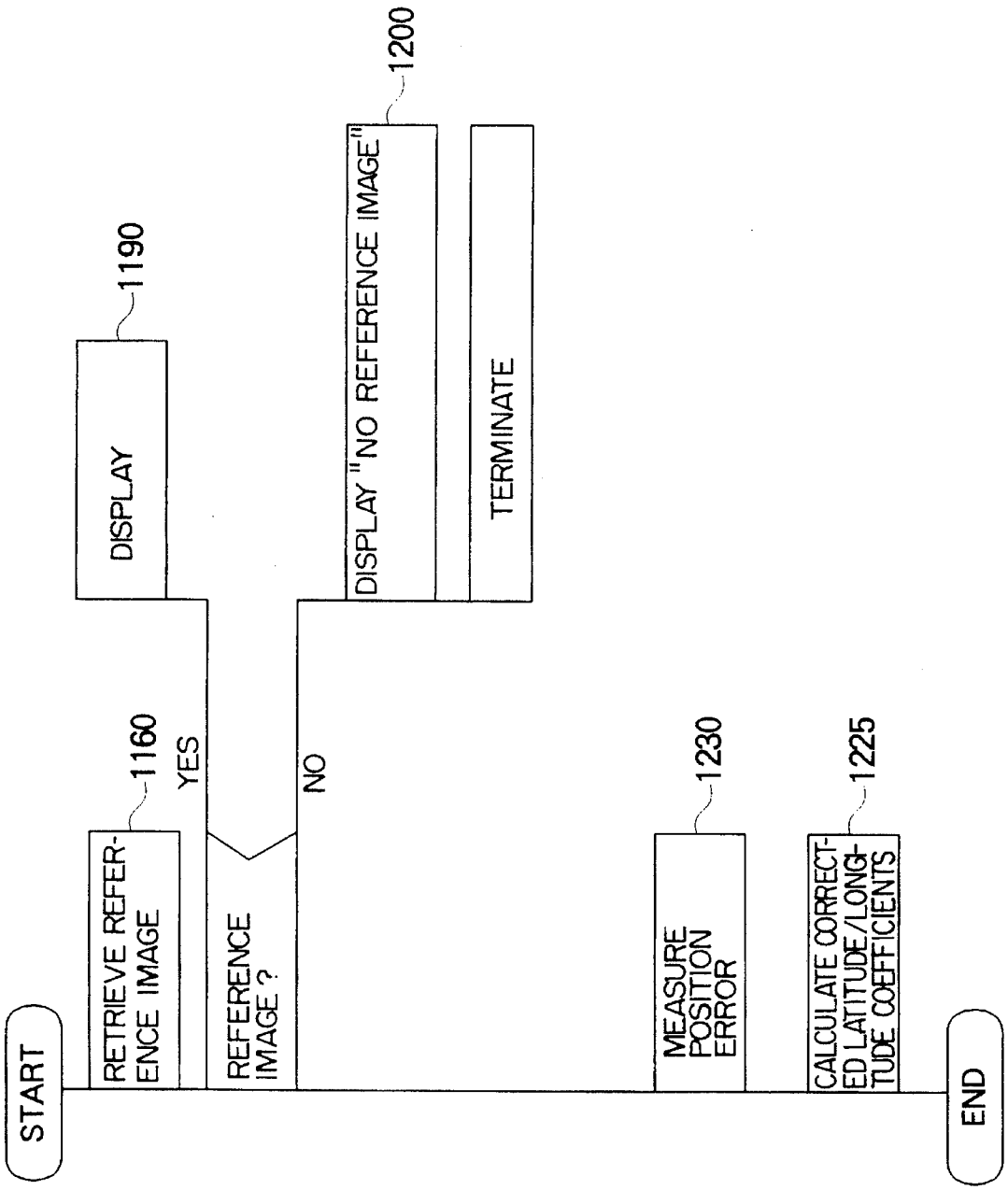
FIG. 32 is a flow chart showing the procedure of a local distortion correcting process.

As shown in FIG. 30, the data file unit 900 has a table 1050 storing information relationships and a data file 1060 storing a great amount of data, both being related to each other by pointers (identification numbers) 1070. For example, for images in the data file unit 900, provided are an image table storing sensing parameters, and an image file storing image data, both being related to each other by image identification numbers.

An image identification number of an image including an object having the latitude/longitude (a, b) is retrieved by using the following command:

| SELECT | ALL IMAGE IDENTIFICATION NUMBER INTO DA | (24) |
|---|---|---|
| FROM | IMAGE TABLE | |
| WHERE | (a $\leq$ UPPER RIGHT LATITUDE OR a $\leq$ UPPER LEFT LATITUDE) | |
| AND | (a $\geq$ LOWER RIGHT LATITUDE OR a $\geq$ LOWER LEFT LATITUDE) | |
| AND | (b $\leq$ UPPER RIGHT LONGITUDE OR b $\leq$ LOWER RIGHT LONGITUDE) | |
| AND | (b $\geq$ UPPER LEFT LONGITUDE OR b $\geq$ LOWER LEFT LONGITUDE) | | where $a \geq b$ means that a is equal to b or larger, $a \leq b$ means that a is equal to b or smaller, OR and AND mean a logical sum and product, respectively. The upper right latitude, upper left latitude, lower right latitude, lower left latitude, lower right longitude, upper left longitude, and lower left longitude correspond to the four corner latitudes and longitudes of one scene of a sensed image shown in FIG. 29.

If there is no image identification number satisfying the expression (24), a message "NO CANDIDATE IMAGE TO BE RETRIEVED" is displayed at the work station as shown in FIG. 31A to thereafter terminate the macro object retrieving process 970. If there is one image identification number, the corresponding image is transferred from the image file to an image display unit 1050 to display it (at step 1085). If there are a plurality of image identification numbers, the candidate image identification numbers and their sensing parameters are displayed at the workstation 950 (at step 1100). A user performs a visual check of the displayed contents (at step 1120) to select a proper image and derive it out of the data file 1060 for the display thereof (at step 1130).

(2) Local distortion correcting process 1140

This process corrects conversion coefficients to be used for the conversion from latitude and longitude to line and pixel, or vice versa, within an area including a group of macro and micro objects. These conversion coefficients are herein called latitude/longitude conversion coefficients. The latitude/longitude coefficients before correction are calculated in advance at the stage of the pre-process of a satellite earth station to be described later, and stored in a latitude/longitude conversion coefficient file.

Images and latitude/longitude conversion coefficients are related to each other by latitude/longitude conversion coefficient identification numbers.

Figure 1:
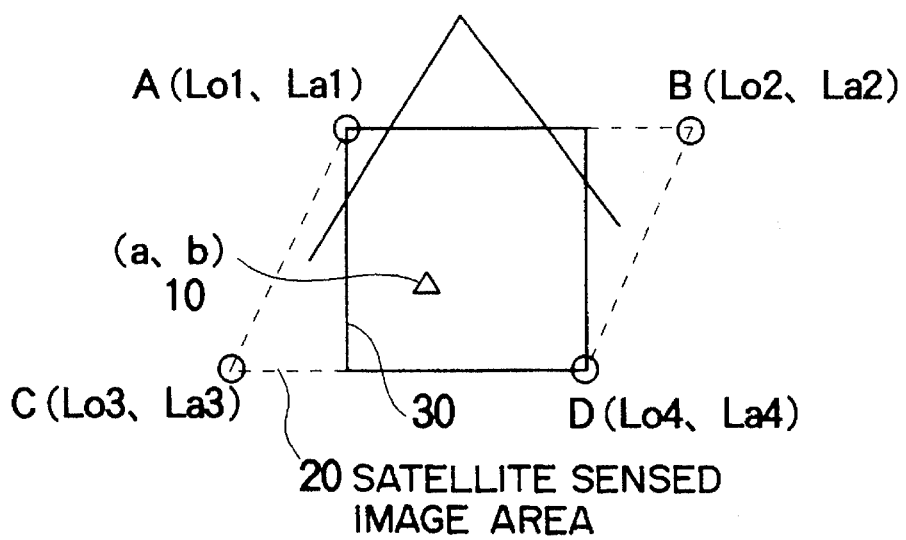
FIG. 1 illustrates examples of erroneous discard generated when retrieving a satellite-sensed image.
Figure 2:
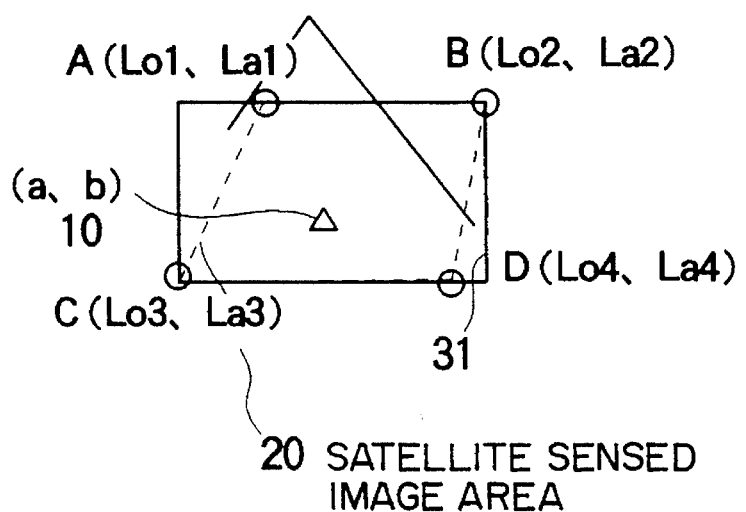
FIG. 2 illustrates examples of erroneous retrieval of a satellite-sensed image.
Figure 3:
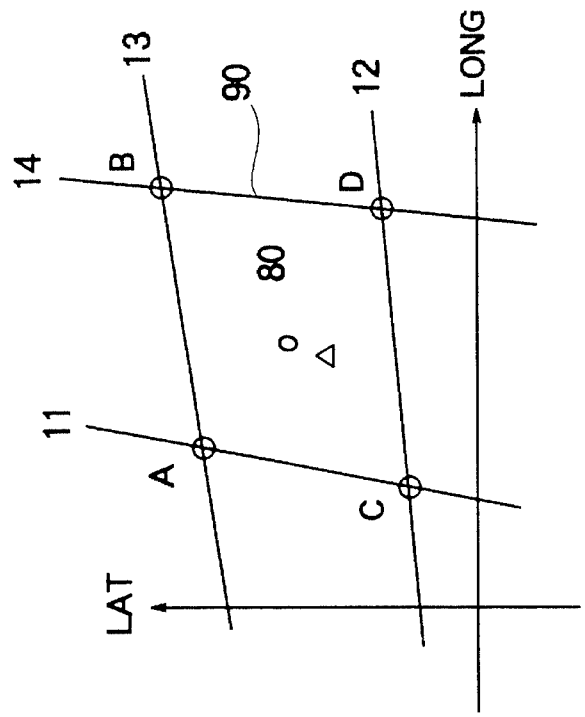
FIG. 3 is a diagram briefly explaining a retrieving method using polynomials.
Figure 4:
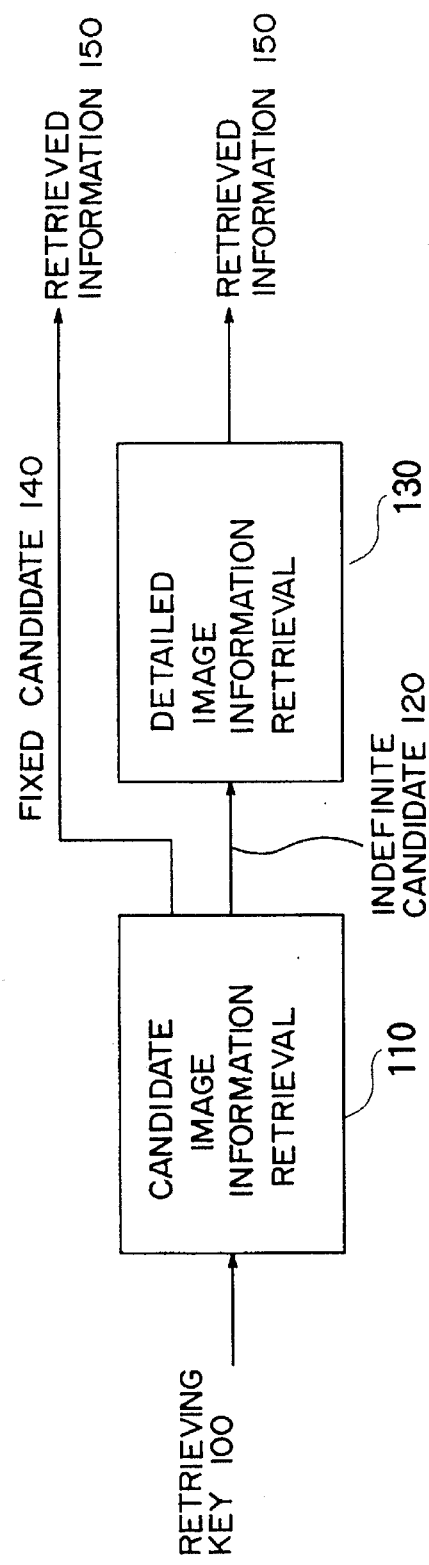
FIG. 4 is a block diagram showing a multi-stage retrieving method.

The latitude/longitude conversion coefficients are corrected in the manner described in the flow chart of FIG. 2 showing the local distortion correcting process. A reference image for Shinjuku Station is retrieved from a reference table shown in FIG. 33 (at step 1160).

Figure 34:
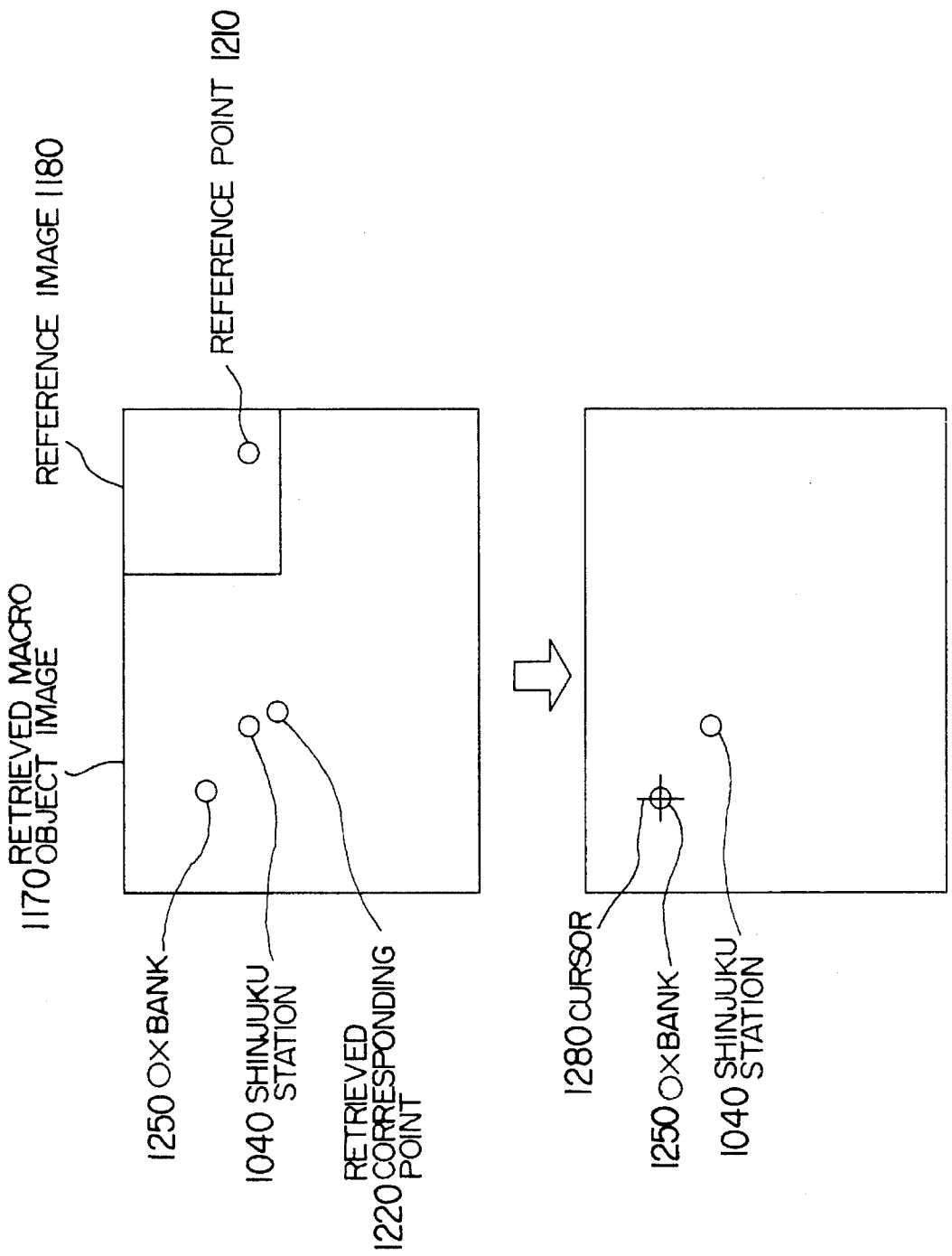
FIG. 34 shows examples of a retrieved image and reference image.
Figure 36:
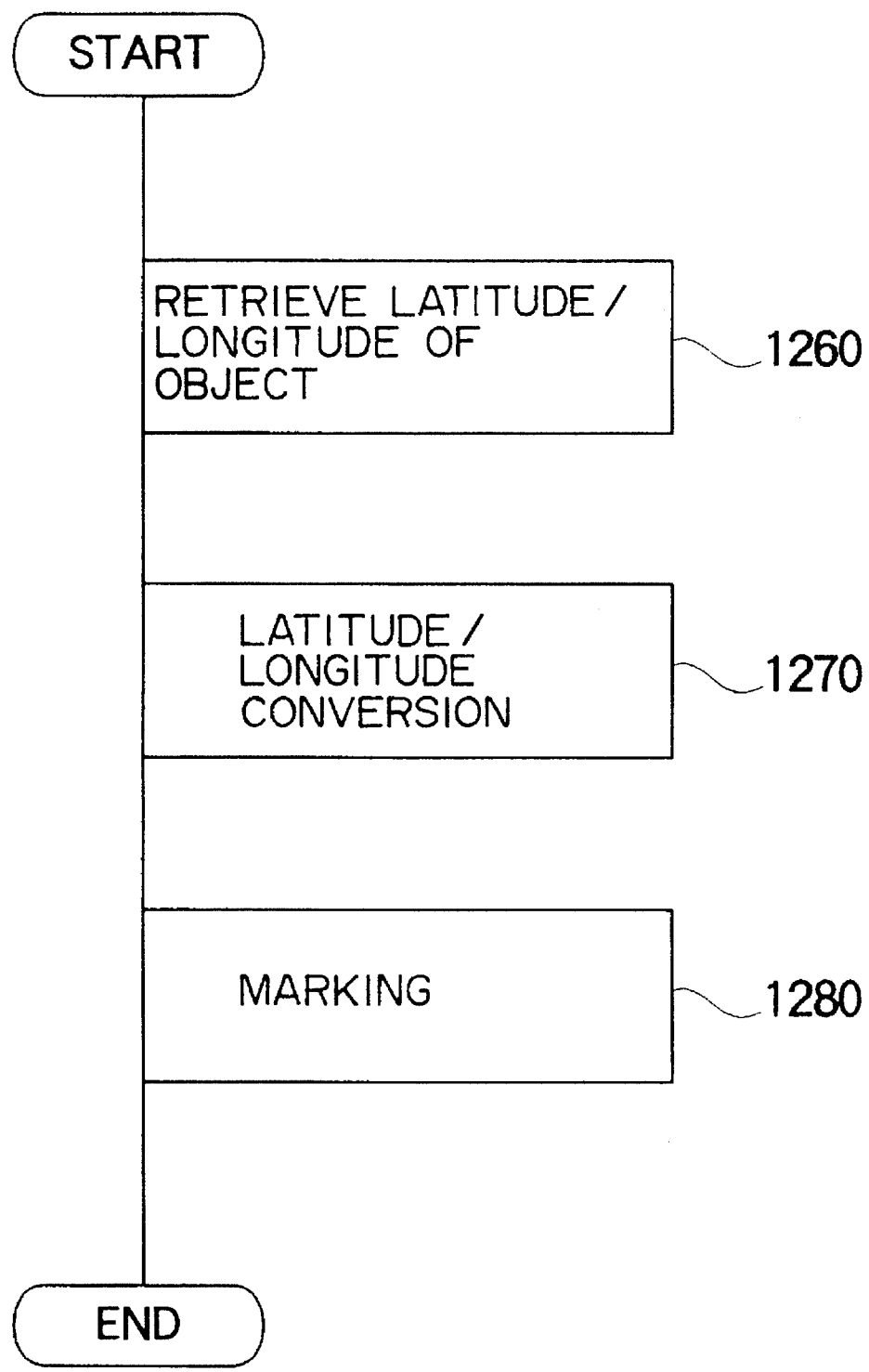
FIG. 36 is a flow chart showing processing of a micro object retrieval.

FIG. 34 shows a retrieved image 1170 of a macro object. This image 1170, which was retrieved the macro object retrieving process 970, and the reference image 1180 are displayed side by side on the image display unit 1095.

The reference image 1180 is retrieved by the following command:

| | | |
|---|---|---|
| SELECT | ALL REFERENCE IMAGE IDENTIFI-<br>CATION NUMBER INTO DA | (25) |
| FROM | REFERENCE TABLE | |
| WHERE | OBJECT = "SHINJUKU STATION" | |

If the reference image 1180 is present, it is retrieved from the image file and displayed on the image display unit 1095 (at step 1190). If the reference image is not present, a message "NO REFERENCE IMAGE" is displayed at the workstation (at step 1200) to thereafter terminate the local distortion correcting process 1140.

The reference image 1180 and the retrieved macro object image 1170 are displayed side by side on the image display unit. A coordinate error amount (dL, dP) between a reference point 1210 confirmed by eye on the reference image and a corresponding point 1220 obtained by retrieval on the retrieved macro object image 1170 is measured (at step 1230). The error amount corresponds to a distance between the corresponding point 1220 and Shinjuku Station 1040 on the macro object image 1170. dL represents an error amount in the line direction, and dP represents an error amount in the pixel direction.

The latitude/longitude conversion expressions are defined as follows:

$$(L, P) = f(Lo, La) \quad (26)$$

$$(Lo, La) = g(L, P) \quad (27)$$

where La represents a latitude, L0 represents a longitude, L represents a line, and P represents a pixel.

The expression (26) is a conversion expression for converting from latitude and longitude to line and pixel, and the expression (27) is a conversion expression for the conversion from line and pixel to latitude and longitude. Function f and g are represented by a polynomial.

The coefficients of the polynomial are calculated in advance when the geometric distortion of an image is corrected.

The present invention is not limited to a polynomial only. In this embodiment, the following affine transformation expressions are used:

$$L = f_L(Lo, La) = a_0 + a_1 Lo + a_2 La \quad (28)$$

$$P = f_P(Lo, La) = b_0 + b_1 Lo + b_2 La \quad (29)$$

$$Lo = g_{Lo}(L, P) = c_0 + c_1 L + c_2 P \quad (30)$$

$$La = g_{La}(L, P) = d_0 + d_1 L + d_2 P \quad (31)$$

By using the error amount (dL, dP), the coefficients of the polynomials are corrected to calculate the corrected latitude/longitude conversion coefficients (at step 1225).

$$f_L(Lo, La) + dL = F_L(Lo, La) \quad (32)$$

$$f_P(Lo, La) + dP = F_P(Lo, La) \quad (33)$$

$$g_{Lo}(L+dL, P+dP) = G_{Lo}(L, P) \quad (34)$$

$$g_{La}(L+dL, P+dP) = G_{La}(L, P) \quad (35)$$

The coefficients of the polynomial are herein called corrected latitude/longitude conversion coefficients.

The corrected latitude/longitude conversion coefficients as well as those before correction are supervised by a latitude/longitude conversion coefficient table shown in FIG. 35, using identification numbers. The coefficients themselves are stored in the latitude/longitude conversion coefficient file.

The corrected latitude/longitude coefficients are provided for each small area of a sensed image forming a group. For example, the size of a small area may be an area of 512 pixels * 512 pixels square comparable with the image size of the image display unit. The time period for storing the corrected latitude/longitude conversion coefficients is set to a period while an object image is analyzed in order to avoid executing the correction again, although the period depends on the capacity of the data file.

(3) Micro object retrieving process 1240

The latitude and longitude (a, b) of the OX Bank 1250 or micro object are retrieved from the object table shown in FIG. 27.

Namely, the following SQL command is used to retrieve the latitude and longitude (a, b) of the OX Bank 1250 from the object table (at step 1260):

| | | |
|---|---|---|
| SELECT | ALL (a, b) INTO DA | (36) |
| FROM | OBJECT TABLE | |
| WHERE | OBJECT = "OX BANK" | |

Next, at a latitude/longitude conversion step 1270, the position (L, P) of the OX Bank 1250 on the displayed image is obtained by using the corrected latitude/longitude conversion coefficients of the polynomial F by using the following expressions:

$$L = F_L(a, b) \quad (37)$$

$$P = F_P(a, b) \quad (38).$$

The coordinates (L, P) correspond to the correct position of the micro object, and the corresponding coordinates on the image display unit 1095 are marked with a colored cursor 1280 (at step 1290).

In the above manner, a micro object can be retrieved and displayed.

(4) Image analyzing process 1300

The image of the retrieved micro object is processed. An image processing command is entered from the workstation 950 to the image analysis unit 940, and the processed results are displayed on the image display unit 1095. In this case, a magnification process is executed with the OX Bank 1250 being positioned at the center of the image. The magnification process may be performed by a cubic convolution process described in "Image Data Processing and Analysis (1)" compiled by the Foundation of Earth Resource Satellite Data Analysis Center, published in March 1991, at pp. 137 to 141.

In the above manner, it is possible to retrieve the OX Bank 1250 from an HRV image having an indefinite position, and process the object image.

In the following, a method of calculating latitude/longitude coefficients and a method of registering object data will be given.

(5) Calculation of latitude/longitude coefficients

The latitude/longitude conversion functions f and g, before correction, can be calculated beforehand when a satellite earth station receives an image and corrects a geometric distortion. For example, the latitude/longitude coordinates of the positions of one line and one pixel can be identified at the geometric distortion correcting process, so that the line/pixel coordinates can be related to the latitude/longitude coordinates. The latitude/longitude conversion coefficients for the expressions (28) to (31) can be calculated by using the corresponding four corner coordinates.

The geometric distortion correcting process may be performed, for example, by a method described in "Precise Correction Technique for Earth Observation Satellite" imagery in the Journal of the Institute of Electrical Engineers of Japan, edited by Kouich IHARA, Yasunari YAMAMOTO, vol. 101, No. 4, at pp. 317 to 324.

In the above embodiment, latitude/longitude coordinates are used as a retrieving key or indices. Instead of latitude/longitude coordinates, line/pixels may be used. In this case, the correspondence between the retrieving key and indices can be obtained directly from line/pixel coordinates.

If line/pixel coordinates are used as the retrieving key or indices, conversion from latitude and longitude to line and pixel is not necessary.

Calling a macro object a "parent" and a micro object a "child", the coordinates of the position of the parent may be defined by using an absolute coordinate system of an image or map, and the coordinates of the position of the child may be defined by a displacement from the parent coordinates. This method affects the configuration of the object table. Four alternatives of the object table shown in FIG. 27 are shown in FIG. 37.

Figures 37A, 37B:
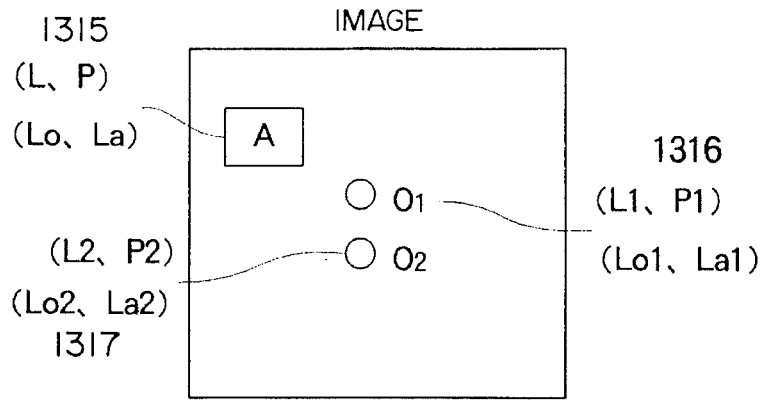
FIGS. 37A and 37B illustrate alternative object tables.

In FIG. 37A, a character "A" 1315 represents a macro object, and $o_1$ 1316 and $o_2$ 1317 each represent a child. The coordinates of the objects on an image are (L, P), (L1, P1), and (L2, P2), and the coordinates of the objects on a map are (Lo, La), (Lo1, La1), and (Lo2, La2). The displacements of the coordinates from the parent are represented by ($\Delta$L1, $\Delta$L2) and ($\Delta$Lo1, $\Delta$La1) on the image and by ($\Delta$L2, $\Delta$P2) and ($\Delta$Lo2, $\Delta$La2) on the map.

The displacements of the micro object $o_1$ 1316 are defined by:

$$\Delta L1 = L - L1 \quad (39)$$

$$\Delta P1 = P - P1 \quad (40)$$

$$\Delta Lo1 = Lo - Lo1 \quad (41)$$

$$\Delta La1 = La - La1 \quad (42)$$

The displacements of the micro object $o_2$ 1317 are defined in the same manner. Referring to FIG. 37B, with method 1, both the parent and children are defined by coordinates on the map. With method 2, both the parent and children are defined by the coordinates represented by coordinates on the image. With method 3, both the parent and children are defined by coordinates on the map, and the children are defined by their respective displacements from the parent. With method 4, both the parent and children are defined by coordinates on the image, and the children are defined by their respective displacements from the parent.

In this embodiment, the method 1 is adopted. The other methods may be used with the system configuration shown in FIG. 25. With the methods 2 and 4, the conversion procedure from latitude and longitude to line and pixel is not necessary. With the methods 3 and 4, it is necessary to register displacements of the children in the object table, in place of the latitudes and longitudes of the children.

The fourth embodiment having the system configuration shown in FIG. 25 has been described above, putting emphasis mainly upon the retrieving method. A problem of an indefinite position of an object may occur when registering data. For example, it is conceivable that the accuracy of latitude/longitude conversion coefficients can be made better than the accuracy obtained in the past, because various new pieces of information can be supplied as time lapses. However, such an improved accuracy may cause a possible duplicate registration of data.

If data is stored in the data file in duplicate, this data is out of control by a user, resulting in a lower reliability of the information stored in the database. This problem can be solved by the following method using an image information database system configured as shown in FIG. 38. A different point from the system shown in FIG. 25 is the provision of a registration support unit 930 more sophisticated than the unit 930 shown in FIG. 25.

Figure 39:
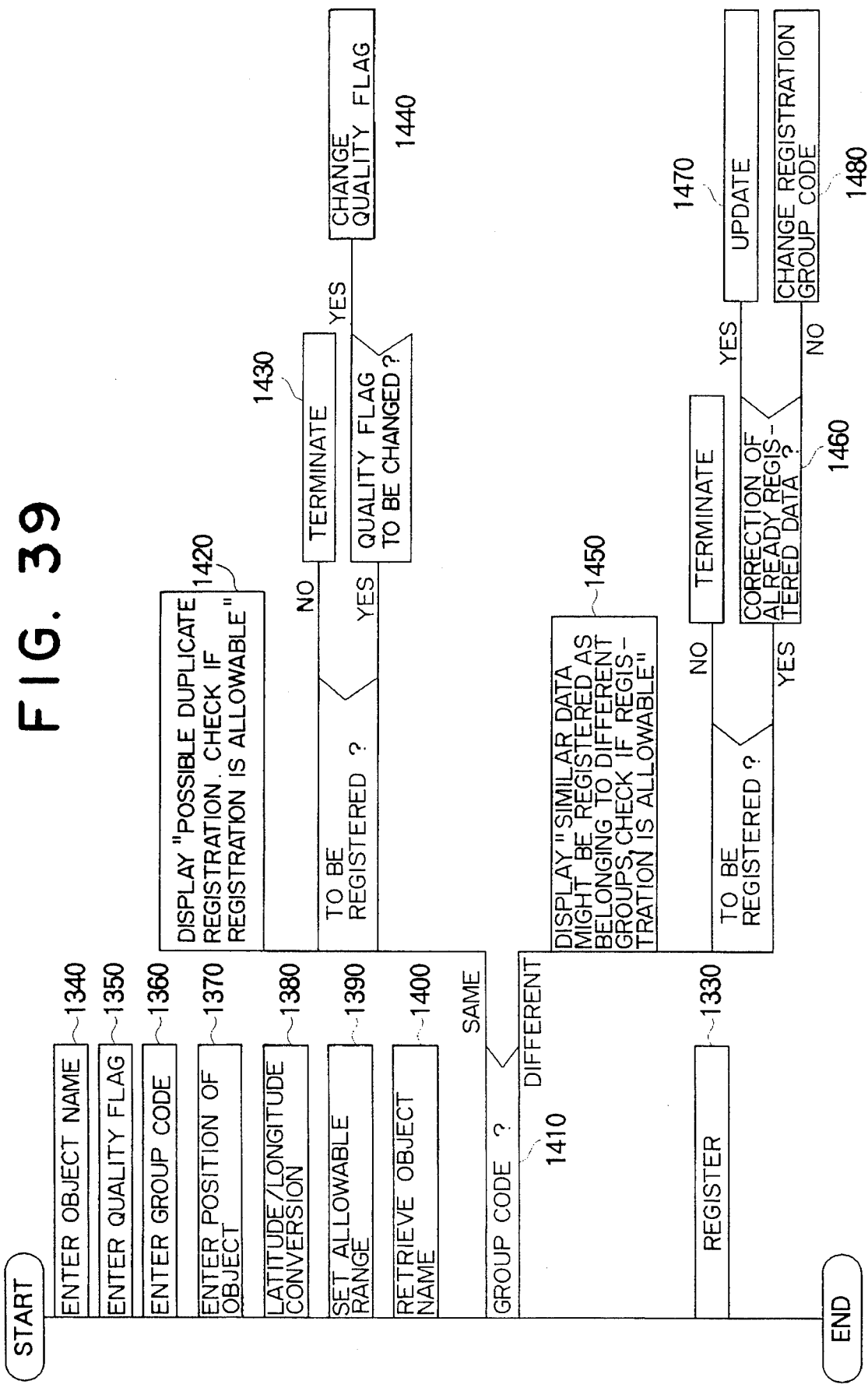
FIG. 39 is a flow chart showing the procedure of a registration supporting process.

The registration support unit 930 is provided with a duplicate registration judging process 1320 and a registration process 1330. FIG. 39 is a flow chart showing the procedure to be executed by the registration support unit 930.

(1) Duplicate registration judging process 1320
  (A) Input

The name and group code of an object to be registered are inputted from a workstation. The position information of the object is inputted by pointing to it on an image display unit 1095. Used as examples of the input information are o☐ Department Store of the object name, line/pixel coordinates (L3, P3), latitude/longitude coordinates (Lo3, La3), a quality flag "1" (meaning a low reliability), and a group code "01" (meaning the group belongs to Shinjuku Station). The quality flag Q of input information is registered in the object table at the time of registering information. The quality of input information is determined by a database user (information supplier). For example, a quality flag Q=10 is given to fairly reliable information, a quality flag Q=5 is given to dubious information, and a quality flag Q=0 is given to information of considerably low reliability. At a latitude/longitude conversion step 1380, the following expressions (43) and (44) are used for the conversion from line and pixel to latitude and longitude:

$$Lo3 = G_{Lo}(L3, P3) \quad (43)$$

$$La3 = G_{La}(L3, P3) \quad (44)$$

Next, a duplicate data registration is checked by using the object name and position information.

(B) Allowable range setting 1390

A retrieval range ($\Delta$Lo, $\Delta$La) is calculated using the quality flag. The retrieval range changes with the value of the quality flag.

One method of calculating the retrieval range is to refer the quality flag to a reference retrieval range ($\Delta Lo_b$, $\Delta La_b$). For example, this reference retrieval range ($\Delta Lo_b$, $\Delta La_b$) is set to about 3 seconds (100 meters) corresponding to a value five times the spatial resolution of an HRV image. The retrieval range is calculated from the following expressions:

$$\Delta Lo = Lo_b * \beta \quad (45)$$

$$\Delta La = La_b * \beta \quad (46)$$

$$\beta = 1/\alpha \quad (47)$$

where $\alpha$ represents the quality flag. The lower the reliability, the wider the retrieval range ($\Delta$Lo, $\Delta$La).

(C) Object name retrieval 1400

Next, the information of an object or objects having a possible duplicate registration and near the object to be registered is retrieved from the object table, the information to be retrieved including the object name, group code and quality flag:

```
SELECT   ALL OBJECT NAME, GROUP CODE,        (48)
         QUALITY FLAG INTO DA
FROM     OBJECT TABLE
WHERE    (Lo3 − Lo ≦ LATITUDE ≦ Lo3 + Lo
AND      La3 − La ≦ LONGITUDE ≦ La3 + La)
```

(D) Group code judgment 1410

It is next judged whether the retrieved group code is the same as the input group code of the object to be registered.

(a) Same group code

Since the two objects have the same group code and are located near each other, there is a possible duplicate registration. In this case, a message "POSSIBLE DUPLICATE REGISTRATION, CHECK IF REGISTRATION IS ALLOWABLE" is displayed at the workstation. A user determines if the object is to be registered. If the object is not to be registered, the registration procedure terminates. If the object is to be registered, the quality flag is set to a lower degree because of the possible duplicate registration. This is executed at a quality flag change step 1440.

(b) Different group codes

Since the two objects have different group codes and are located near each other, there is a possibility that the same object might be registered in duplicate as belonging to different groups. In this case, a message "SIMILAR DATA MIGHT BE REGISTERED AS BELONGING TO DIFFERENT GROUPS, CHECK IF REGISTRATION IS ALLOWABLE" is displayed at the workstation (at step 1450). If the object is not to be registered, the registration procedure terminates. If the object is to be registered, it is judged whether the already registered data is to be corrected (at step 1460). If the data is to be corrected, this correction is executed by using an SQL change command (step 1470). If the data is not to be corrected, the group code of the new registration data is changed (at step 1480).

(2) Registration process 1330

The registration process 1330 is executed by the following SQL command:

```
INSERT   INTO OBJECT TABLE                   (49)
         (CODE OBJECT NAME, LATITUDE/
         LONGITUDE GROUP, QUALITY FLAG)
VALUES   (o□ DEPARTMENT STORE, Lo3, La3, 01,
         1)
```

In the above manner, even an object with an indefinite position can be reliably registered.

In the above embodiment, as an alternative of the local distortion correcting process 1140 wherein an error amount is visually obtained based upon a reference point on a reference image and a corresponding point on a retrieving image, the reference point and corresponding point may be automatically detected through a pattern recognition process. This pattern recognition process may be executed by using a sequential similarity detection algorithm (SSDA) described in "Guide to Computer Image Processing" published by Sohken Publishing Ltd., 1985 and supervised by TAMURA, pp. 150–151, or by using other known methods.

This embodiment provides a multi-stage retrieving method as described above, wherein a macro object is first retrieved and is compared with the reference information to retrieve a micro object after local distortion correction. It is therefore possible to identify an object stored in the image file by using an image even with an indefinite position and by using the retrieving key. An image including an object at an optional position can be retrieved easily and at high precision. In addition to such retrieval, marking an object can be made at high precision. Furthermore, even an object having an indefinite position can be reliably registered because of an automatic detection of the data with a possible duplicate registration.

5th Embodiment

The fifth embodiment of the present invention will be described with reference to FIGS. 40 to 44.

Figure 40:
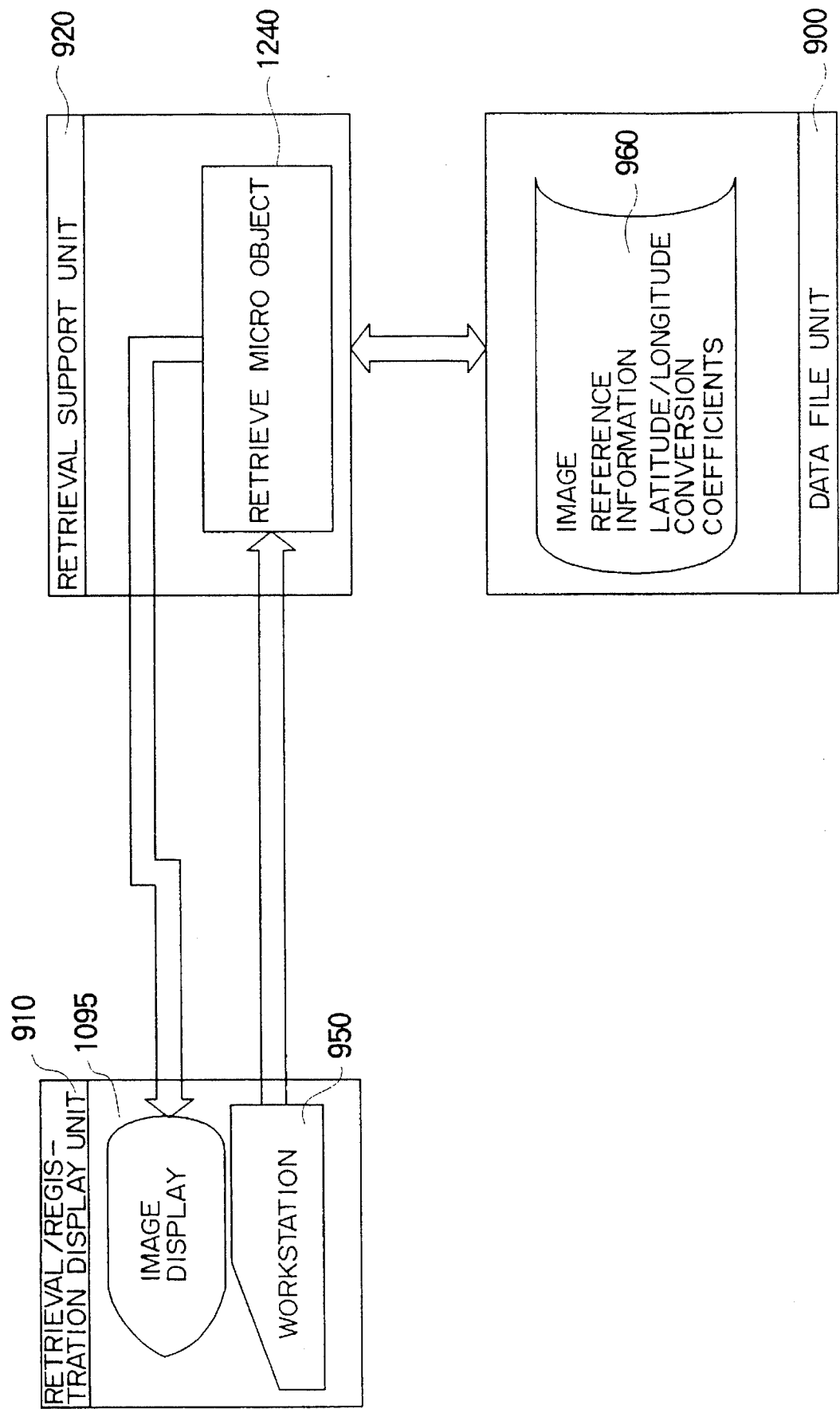
FIG. 40 shows the configuration of an image information database system.
Figure 41:
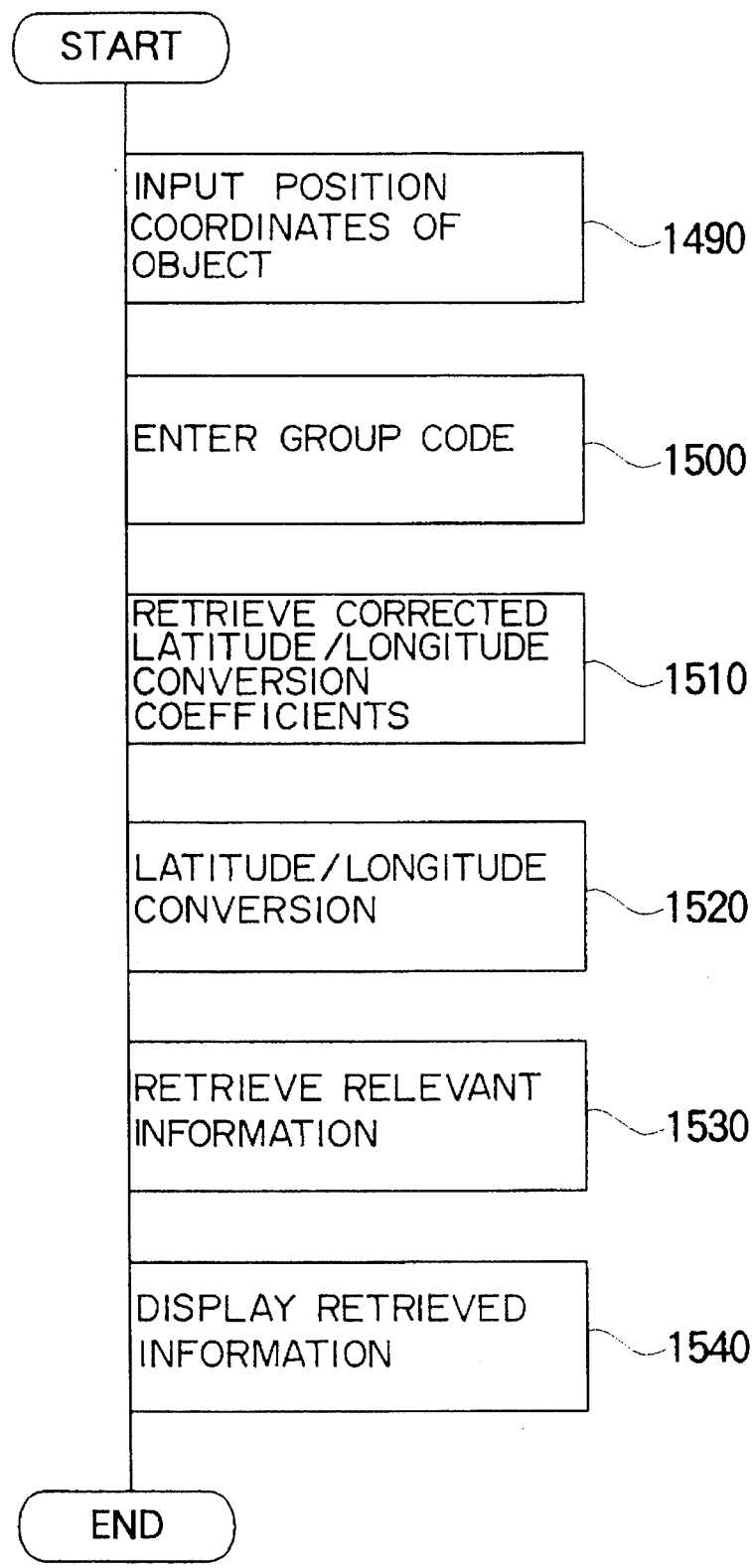
FIG. 41 is a flow chart showing the procedure of an object information retrieving process.
Figure 42:
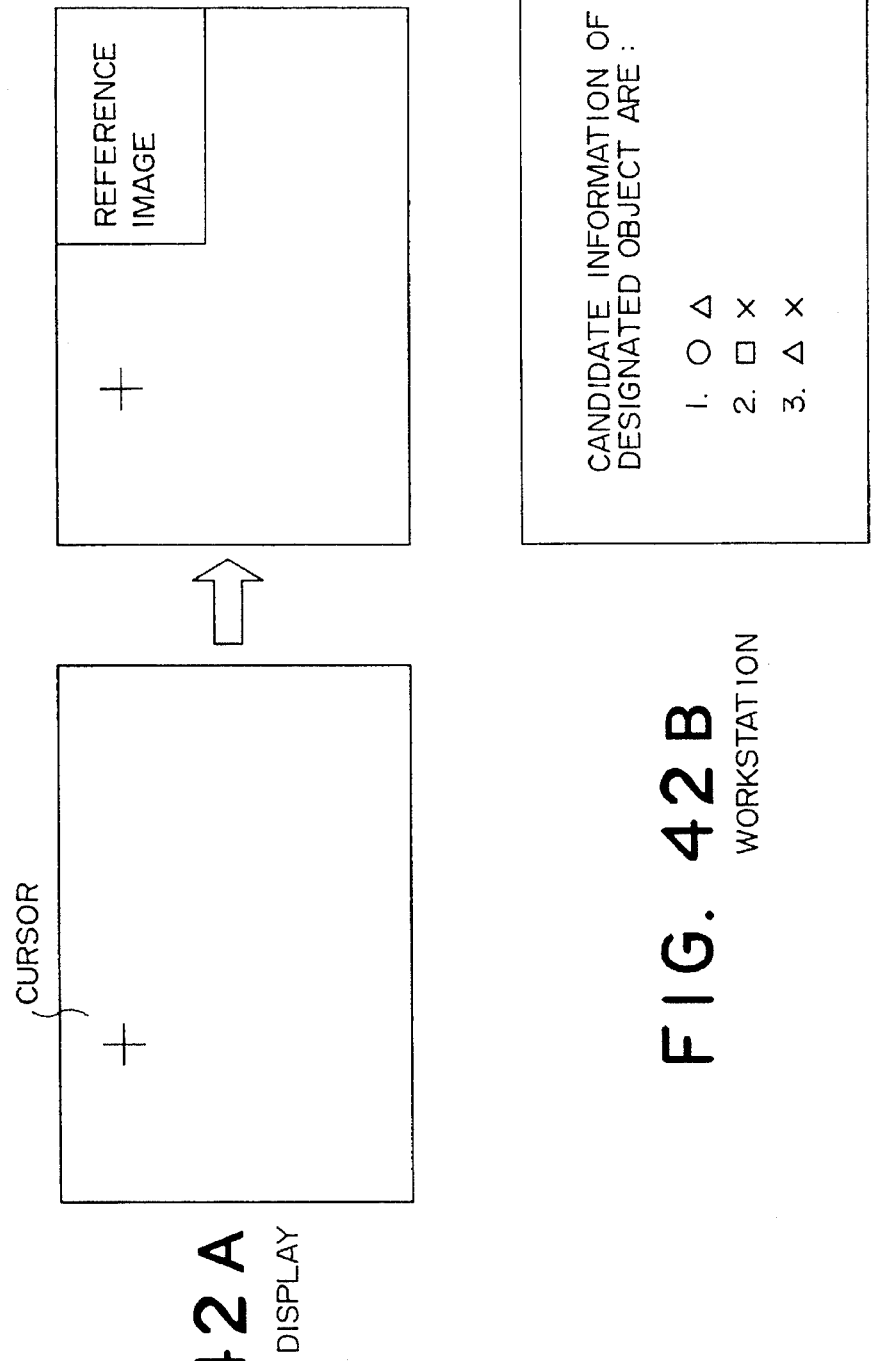
FIGS. 42A and 42B show examples of retrieved and displayed images at the workstation and on the image display unit.

FIG. 40 shows the configuration of an image information database system of the embodiment. In this embodiment system, the position of an object is retrieved by entering as the retrieving key the object name, and is marked on the displayed image. This system is constructed of a retrieval registration display unit 910, a retrieval support unit 920, and a data file unit 900.

In this embodiment, two examples of the retrieving method will be described.

(A) Object information retrieving process

The information of an object is retrieved by entering the position of the object within a displayed image.

(B) Object marking process

An object within a displayed image is marked to emphasize it. The processes (A) and (B) will be described in this order.

(A) Object information retrieving process

An object within an image displayed on an image display unit 1095 is designated by using a cursor. The information of the object is then retrieved from a data file 960 in the data file unit 900, and displayed at a work station 950. The object information retrieving process is shown in the flow chart of FIG. 41.

(1) Object position coordinate input 1490

The object displayed on the image display unit 1095 is designated by using a cursor to read its coordinates (L, P).

(2) Group code input 1500

The group code of the displayed image is inputted.

(3) Corrected latitude/longitude conversion coefficient retrieval 1510

By using the group code, the corrected latitude/longitude conversion coefficients are retrieved from the latitude/longitude conversion coefficient table shown in FIG. 35.

(4) Latitude/longitude coefficient conversion 1520

The image coordinates (L, P) are converted into map coordinates (Lo, La) by:

$$Lo = G_{Lo}(L, P) \tag{50}$$

$$La = G_{La}(L, P) \tag{51}$$

(5) Relevant information retrieval 1530

Similar to the fourth embodiment, the relevant information is retrieved from the object table and reference table shown in FIGS. 27 and 33, by using the position information (Lo, La) of the object and the following SQL commands:

```
SELECT   ALL OBJECT NAMES INTO DA          (52)(53)
FROM     OBJECT TABLE
WHERE    (Lo − Lo ≦ LATITUDE ≦ Lo + Lo
AND      La − La ≦ LONGITUDE ≦ La + La)
SELECT   ALL IMAGE IDENTIFICATION
         NUMBERS, TEXT IDENTIFICATION
         NUMBERS INTO DA
```

```
FROM    REFERENCE TABLE
WHERE   (Lo − Lo ≦ LATITUDE ≦ Lo + Lo
AND     La − La ≦ LONGITUDE ≦ La + La)
```

(6) Retrieved information display 1540

The retrieved information is displayed at the workstation 950 and on the image display unit 1095. For example, candidate information is displayed as shown in FIGS. 42A and 42B. If necessary, more detailed information may be retrieved.

(B) Object marking process

Figure 43:
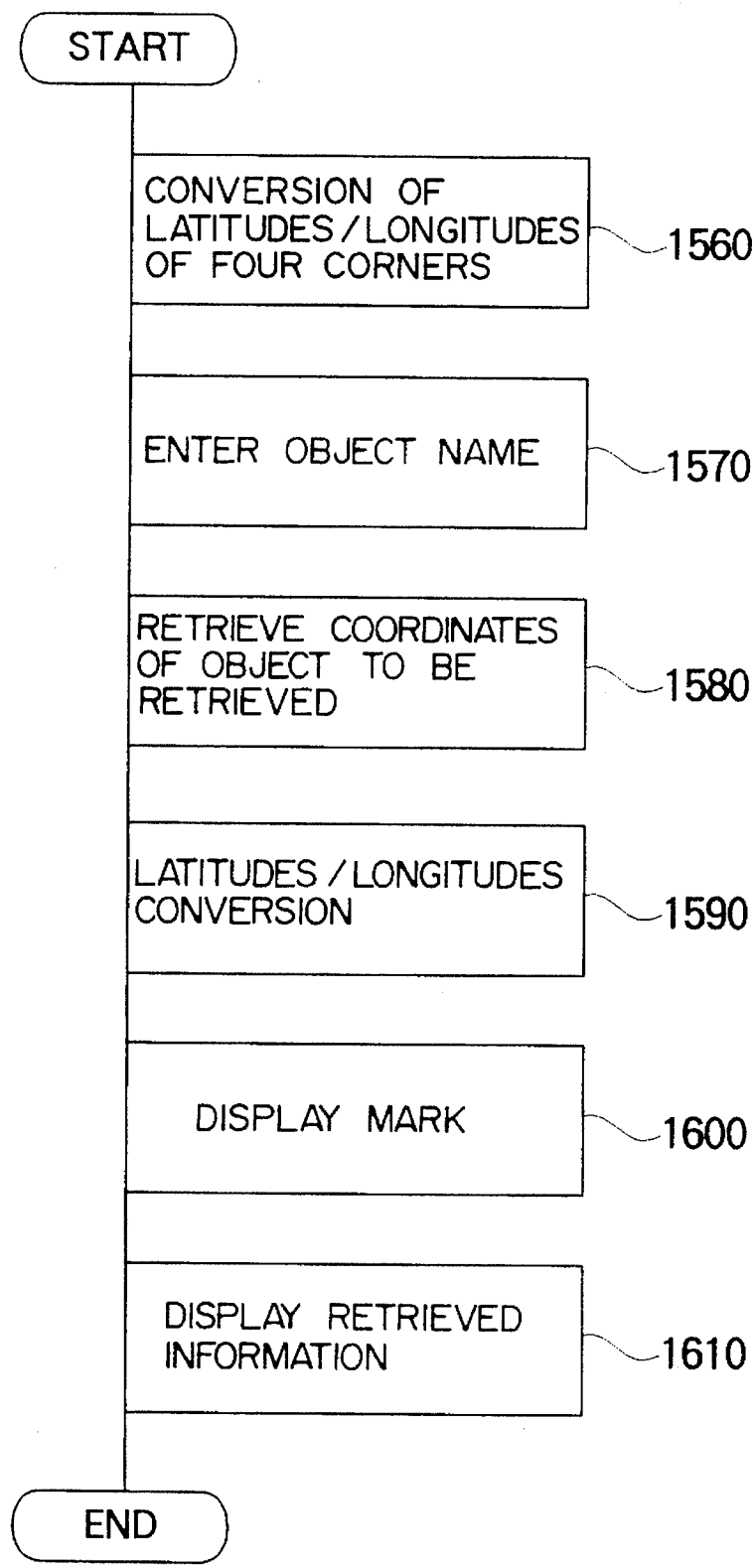
FIG. 43 is a flow chart showing the procedure of an object marking process.

A particular object within a displayed image is marked in the manner illustrated in the flow chart of FIG. 43. A database user enters the name of a particular object to be retrieved.

(1) Latitude/longitude conversion coefficient retrieval

A corrected latitude/longitude conversion coefficient identification number is retrieved using the group code of the displayed image, to obtain corrected latitude/longitude conversion coefficients G by the following command:

```
SELECT   ALL CORRECTED LATITUDE/LONGI-      (54)
         TUDE CONVERSION COEFFICIENT
         IDENTIFICATION NUMBERS INTO DA
FROM     LATITUDE/LONGITUDE CONVERSION
         COEFFICIENT TABLE
WHERE    GROUP CODE
```

(2) Four corner latitude/longitude coordinate conversion 1560

The four corner coordinates (Lo1, La1), (Lo2, La2), (Lo3, La3), and (Lo4, La4) of the image display unit are obtained. For example, an image display unit having a size of 512 * 512 pixels has the four corner coordinates (1, 1), (1, 512), (512, 1), and (512, 512). The four corner coordinates are calculated by using the following expressions (55) and (56):

$$Lo = G_{Lo}(L, P) \quad (55)$$

$$La = G_{La}(L, P) \quad (56)$$

(3) Object name input 1570

The name of an object to be retrieved is inputted from the workstation 950.

(4) Object coordinate retrieval 1580

The position of an object Park is retrieved by referring to the four corner coordinates calculated at the four corner latitude/longitude conversion step, by using the following command:

```
SELECT   ALL LATITUDES/LONGITUDES INTO       (57)
         DA
FROM     OBJECT TABLE
WHERE    OBJECT NAME = 'PARK'
AND      ((LATITUDE ≦ Lo2 OR LATITUDE ≦ Lo1)
AND      ((LATITUDE ≧ Lo4 OR LATITUDE ≧ Lo3)
AND      ((LONGITUDE ≦ La2 OR LONGITUDE ≦
         La4)
AND      ((LONGITUDE ≦ La1 OR LONGITUDE ≦
         LA3))
```

(5) Latitude/longitude conversion 1590

All retrieved latitude/longitude coordinates are converted into image coordinates by the following expressions (58) and (59):

$$L = F_l(a, b) \quad (58)$$

$$P = F_p(a, b) \quad (59)$$

where (a, b) represents a retrieved latitude and longitude.

(6) Mark display 1600

Figure 44A:
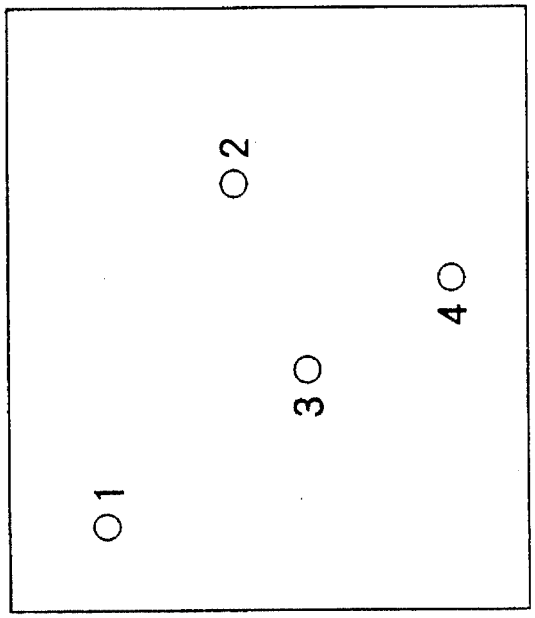
FIGS. 44A and 44B show examples of retrieved and displayed images at the workstation and on the image display unit.

The position on the image display unit 1095 of the image coordinates (L, P) converted by the conversion step 1590 is marked by a superposed colored cursor to emphasize it as shown in FIG. 44A.

(7) Object information display 1610

Figure 44B:
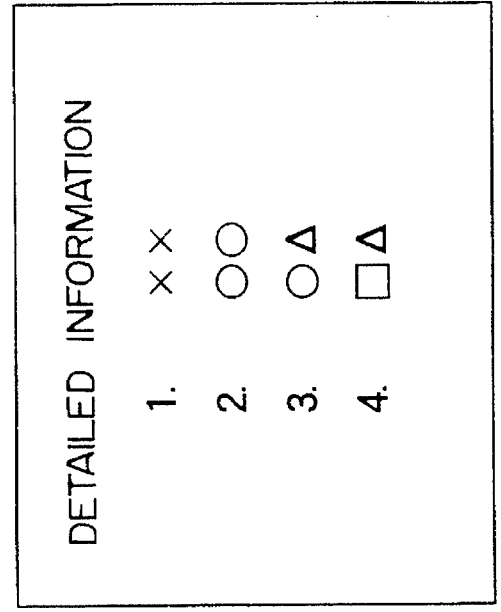

In addition to the marking, the relevant information of the object is displayed at the workstation as shown in FIG. 44B.

In the above manner, it is possible to mark an object within a displayed image even if it has an indefinite position, and to retrieve the relevant information.

6th Embodiment

The sixth embodiment of the present invention will be described with reference to FIGS. 17 and 45 in particular.

Figure 45:
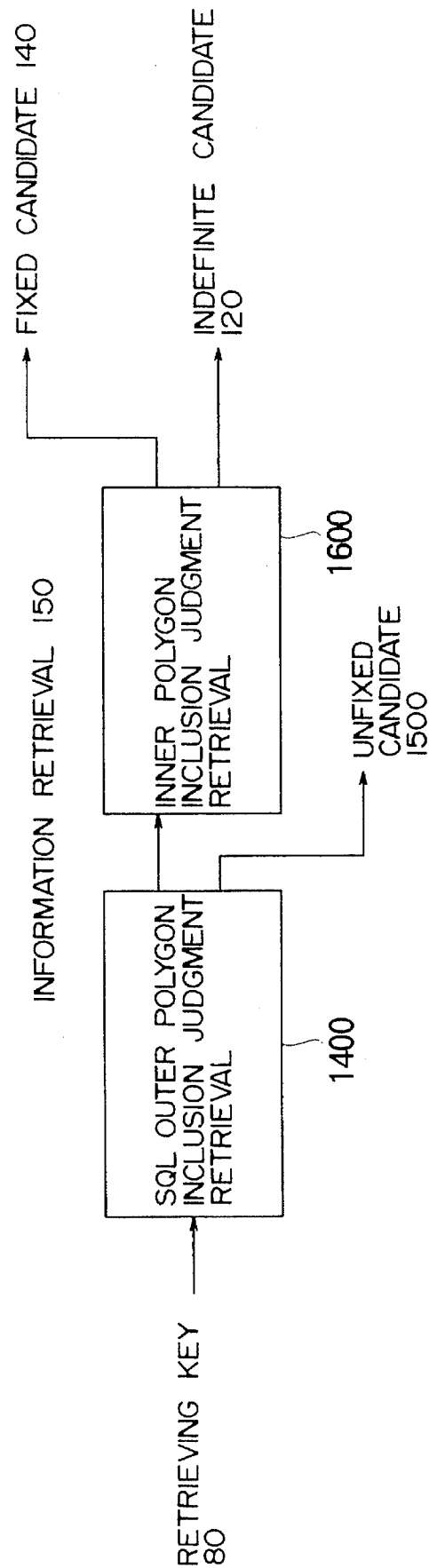
FIG. 45 is a block diagram showing a candidate image information retrieving method.

In this embodiment, as shown in FIG. 45, candidate image information is retrieved at the candidate image information retrieving process 580 of the retrieval support unit 540 shown in FIG. 17, and thereafter only the candidate image information having a possibility of erroneous discard or erroneous detection is subjected to the detailed image information retrieving process 630.

The details of retrieving processes shown in FIG. 17 will be given in the following.

(1) Latitude/longitude retrieving process 570

FIG. 8 is a flow chart showing this process.

With this procedure, an object name is entered from the workstation 680 shown in FIG. 17 (at step 320) to automatically retrieve the latitude and longitude of the object by using the object table shown in FIG. 10 (at step 330). The columns of the object table include an object name column, an object latitude column, an object longitude column and the like. The latitudes and longitudes shown are provided from maps supplied by the Geographical Survey Institute. The number of rows or records of the object table is the same as that the objects. The numerical values in the table are not exact, but approximate to the extent only for the purpose of describing the embodiment.

For example, in retrieving the latitude and longitude of Haneda Airport, the following expression of an SQL command is used:

```
DECLARE  CR1 CURSOR FOR SELECT      (60)(61)(62)
         LATITUDE LONGITUDE
FROM     OBJECT TABLE
WHERE    OBJECT NAME = 'HANEDA
         AIRPORT'
OPEN     CR1
FETCH    CR1 INTO DA
```

The expression (60) retrieves a record set satisfying the condition of the WHERE clause (satisfying the object name of 'HANEDA AIRPORT') from the object table, and makes the cursor CR1 in correspondence with the retrieved record set.

The expression (61) OPEN-s the cursor CR1. The expression (62) moves the position of the cursor CR1 to the next record, and the data at the record is stored in the data area DA.

If the object is not present upon execution of the SQL commands of the expressions (60) to (62), a message "NO OBJECT NAME" is displayed (at step 340) at the workstation and the procedure is terminated (at step 350).

If there is any object name, retrieved candidate object information (object name, latitude, longitude, area size, and the like) is displayed at the workstation (at step 360). A user selects an object (at step 370), and the latitude and longitude of the selected object are outputted (at step 380) to thereafter terminate the procedure.

The retrieved latitude/longitude coordinates are assumed to be (a, b).

(2) Candidate image information retrieving process 580

Figure 46:
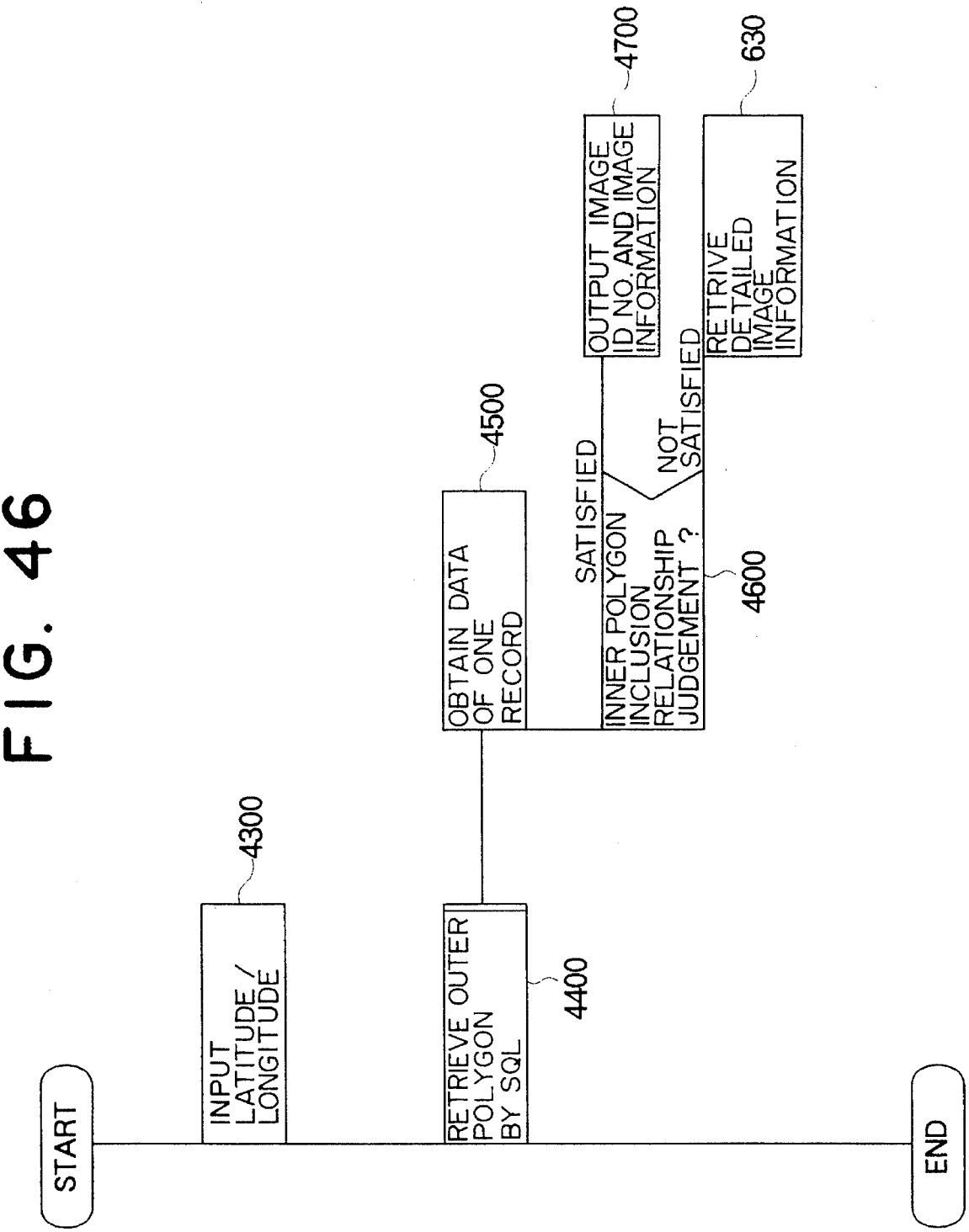
FIG. 46 is a flow chart showing the procedure of a candidate image information retrieving process.

FIG. 46 is a flow chart showing this process. With this procedure, an image identification number of the fixed candidate information is retrieved from the image table shown in FIG. 12, by using the latitude and longitude retrieved at the latitude/longitude retrieving process 570. The image table shown in FIG. 12 stores the information as is the first embodiment. The definitions of the terms "inner polygon" and "outer polygon" are the same as described with FIGS. 1A and 1B and 2A and 2B.

First, the latitude and longitude are inputted (at step 4300 in FIG. 46) to execute an SQL outer polygon retrieving step 4400. At this step 4400, a record set satisfying the condition of the WHERE clause is retrieved from the image table by using the SQL command, and thereafter data of the record set is retrieved one record after another (step 4500). The condition of the WHERE clause is that the outer polygon defined by indices includes the retrieving key defined by the latitude/longitude coordinates (a, b).

Next, the retrieved data is subjected to an inner polygon inclusion relationship judgment (at step 4600). The condition of the judgment statement is that the inner polygon defined by indices includes the retrieving key (a, b). If this condition of the statement is satisfied, it means the fixed retrieval (presence of fixed image information) indicated at 180 in FIG. 5. In this case, the data at the present record (such as four corner latitude/longitude coordinates, image identification number and the like) is outputted (at step 4700). If the condition is not satisfied, it means the indefinite retrieval indicated at 190 in FIG. 5. In this case, a detailed image information retrieving step 630 is executed. At the SQL outer polygon retrieving step 4400, the steps 4500 to 4700 and 630 are repeated for all records of the record set determined by the WHERE clause.

The image information whose retrieving key (a, b) is included within the inner polygon can be retrieved by the following SQL commands given by the expressions (63) to (65) and a judgment statement given by the expression (66):

| | | |
|---|---|---|
| DECLARE | CR1 CURSOR FOR FOUR CORNER LATITUDE/ LONGITUDE SENSOR NAME SATELLITE NAME, SENSED DATE | (63)(64)(65)(66) |
| FROM | IMAGE TABLE | |
| WHERE | (a $\geq$ Lo1 OR a $\geq$ Lo3) | |
| AND | (a $\leq$ Lo2 OR a $\leq$ Lo4) | |
| AND | (b $\geq$ La3 OR b $\leq$ LA4) | |
| AND | (b $\leq$ La1 OR b $\leq$ La2) | |
| OPEN | CR1 | |
| FETCH | CR1 INTO DA | |
| IF | ((a $\geq$ Lo1 AND a $\geq$ Lo3) | |
| AND | (a $\leq$ Lo2 AND a $\leq$ Lo4) | |
| AND | (b $\geq$ La3 AND b $\geq$ LA4) | |
| AND | (b $\leq$ La1 AND b $\leq$ La2) | | where (Lo1, La1), (Lo2, La2), (Lo3, La3), and (Lo4, La4) represent the four corner latitudes and longitudes of a polygon image, respectively at the upper left corner, upper right corner, lower left corner, and lower right corner.

Using the SQL command train given by the expressions (63) to (65), a record set satisfying that the outer polygon includes the inputted latitude/longitude coordinates, is designated, and the data (such as four corner latitude/longitude coordinates, image identification number and the like) of the designated record set is retrieved one record after another. The judgment statement given by the expression (66) is a statement for judging, basing upon the four corner latitude/longitude coordinates retrieved by using the expressions (63) to (65), whether the inner polygon includes the inputted latitude/longitude coordinates. If no record is found by the SQL commands given by the expressions (63) to (65), the procedure terminates. If three is at least one record satisfying the conditions defined by the expressions (63) to (65), the data (such as four corner latitude/longitude coordinates, image identification number and the like) of the record is outputted (at step 4700).

(3) Detailed image information retrieving process 630

Next, the retrieve information which satisfied the inner polygon inclusion relationship but did not satisfy the outer polygon inclusion relationship, is subject to the detailed image information retrieving process 630.

Figure 47:
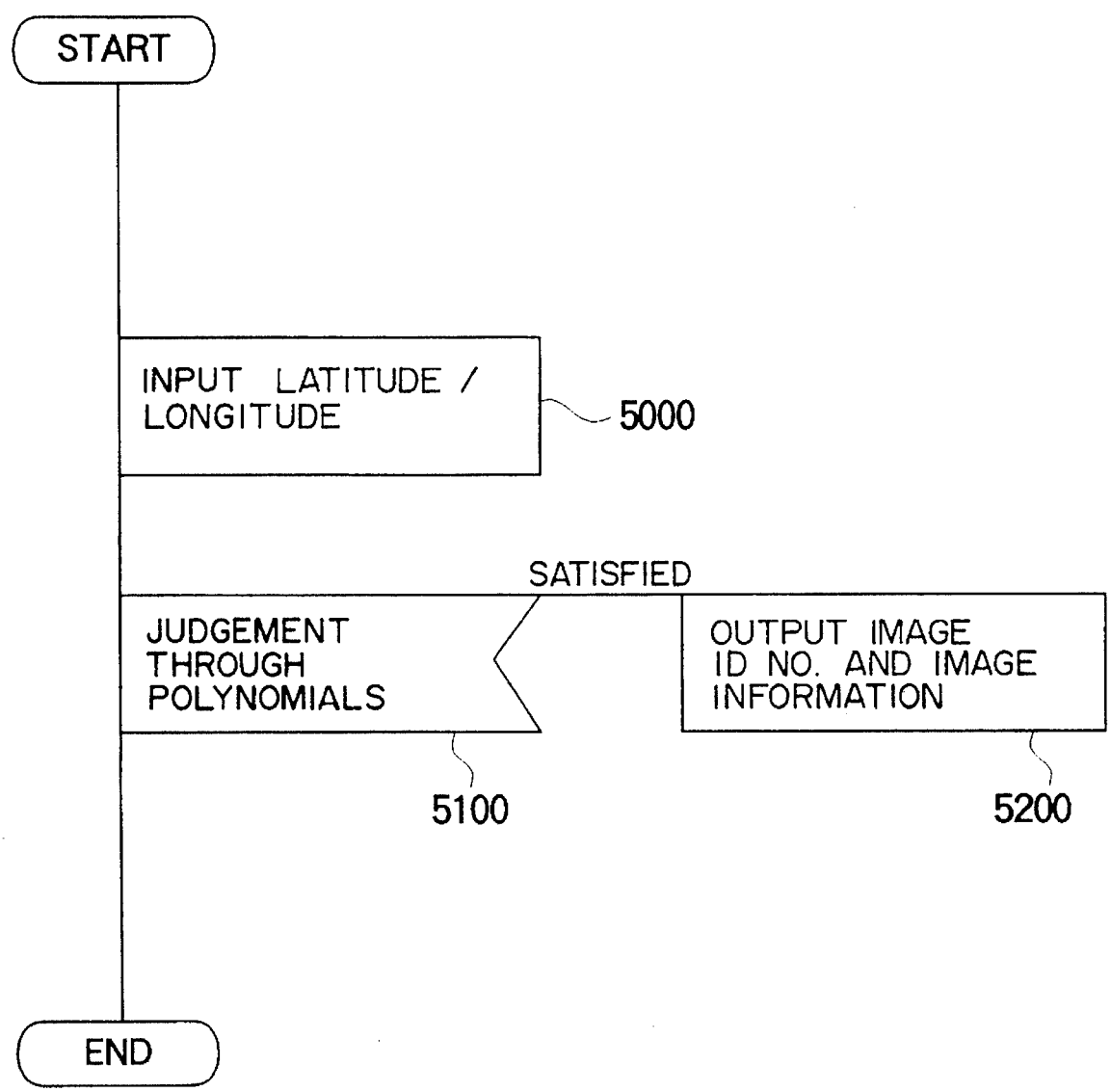
FIG. 47 is a flow chart showing the procedure of a detailed image information retrieving process.

This process is executed by a judgment statement using polynomials. FIG. 47 is a flow chart showing the procedure of the detailed image information retrieving process. Inputted first are the retrieving key (a, b) and the record data (such as four corner latitude/longitude coordinates, image identification number and the like) retrieved at the SQL outer polygon retrieving step 4400 of the candidate image information retrieving process 580 (at step 5000 in FIG. 47). Next, the inclusion relationship is judged by using the polynomials, as to whether the inputted retrieving key is included within the area defined by the four corner latitude/longitude coordinates of the sensed image (at step 5100). If the judgment conditions are satisfied, the data (such as image identification number and other data) of the present record is outputted (at step 5200) to thereafter terminate the procedure. If the judgment conditions are not satisfied, the procedure terminates.

A record data of an image whose retrieving key (a, b) is included within the inner polygon can be retrieved by the following expression, wherein the inputted retrieving key and four corner latitude/longitude coordinates are given by the same representation as that used at the candidate image information retrieving process 580:

| | | |
|---|---|---|
| IF | (a $\geq$ (Lo1 − Lo3)(b − La1) / (La1 − La3) + Lo1 | (67) |
| AND | a $\leq$ (Lo2 − Lo4)(b − La4) / (La2 − La4) + Lo4 | |
| AND | b $\leq$ (La2 − La1)(a − Lo2) / (Lo2 − Lo1) + La2 | |
| AND | b $\geq$ (La4 − La3)(a − Lo3) / (Lo4 − Lo3) + La3 | |

The expression (67) is a judgment statement for executing a polynomial judgment of inputted data. If the expression (67) is satisfied, the data of the present record is outputted.

(4) Image selecting process 660

Figure 48:
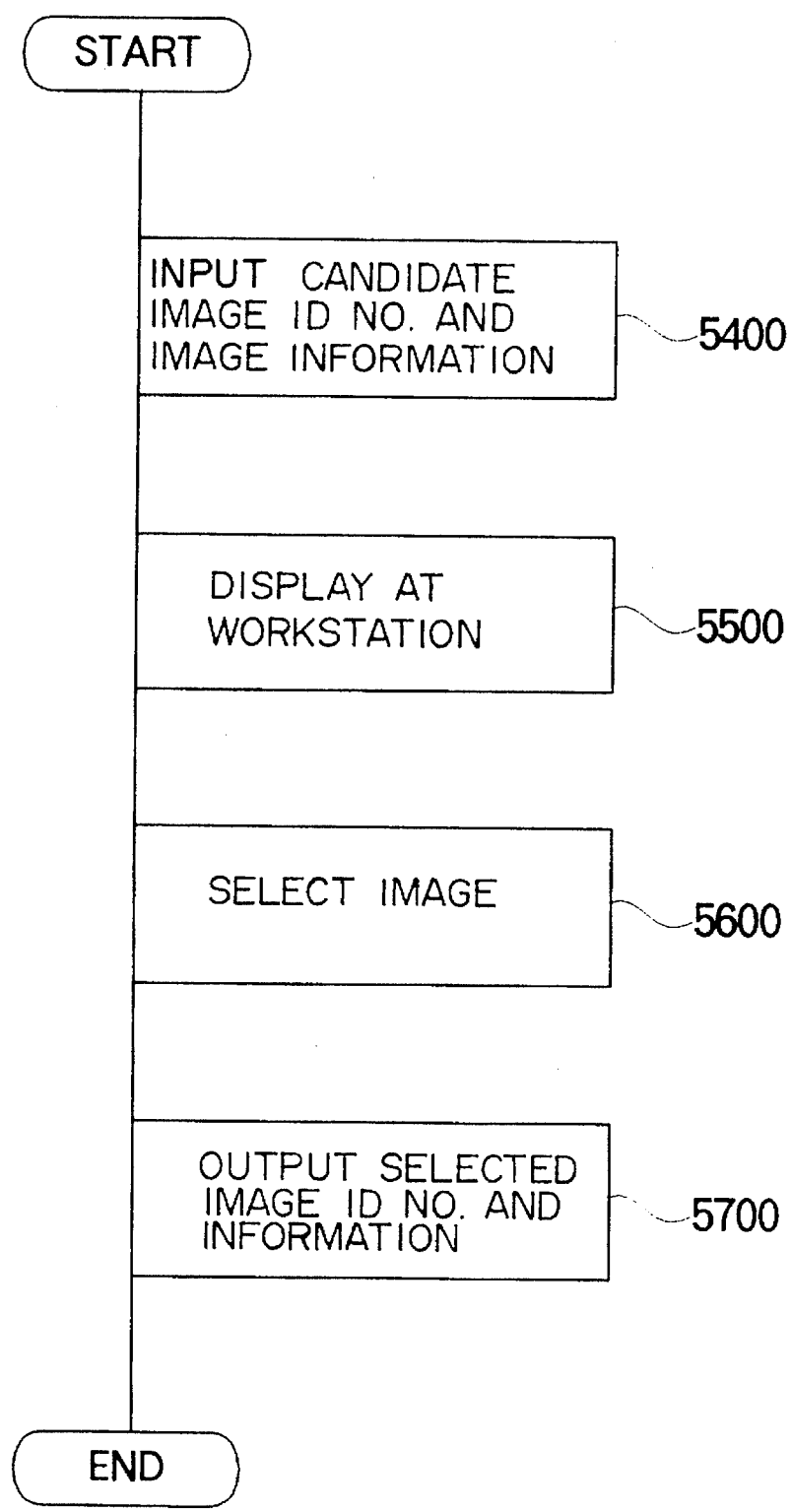
FIG. 48 is a flow chart showing the procedure of an image selecting process.

FIG. 48 is a flow chart showing the procedure of the image selecting process. First, data of several images obtained at the detailed image information retrieving process 630 is entered (at step 5400). The image data like the intermediate output shown in FIG. 9 is then displayed at the workstation (step 5500). A user reviews the displayed images to select one of them so that the image identification number and other information of the selected image are displayed at the workstation 670 (at step 5700).

(5) Image cutout displaying process 680

Next, an area having a size of 512 * 512 pixels with an inputted object positioned at the center thereof is cut out from the selected image, and the process of displaying it on the image display unit 290 shown in FIG. 7, is executed.

Figure 49:
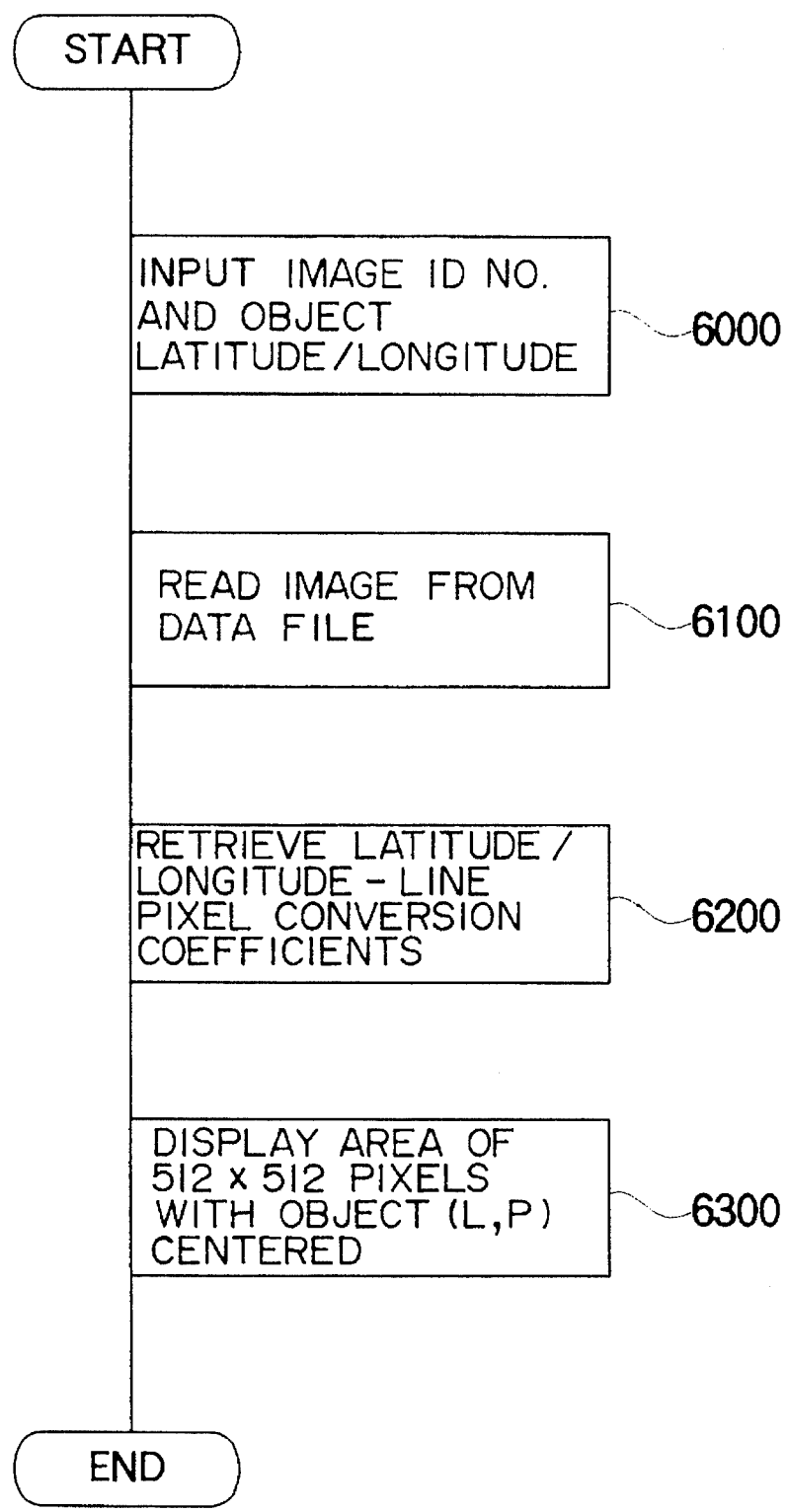
FIG. 49 is a flow chart showing the procedure of an image cutout process.

FIG. 49 is a flow chart showing the procedure of the image cutout process. Inputted first are the image identification number selected at the image selecting process 860 shown in FIG. 17 and the latitude/longitude coordinates of the object selected by the latitude/longitude retrieving process 570 (at step 6000). Using the inputted image identification number as a search key, an image including the object image is read from the data file unit 550 shown in FIG. 17 (at step 6100). Next, using the image identification number as a search key, the conversion coefficients for the read image are retrieved from the latitude/longitude-line/pixel conversion coefficient table shown in FIG. 15 (at step 6200).

The latitude/longitude-line/pixel conversion coefficients are defined by:

$$(L, P) = f(Lo, La) \tag{68}$$

where La represents a latitude, Lo represents a longitude, L represents a line, and P represents a pixel.

The expression (68) is a conversion expression for the conversion from latitude and longitude to line and pixel. The function f represents a polynomial. The coefficients of the polynomial are calculated beforehand at the process of correcting a geographical distortion of images.

Next, the inputted latitude and longitude of the object are converted into line and pixel values by using the conversion coefficients, and a cutout image of 512 * 512 pixels placing Haneda Airport at the center of the image as shown in FIG. 9 is displayed on the image display unit (at step 6300).

In this embodiment, it is possible to judge at a high speed whether the retrieving key is being registered in the data file unit 550 and whether it is included in the displayed image. At the detailed image information retrieving process 630, the candidate image information may be thinned and displayed directly on the image display unit to allow a user to visually select a desired image.

According to the present invention, use of the position information allows easy retrieval of a sensed image including an object to be retrieved at a high precision and high speed. Furthermore, use of the position information allows integral management of various information such as images and maps.

Since a particular point or area within an image can be directly managed, it is possible to configure a multimedia information processing system with integrated database and analysis.

We claim:

1. A method of retrieving image information from a database, comprising the steps of:

entering a retrieving keyword from a retrieval display unit for processing data input and output;

reading an index, representing position information corresponding to said retrieving keyword by using said retrieving keyword, from a data file unit storing image data;

retrieving candidate image data first by using said index;

retrieving detailed image data next by using said index;

wherein said step of retrieving said candidate image data and said step of retrieving detailed image data constitute a two-stage retrieving step, and wherein said two-stage retrieving step retrieves image data corresponding to said index from said data file unit; and displaying said retrieved image data on said retrieval display unit;

wherein said step of retrieving said detailed image data includes a step of representing by a polynomial information a quadrangle area of said image data stored in said data file unit, said quadrangle area being defined by four corner coordinates thereof, and a step of judging through a polynomial judgment whether said retrieving keyword is included within an area defined by said polynomial.

2. A method of retrieving image information from a database according to claim 1, wherein said judging step includes a step of comparing said retrieving keyword and the four corner coordinates of said image data by using an AND logical expression and an OR logical expression of said SQL command, and a step of judging that said information corresponding to said retrieving keyword is definitely present if said retrieving keyword satisfies an AND condition, and judging that whether the retrieval is possible or not cannot be determined definitely by only said SQL command if there is a difference between information retrieved by an OR condition and information retrieved by said AND condition.

3. A method of retrieving image information from a database according to claim 1, wherein said candidate image information retrieving step includes a step of executing an outer polygon judgment process for discriminating data not satisfying said retrieving keyword definitely and a step of executing an inner polygon judgment process for discriminating data satisfying said retrieving keyword and other indefinite data, respectively by using an SQL command described by a relational database retrieval language.

4. A method of retrieving image information from a database according to claim 3, wherein said outer polygon judgment process includes a step of judging whether said retrieving keyword is included in a rectangle area, said rectangle area being defined by four corner coordinates and including a quadrangle area of image information stored in said data file and defined by four corner coordinates.

5. A method of retrieving image information from a database according to claim 3, wherein said inner polygon judgment process includes a step of judging, for the data outputted by said outer polygon judgment process, whether said retrieving keyword is included in a rectangle area, said rectangle area being defined by four corner coordinates and including a quadrangle area of image information stored in said data file and defined by four corner coordinates.

6. A method of retrieving image information from a database according to claim 3, wherein said step of discriminating said indefinite data includes, in said detailed image information retrieving step, a step of discriminating between data satisfying said retrieving keyword definitely and data not satisfying said retrieving keyword.

7. A method of retrieving image information from a database, comprising the steps of:

entering a retrieving keyword representing the position of an object from a retrieval display unit for processing data input and output;

providing a data file unit storing image data of the object, reference image data, a relevant information table, an index approximately corresponding to said retrieving keyword, and a latitude/longitude conversion coefficient therein;

reading said index from said data file unit;

designating a macro object having a large size relative to a geometric distortion error of said image data, by using said index;

retrieving said image data including said macro object and said reference image data including said macro object;

displaying said retrieved image data and reference image data in a juxtaposed layout;

entering, from the retrieval display unit, positions of a same object for said retrieved image data and reference image data displayed in said juxtaposed layout;

measuring a retrieval error between said two entered positions;

correcting said latitude/longitude conversion coefficient registered in said relevant information table by using said retrieval error;

registering said corrected latitude/longitude conversion coefficient again in said data file unit;

correcting a local geometric distortion error of said image data by using said registered corrected latitude/longitude conversion coefficient; and displaying said image data corrected for said local geometric distortion error on said retrieval display unit.

8. A method of retrieving image information from a database according to claim 7, wherein said step of correcting a local geometric distortion error includes a step of retrieving a correct position of a micro object having a small size relative to a geometric distortion of said image data stored in said data file by using said entered retrieving keyword and said corrected latitude/longitude conversion coefficient.

9. A method of retrieving image information from a database according to claim 8, wherein said macro and micro objects to be retrieved by said macro and micro object retrieving steps are registered as one group in said relevant information table, and a same coefficient is used as said latitude/longitude conversion coefficient.

10. A method of retrieving image information from a database according to claim 9, wherein said macro object of said group is registered as a parent and said micro object of said group is registered as a child, and a two-stage retrieving step is executed wherein said child is retrieved after said parent is retrieved.

11. A method of retrieving image information from a database according to claim 10, wherein position information of said parent and child objects is represented by an absolute coordinate system having a common origin for both said parent and child objects.

12. A method of retrieving image information from a database according to claim 10, wherein the position information of said parent is represented by an absolute coordinate system, and the position information of said child is represented by a displacement from the position of said parent.

13. A method of retrieving image information from a database according to claim 7, wherein as said position information for retrieving said image data stored in said data file, both a latitude/longitude of a map coordinate system and a line/pixel of an image coordinate system are used.

14. A method of retrieving image information from a database according to claim 7, wherein said data file unit includes an image file for storing said relevant information table for providing a correspondence between stored data, and for storing said image data.

15. A method of retrieving image information from a database according to claim 7, wherein said data file unit includes said image table for said image data, an image file, a reference image table, a reference image file, and a latitude/longitude conversion coefficient table and latitude/longitude conversion coefficient file for a conversion expression for an image coordinate system and map coordinate system.

16. A method of retrieving image information from a database according to claim 7, wherein said providing step includes a step of inputting relevant information including an object name, a group code, and position information, to form a new relevant information table, and registering said new relevant information table in said data file unit.

17. A method of retrieving image information from a database according to claim 16, wherein said registering step includes a step of judging a presence of a duplicate registration by checking a similarity of object name and position information between the data newly registered and already registered, and issuing an alarm when there is a possibility of said duplicate registration.

18. A method of retrieving image information from a database according to claim 7, wherein said relevant information table stores a quality flag indicating the degree of reliability of registered data.

19. A method of retrieving image information from a database according to claim 18, wherein an allowable error used for judging a similarity between said index and said retrieving key is made variable depending upon said quality flag.

20. A method of retrieving image information from a database according to claim 19, wherein said allowable error is made large if the reliability indicated by said quality flag is low, and small if said reliability is high.

21. A method of retrieving image information from a database according to claim 18, wherein said duplicate registration judging step includes a step of making said allowable error used for judging a similarity between said index and said retrieving key, variable depending upon said quality flag.

22. A method of retrieving image information from a database according to claim 7, wherein said step of entering the positions of a same object for said retrieved and displayed image data and reference image data, includes a step of detecting through pattern recognition said positions and automatically measuring said error.

23. A method of retrieving image information from a database according to claim 7, wherein said step of entering the positions of a same object for said retrieved and displayed image data and reference image data, includes a step of entering an object name, using said latitude/longitude information as said retrieving keyword, retrieving said image data of a partial area including said object from said data file unit, displaying said image data on a screen of said retrieval display unit, and designating at least one position of said object with a geometric distortion being eliminated on the screen of said retrieval display unit.

24. A method of retrieving image information from a database according to claim 7, wherein said step of entering the positions of a same object for said retrieved and displayed image data and reference image data, includes a step of retrieving relevant information of said object positions from said data file unit when said positions are designated on a displayed image on said screen.

25. A method of retrieving image information from a database, comprising the steps of:

entering a retrieving keyword representing a position of an object from a retrieval display unit for processing data input and output;

providing a data file unit storing image data, reference image data, a relevant information table, object position information corresponding to said retrieving keyword, and a latitude/longitude conversion coefficient therein;

retrieving, from said data file unit, a position of a macro object having a large size relative to a geometric distortion error of said image data by using said retrieving keyword;

measuring a retrieval error through comparison between said image data and reference image data regarding said retrieved position of said macro object;

correcting a local geometric distortion error of said image data by correcting said latitude/longitude conversion coefficient by using said retrieval error; and retrieving, from said data file unit, a position of a micro object having a small size relative to a geometric distortion error of said image data, by using said retrieving keyword and said corrected latitude/longitude conversion coefficient.

* * * * *